US012696894B2

(12) United States Patent
Smith et al.

(10) Patent No.: US 12,696,894 B2
(45) Date of Patent: Aug. 4, 2026

(54) WINDOW UNIT FOR REDUCING BIRD COLLISIONS AND METHODS OF MAKING THE SAME

(71) Applicant: Vitro Flat Glass LLC, Cheswick, PA (US)

(72) Inventors: Jessica Smith, Cheswick, PA (US); Neil Curliss, Salem, OR (US)

(73) Assignee: Vitro Flat Glass LLC, Cheswick, PA (US)

( * ) Notice: Subject to any disclaimer, the term of this patent is extended or adjusted under 35 U.S.C. 154(b) by 86 days.

(21) Appl. No.: 18/602,134

(22) Filed: Mar. 12, 2024

(65) Prior Publication Data

US 2024/0306630 A1     Sep. 19, 2024

Related U.S. Application Data

(60) Provisional application No. 63/451,677, filed on Mar. 13, 2023.

(51) Int. Cl.
B32B 3/10          (2006.01)
A01M 29/08          (2011.01)
(Continued)

(52) U.S. Cl.
CPC ............... A01M 29/08 (2013.01); B32B 3/10 (2013.01); B32B 3/14 (2013.01); B32B 3/18 (2013.01); E06B 3/6715 (2013.01)

(58) Field of Classification Search
CPC .... B32B 3/14; B32B 3/18; B32B 3/22; B32B 3/30; B32B 3/263; B32B 3/266; A01M 29/08
See application file for complete search history.

(56) References Cited

U.S. PATENT DOCUMENTS

| | | | |
|---|---|---|---|
| 4,193,236 A | 3/1980 | Mazzoni et al. |
| 4,379,040 A | 4/1983 | Gillery |

(Continued)

FOREIGN PATENT DOCUMENTS

| | | |
|---|---|---|
| WO | 2014099476 A1 | 6/2014 |
| WO | 2020035818 A1 | 2/2020 |

(Continued)

OTHER PUBLICATIONS

EP 3541181 (Year: 2023).*

(Continued)

*Primary Examiner* — Elizabeth E Mulvaney
(74) *Attorney, Agent, or Firm* — The Webb Law Firm

(57)          ABSTRACT

A coated article includes a substrate comprising a first side comprising a first surface and a second side comprising a second surface, wherein the second surface is opposite the first surface and a functional coating positioned over at least a portion of the second side. The functional coating includes a base layer positioned over at least a portion of the second surface, wherein the base layer includes a first film positioned over at least a portion of the second surface and a second film positioned over at least a portion of the first film; a metallic layer positioned over at least a portion of the base layer; and a top layer positioned over at least a portion of the metallic layer. The second side comprises a patterned feature. Methods of making a coated article and an insulating glass unit are also provided.

19 Claims, 21 Drawing Sheets

(51) Int. Cl.
  *B32B 3/14* (2006.01)
  *B32B 3/18* (2006.01)
  *E06B 3/67* (2006.01)

(56) References Cited

U.S. PATENT DOCUMENTS

| | | | |
|---|---|---|---|
| 4,464,874 | A | 8/1984 | Shea, Jr. et al. |
| 4,466,562 | A | 8/1984 | DeTorre |
| 4,671,155 | A | 6/1987 | Goldinger |
| 4,746,347 | A | 5/1988 | Sensi |
| 4,792,536 | A | 12/1988 | Pecoraro et al. |
| 4,861,669 | A | 8/1989 | Gillery |
| 4,898,789 | A | 2/1990 | Finley |
| 4,898,790 | A | 2/1990 | Finley |
| 4,900,633 | A | 2/1990 | Gillery |
| 4,920,006 | A | 4/1990 | Gillery |
| 4,938,857 | A | 7/1990 | Gillery |
| 5,030,593 | A | 7/1991 | Heithoff |
| 5,030,594 | A | 7/1991 | Heithoff |
| 5,088,258 | A | 2/1992 | Schield et al. |
| 5,106,663 | A | 4/1992 | Box |
| 5,240,886 | A | 8/1993 | Gulotta et al. |
| 5,328,768 | A | 7/1994 | Goodwin |
| 5,385,872 | A | 1/1995 | Gulotta et al. |
| 5,393,593 | A | 2/1995 | Gulotta et al. |
| 5,492,750 | A | 2/1996 | Shumaker, Jr. et al. |
| 8,114,503 | B2 * | 2/2012 | Klem, Jr. ............. A01M 29/06 |
| | | | 428/409 |
| 9,247,726 | B2 | 2/2016 | Cesnik et al. |
| 9,650,290 | B2 | 5/2017 | Vikor et al. |
| 10,843,961 | B2 | 11/2020 | Weng et al. |
| 2006/0070348 | A1 | 4/2006 | Choate et al. |
| 2006/0147727 | A1 | 7/2006 | Glenn et al. |
| 2007/0190343 | A1 | 8/2007 | Arkles |
| 2012/0113519 | A1 | 5/2012 | Klem, Jr. |
| 2013/0323442 | A1 | 12/2013 | Krasnov |
| 2013/0323477 | A1 | 12/2013 | Depauw et al. |
| 2014/0168760 | A1 * | 6/2014 | Theios ............... C03C 17/3681 |
| | | | 359/359 |
| 2016/0137850 | A1 | 5/2016 | Ridealgh et al. |
| 2017/0020123 | A1 | 1/2017 | Arnold et al. |
| 2020/0396983 | A1 | 12/2020 | Sobolev |
| 2021/0222486 | A1 | 7/2021 | Veerasamy |
| 2023/0112850 | A1 | 4/2023 | Smith et al. |

FOREIGN PATENT DOCUMENTS

| | | |
|---|---|---|
| WO | 2020065664 A1 | 4/2020 |
| WO | 2020255088 A1 | 12/2020 |

OTHER PUBLICATIONS

"Bird-Friendly Glass Legislation", Vitro Architectural Glass, 2021, http://inspirescapes.vitroglazings.com/bird-friendly-glass-legislation#:~:text=One%20of%20the%20most%20common,to%2090%25%20of%20bird%20collisions, pp. 1-7.

* cited by examiner

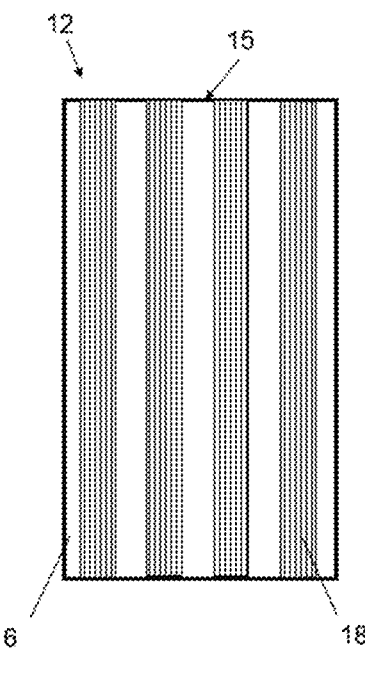
FIG. 1A
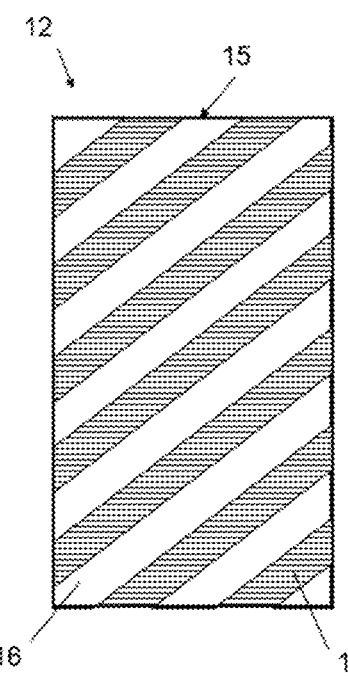
FIG. 1B
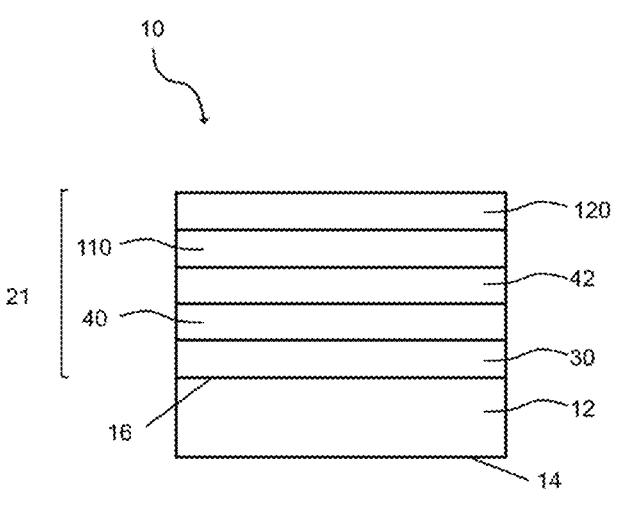
FIG. 1C
FIG. 2A

WINDOW UNIT FOR REDUCING BIRD COLLISIONS AND METHODS OF MAKING THE SAME

CROSS-REFERENCE TO RELATED APPLICATIONS

This application claims priority to U.S. Provisional Application No. 63/451,677 filed Mar. 13, 2023, the disclosure of which is hereby incorporated by reference in its entirety.

BACKGROUND OF THE INVENTION

Field of the Invention

This invention relates generally to coated articles having a functional coating and a patterned feature on the second side of a substrate, such as a glass substrate.

SUMMARY OF THE INVENTION

The invention relates to a coated article comprising a substrate comprising a first side comprising a first surface and a second side comprising a second surface, wherein the second surface is opposite the first surface and a functional coating positioned over at least a portion of the second side. The functional coating comprises: a base layer positioned over at least a portion of the second surface, wherein the base layer comprises a first film positioned over at least a portion of the second surface, and a second film positioned over at least a portion of the first film; a metallic layer positioned over at least a portion of the base layer; and a top layer positioned over at least a portion of the metallic layer. The second side comprises a patterned feature.

The invention also relates to a method of making a coated article. The method comprises: providing a substrate comprising a first side comprising a first surface and a second side comprising a second surface, wherein the second surface is opposite the first surface; forming a functional coating over at least a portion of the second side, wherein forming the functional coating comprises: forming a base layer over at least a portion of the second surface, wherein forming the base layer comprises: forming a first film over at least a portion of the second surface, and forming a second film over at least a portion of the first film; forming a metallic layer over at least a portion of the base layer; and forming a top layer over at least a portion of the metallic layer. The second side comprises a patterned feature.

The invention also relates to an insulating glass unit comprising: a first ply comprising a first side comprising a No. 1 surface and a second side comprising a No. 2 surface, wherein the No. 2 surface is opposite the No. 1 surface, a second ply comprising a first side comprising a No. 3 surface and a second side comprising a No. 4 surface, wherein the No. 4 surface is opposite the No. 3 surface; the first ply and second ply are connected together; and a functional coating positioned over at least a portion of the second side comprising the No. 2 surface. The functional coating comprises: a base layer positioned over at least a portion of the No. 2 surface, wherein the base layer comprises: a first film positioned over at least a portion of the No. 2 surface, and a second film positioned over at least a portion of the first film; a metallic layer positioned over at least a portion of the base layer; and a top layer positioned over at least a portion of the metallic layer. The second side comprising the No. 2 surface comprises a patterned feature.

The invention also relates to a coated article comprising a substrate comprising a first side comprising a first surface and a second side comprising a second surface, wherein the second surface is opposite the first surface and a functional coating positioned over at least a portion of the second side. The functional coating comprising: a base layer positioned over at least a portion of the second surface, wherein the base layer comprises a first film positioned over at least a portion of the second surface, and a second film positioned over at least a portion of the first film; a metallic layer positioned over at least a portion of the base layer; a second layer over at least a portion of the metallic layer; a second metallic layer over at least a portion of the second layer; a third layer over at least a portion of the second metallic layer; a third metallic layer over at least a portion of the third layer, and a top layer positioned over at least a portion of the third metallic layer. The second side comprises a patterned feature.

The invention also relates to a method of making a coated article. The method comprises: providing a substrate comprising a first side comprising a first surface and a second side comprising a second surface, wherein the second surface is opposite the first surface; forming a functional coating over at least a portion of the second side, wherein forming the functional coating comprises: forming a base layer over at least a portion of the second surface, wherein forming the base layer comprises: forming a first film over at least a portion of the second surface, and forming a second film over at least a portion of the first film; forming a metallic layer over at least a portion of the base layer; forming a second layer over at least a portion of the metallic layer; forming a second metallic layer over at least a portion of the second layer; forming a third layer over at least a portion of the second metallic layer; forming a third metallic layer over at least a portion of the third layer; and forming a top layer over at least a portion of the third metallic layer. The second side comprises a patterned feature.

The invention also relates to an insulating glass unit comprising: a first ply comprising a first side comprising a No. 1 surface and a second side comprising a No. 2 surface, wherein the No. 2 surface is opposite the No. 1 surface, a second ply comprising a first side comprising a No. 3 surface and a second side comprising a No. 4 surface, wherein the No. 4 surface is opposite the No. 3 surface, and wherein the first ply and second ply are connected together; a functional coating positioned over at least a portion of the second side comprising the No. 2 surface. The functional coating comprises: a base layer positioned over at least a portion of the No. 2 surface, wherein the base layer comprises: a first film positioned over at least a portion of the No. 2 surface, and a second film positioned over at least a portion of the first film; a metallic layer positioned over at least a portion of the base layer; a second layer over at least a portion of the metallic layer; a second metallic layer over at least a portion of the second layer; a third layer over at least a portion of the second metallic layer; a third metallic layer over at least a portion of the third layer, and a top layer positioned over at least a portion of the third metallic layer. The second side comprising the No. 2 surface comprises a patterned feature.

BRIEF DESCRIPTION OF THE DRAWINGS

The invention will be described with reference to the following drawing figures wherein like reference numbers identify the parts throughout.

FIGS. 1A-1C are front views (not to scale) of substrates having a patterned feature comprising microabrasions on the second surface of the substrate. Horizontal microabrasions are shown in FIG. 1A, vertical microabrasions are shown in FIG. 1B, and diagonal microabrasions are shown in FIG. 1C, where the microabrasions are on the second surface of a substrate.

FIGS. 2A-2C are sectional views (not to scale) of a single metal coating according to an example of the invention. FIG. 2A is a single metal coating comprising a substrate, a base layer, a metallic layer, a primer layer, a top layer, and a protective coating. FIG. 2B is the single metal coating of FIG. 2A depicting the base layer comprising two films, the top layer comprising two films, and a protective coating comprising two films. FIG. 2C is the single metal coating of FIG. 2A depicting the base layer comprising two films, the top layer comprising three films, and a protective coating comprising two protective films.

FIG. 3A is a double metal coating comprising a substrate, a base layer, a metallic layer, a primer layer, a second layer, a second metallic layer, a primer layer, a top layer, and a protective coating. FIG. 3B is the double metal coating of FIG. 3A depicting the base layer comprising two films, the second layer comprising three films, the top layer comprising two films, and a protective coating comprising two protective films. FIG. 3C is the double metal coating of FIG. 3A depicting the base layer comprising three films, the second layer comprising three films, the top layer comprising three films, and a protective coating comprising two protective films.

FIG. 4A is a triple metal coating comprising a substrate, a base layer, a metallic layer, a primer layer, a second layer, a second metallic layer, a second primer layer, a third layer, a third metallic layer, a third primer layer, a top layer, and a protective coating. FIG. 4B is the triple metal coating of FIG. 4A depicting the base layer comprising two films, the second layer comprising three films, the third layer comprising three films, the top layer comprising two films, and a protective coating comprising two protective films. FIG. 4C is the triple metal coating of FIG. 4A depicting the base layer comprising two films, the second layer comprising three films, the third layer comprising three films, the top layer comprising three films, and a protective coating comprising two protective films.

FIG. 5A is a quadruple metal coating comprising a substrate, a base layer, a metallic layer, a primer layer, a second layer, a second metallic layer, a second primer layer, a third layer, a third metallic layer, a third primer layer, a fourth layer, a fourth metallic layer, a fourth primer layer, a top layer, and a protective coating. FIG. 5B is the quadruple metal coating of FIG. 5A depicting the base layer comprising two films, the second layer comprising three films, the third layer comprising three films, the fourth film comprising three films, the top layer comprising two films, and a protective coating comprising two protective films. FIG. 5C is the quadruple metal coating of FIG. 5A depicting the base layer comprising two films, the second layer comprising three films, the third layer comprising three films, the fourth layer comprising three films, the top layer comprising three films, and a protective coating comprising two protective films.

DESCRIPTION OF THE INVENTION

Figure 2B:
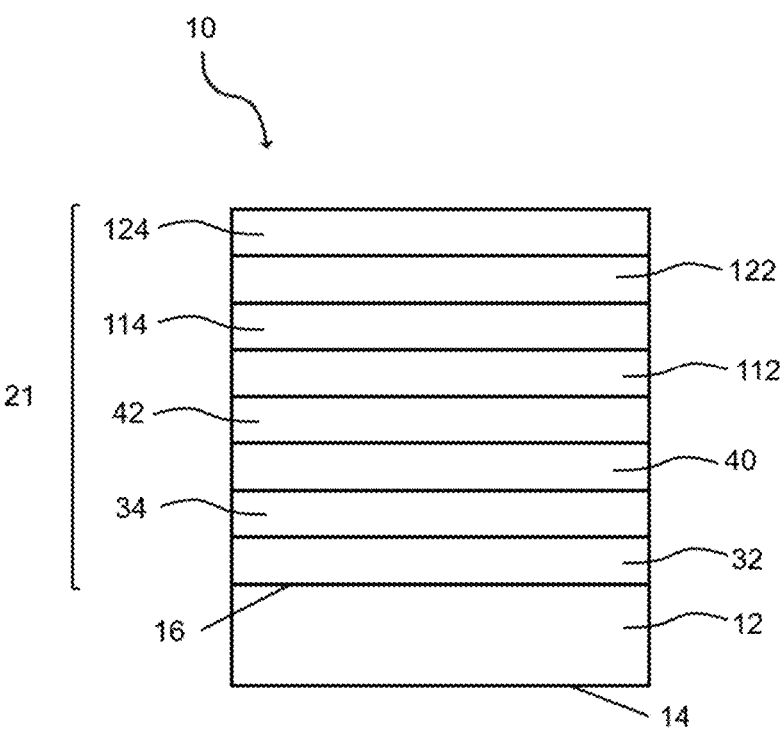

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. The terms "visible region", "visible light", or "visible light spectrum" refer to electromagnetic radiation having a wavelength in the range of 380 nm to 800 nm. The terms "infrared region", "infrared radiation", or "infrared spectrum" refer to electromagnetic radiation having a wavelength in the range of greater than 800 nm to 100,000 nm. The terms "ultraviolet region", "ultraviolet radiation", or "ultraviolet (UV) spectrum" mean electromagnetic energy having a wavelength in the range of 300 nm to less than 380 nm. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers". The term "asymmetrical reflectivity" means that the visible light reflectance of the coating from one side is different than that of the coating from the opposite side. The term "critical thickness" means a thickness above which a coating material forms a continuous, uninterrupted layer and below which the coating material forms discontinuous regions or islands of the coating material rather than a continuous layer. The term "subcritical thickness" means a thickness below the critical thickness such that the coating material forms isolated, non-connected regions of the coating material. The term "islanded" means that the coating material is not a continuous layer but, rather, that the material is deposited to form isolated regions or islands.

Weight percentages (wt. %) of the metal oxides, metal alloys, metal nitrides, or metal oxynitrides, as used herein, are based on the total weight of the metal components and exclude the weight of any oxide, nitride, or oxynitride components.

The invention is directed to a coated article. The coated article comprises a substrate comprising a first side comprising a first surface and a second side comprising a second surface, where the second surface is opposite the first surface. The second side of the substrate comprises a patterned feature. The coated article further comprises a functional coating positioned over at least a portion of the second side. The functional coating comprises a base layer positioned over at least a portion of the second surface, wherein the base layer comprises a first film positioned over at least a portion of the second surface, and a second film positioned over at least a portion of the first film. The functional coating further comprises a metallic layer positioned over at least a portion of the base layer. The functional coating further comprises a top layer positioned over at least a portion of the metallic layer. Optionally, the functional coating may further comprise a primer layer, a second layer, a second primer layer, a second metallic layer, a third layer, a third primer layer, a third metallic layer, a fourth layer, a fourth primer layer, a fourth metallic layer, and/or an outermost protective coating.

The coated article 10 comprises a substrate 12. The substrate 12 can be of any desired material having any desired characteristics, such as opaque, translucent, or transparent to visible light. For example, the substrate 12 can be transparent or translucent to visible light. By "transparent" is meant having visible light transmission of greater than 0% up to 100%. Alternatively, the substrate 12 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, the substrate 12 can be conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The substrate 12 may comprise, for example, clear float glass or can be tinted or colored glass. The substrate 12 can be of any desired dimensions, e.g., length, width, shape, or thickness. In one non-limiting embodiment in which the substrate is an architectural transparency, the substrate 12 may be 1 mm to 30 mm thick, such as 2.5 mm to 25 mm thick, such as 2.5 mm to 10 mm. As used herein, the term "architectural transparency" refers to any transparency located on a building, such as, but not limited to, windows and sky lights. However, it is to be understood that the invention is not limited to use with such architectural transparencies but could be practiced with transparencies in any desired field, such as, but not limited to, laminated or non-laminated residential and/or commercial windows, insulating glass units, and/or transparencies for land, air, space, above water and underwater vehicles, as well as personal transparencies such as glasses and the like. Therefore, it is to be understood that the specifically disclosed exemplary embodiments are presented simply to explain the general concepts of the invention, and that the invention is not limited to these specific exemplary embodiments. Additionally, while a typical "transparency" can have sufficient visible light transmission such that materials can be viewed through the transparency, in the practice of the invention, the "transparency" need not be transparent to visible light but may be translucent or opaque.

In some embodiments, the substrate 12 can be a monolithic glazing. By "monolithic" is meant having a single structural support or structural member, e.g. having a single substrate.

The substrate 12 comprises a first side comprising a first surface 14 and a second side comprising a second surface 16, where the second surface 16 is opposite the first surface 14.

The second side of the substrate 12 includes a patterned feature. As used herein, "patterned feature" refers to a design or designs across the substrate, where the design could be a repeated design across the substrate. The patterned feature may include a symmetric pattern. The patterned feature may include an asymmetric pattern.

The patterned feature can be formed in the second surface 16 of the second side of the substrate 12 and can comprise microabrasions 18. As used herein "microabrasions" refer to areas of a substrate that have been worn away by a chemical or mechanical process. Non-limiting embodiments of microabrasions 18 formed in the second surface 16 of the substrate 12 are shown in FIGS. 1A-1C.

The microabrasions 18 formed in the second surface 16 of the substrate 12 may comprise a symmetric pattern. For example, the symmetric patterned microabrasions 18 formed in the second surface 16 of the substrate 12 may comprise a width of at least 0.1 inch (2.54 mm), at least 0.25 inch (6.35 mm), at least 0.5 inch, at least 0.75 inch (19.05 mm), at least 1 inch (25.4 mm), or at least 2 inches (50.8 mm). The microabrasions 18 formed in the second surface 16 of the substrate 12 may be spaced 1 inch (25.4 mm) or less apart from one another across the second surface 16 of the substrate 12. For example, the microabrasions 18 may be spaced at least 0.1 inch (2.54 mm), at least 0.25 inch (6.35 mm), at least 0.5 inch (12.7 mm), at least 0.75 inch (19.05 mm), or 1 inch (25.4 mm) from each other across the second surface 16 of the substrate 12. Alternatively, the microabrasions 18 may be spaced by at least 2 inches (50.8 mm), at least 3 inches (76.2 mm), or at least 4 inches 101.6 mm), across the second surface 16 of the substrate 12. The microabrasions 18 may be positioned horizontally across the second surface 16 of the substrate 12, relative to the top edge 15 of the substrate 12, as shown in FIG. 1A. When the substrate 12 is an architectural transparency installed in a building, the top edge 15 of the substrate 12 is positioned closest to the roof of the building and is parallel to the roof of the building. When the microabrasions 18 are positioned horizontally across the second surface 16 of the substrate 12, the microabrasions 18 are parallel to the top edge 15 of the substrate 12. Alternatively, the microabrasions 18 may be positioned vertically across the second surface 16 of the substrate 12, such that the microabrasions 18 on the second surface 16 of the substrate 12 are positioned in the direction of gravity, as shown in FIG. 1B. Alternatively, the microabrasions 18 may be positioned diagonally across the second surface 16 of the substrate 12, as shown in FIG. 1C. In one non-limiting embodiment, the microabrasions 18 are positioned horizontally across the second surface 16 of the substrate 12 and are spaced 1 inch or less apart from one another. In one non-limiting embodiment, the microabrasions 18 are positioned horizontally across the second surface 16 of the substrate 12 and are spaced apart from one another by at least 2 inches. In one non-limiting embodiment, the microabrasions 18 are positioned vertically across the second surface 16 of the substrate 12 and are spaced 1 inch or less apart from one another. In one non-limiting embodiment, the microabrasions 18 are positioned vertically across the second surface 16 of the substrate 12 and are spaced apart from one another by at least 4 inches.

The microabrasions 18 formed in the second surface 16 of the substrate 12 may comprise an asymmetric pattern. The asymmetric patterned microabrasions 18 formed in the second surface 16 of the substrate 12 may be in the form of a plurality of overlapping, randomly oriented stripes, such as those described in U.S. Pat. No. 9,247,726 B2. The stripes of the asymmetric pattern may comprise a width of from 0.125 inch (3.175 mm) to 1 inch (25.4 mm). For example, the stripes of the asymmetric pattern may comprise a width of 0.125 inch (3.175 mm), such as 0.25 inch (6.35 mm), such as 0.5 inch, such as 0.75 inch (19.05 mm), or such as 1 inch (25.4 mm). The stripes of the asymmetric pattern may all comprise the same width. The stripes of the asymmetric pattern may comprise different widths. The asymmetric patterned microabrasions 18 formed in the second surface 16 of the substrate 12 may be in the form of a spider web design, such as the spider web design described in U.S. Pat. No. 9,247,726 B2. A functional coating 20 can be applied onto the second side of the substrate 12, where the second side comprises the second surface 16. The functional coating 20 may be a solar control coating. As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity, etc. The functional coating 20 can block, absorb, or filter selected portions of the solar spectrum, such as, but not limited to, the IR, UV, and/or visible spectrums.

The functional coatings 20 described herein can be deposited by any useful method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as, magnetron sputter vapor deposition (MSVD)). Other coating methods could also be used, such as, but not limited to, sol-gel deposition, slot die coating deposition, or printing depositions, such as, screen printing or ink jet printing. In one non-limiting embodiment, the functional coating 20 is deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

The functional coating 20 is applied over at least a portion of the second side of the substrate 12, where the second side comprises a patterned feature. In one embodiment, the functional coating 20 may be applied over the second side of the substrate 12, where a patterned feature has been formed in the second surface 16 of the substrate 12. For example, the functional coating 20 may be applied over the second side of the substrate 12, where the second surface 16 of the second side of the substrate 12 comprises microabrasions 18. In an alternative embodiment, the functional coating 20 positioned over at least a portion of the second side of the substrate 12 includes the patterned feature. When the functional coating 20 positioned over at least a portion of the second side of the substrate 12 includes the patterned feature, there are no microabrasions 18 formed in the second surface 16 of the substrate 12.

Figure 2C:
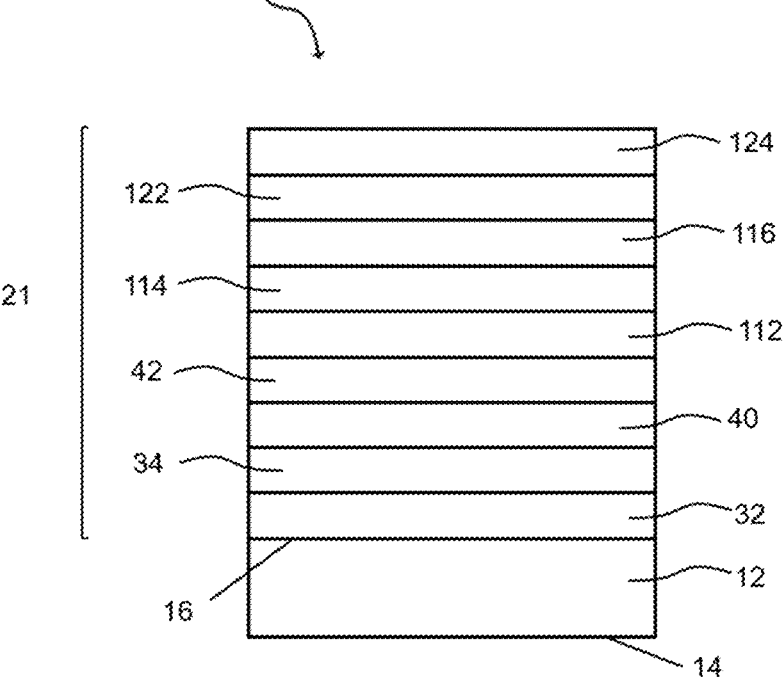
Figure 3A:
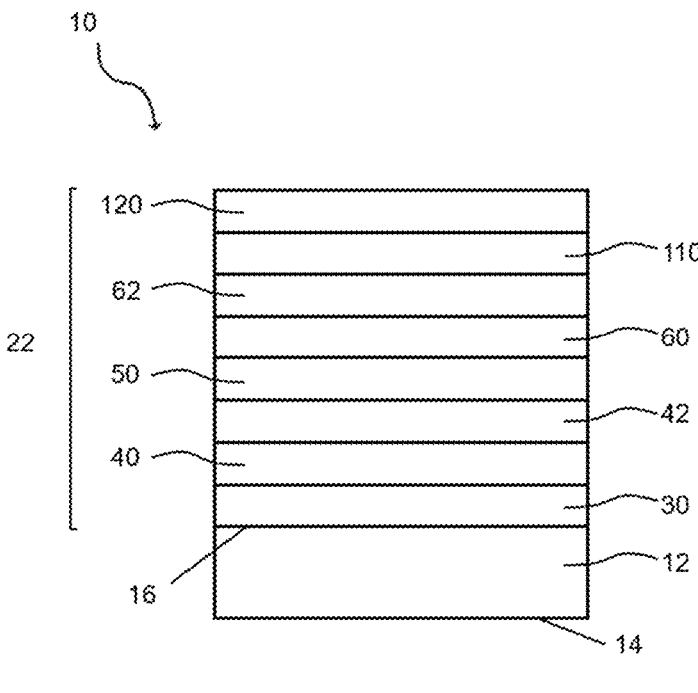
FIGS. 3A-3C are sectional views (not to scale) of a double metal coating according to an example of the invention.
Figure 3B:
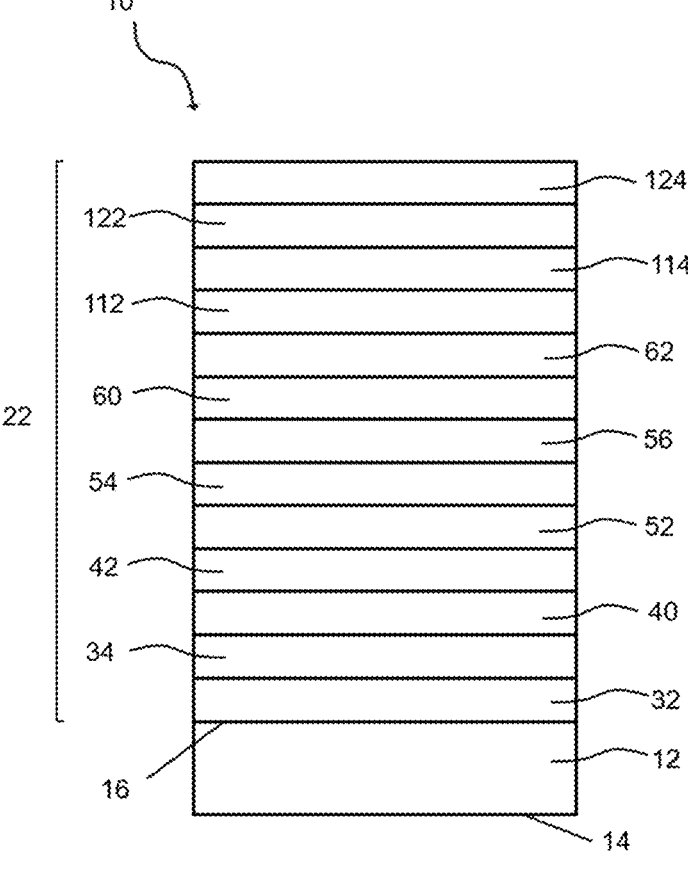
Figure 3C:
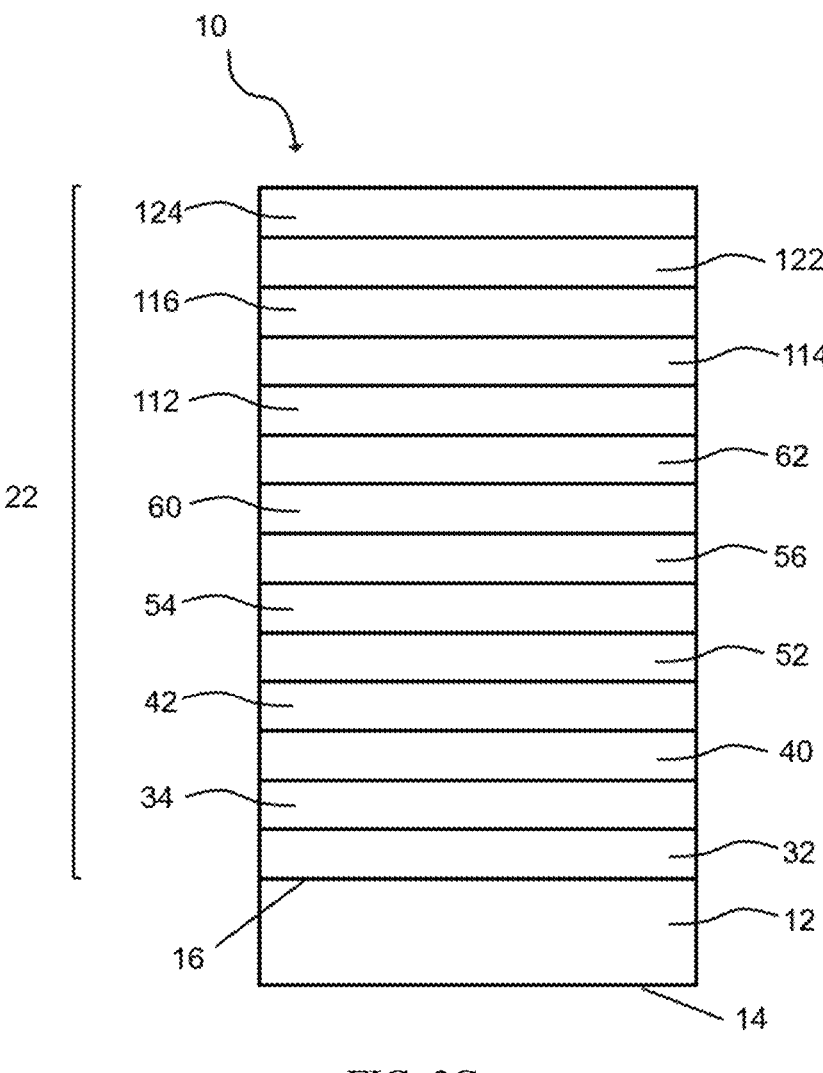
Figure 4A:
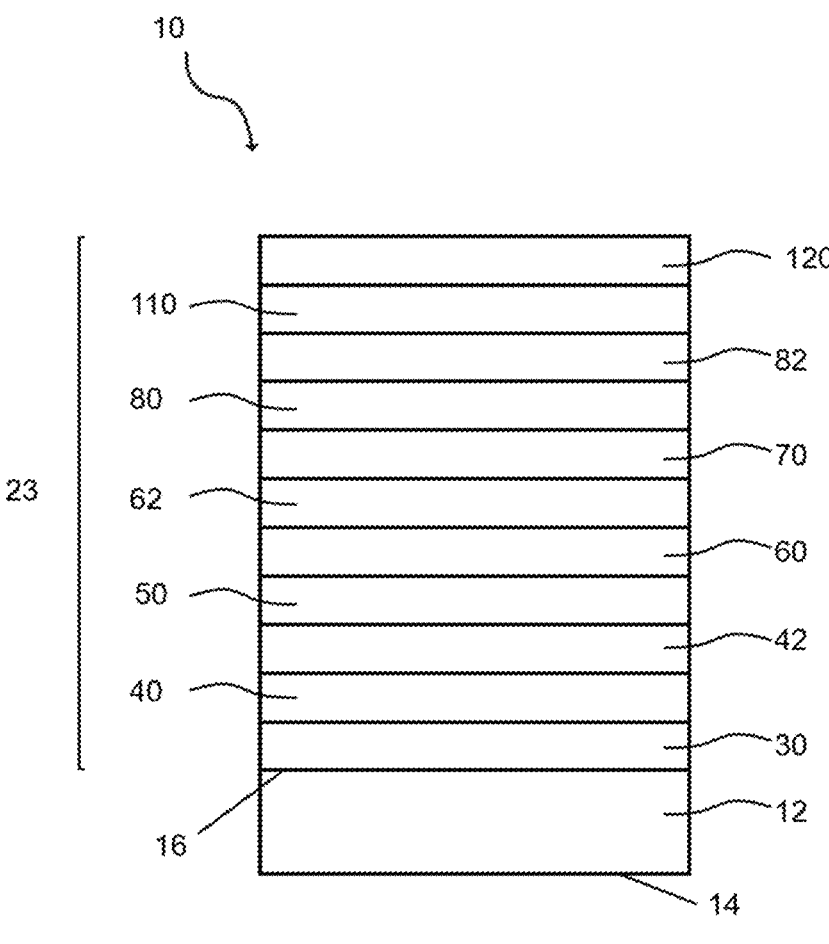
FIGS. 4A-4C are sectional views (not to scale) of a triple metal coating according to an example of the invention.
Figure 4B:
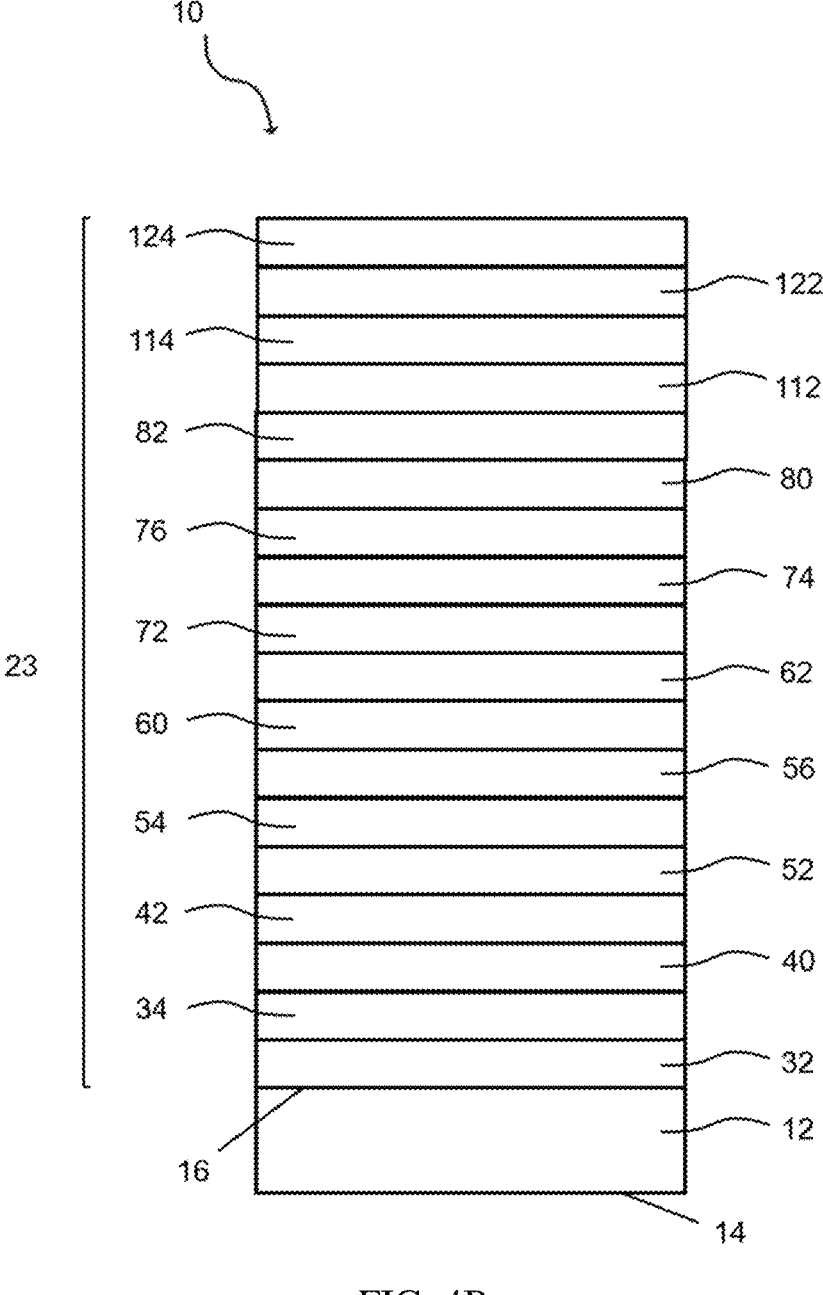
Figure 4C:
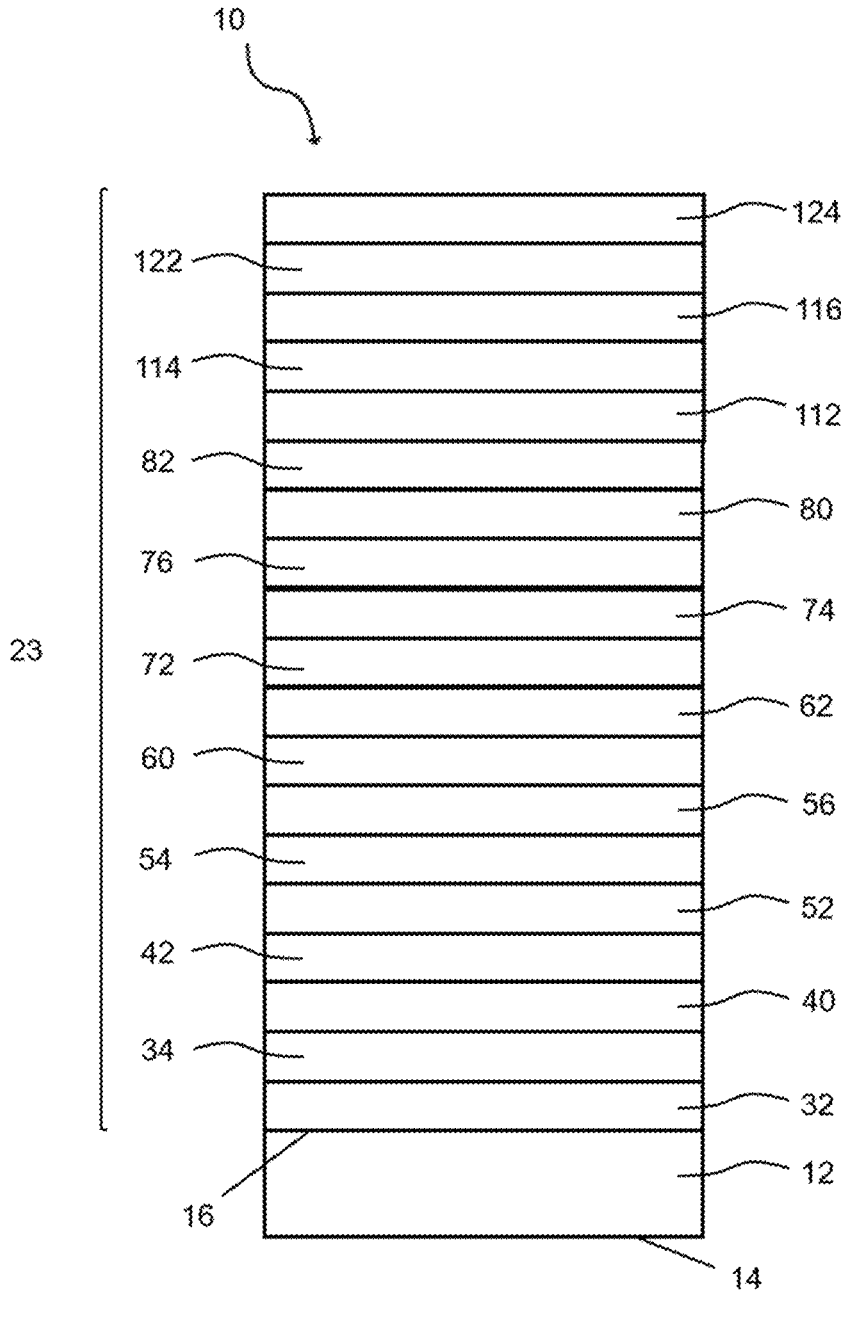
Figure 5A:
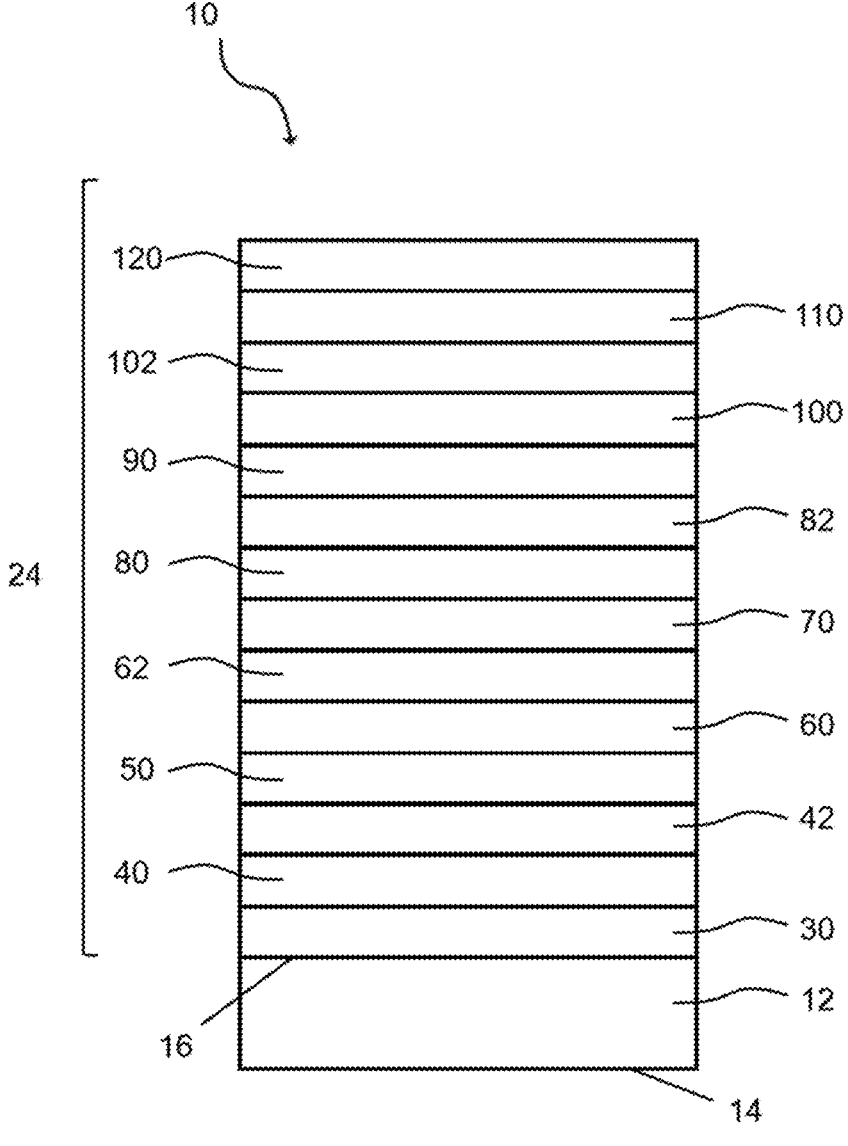
FIGS. 5A-5C are sectional views (not to scale) of a quadruple coating according to an example of the invention.
Figure 5B:
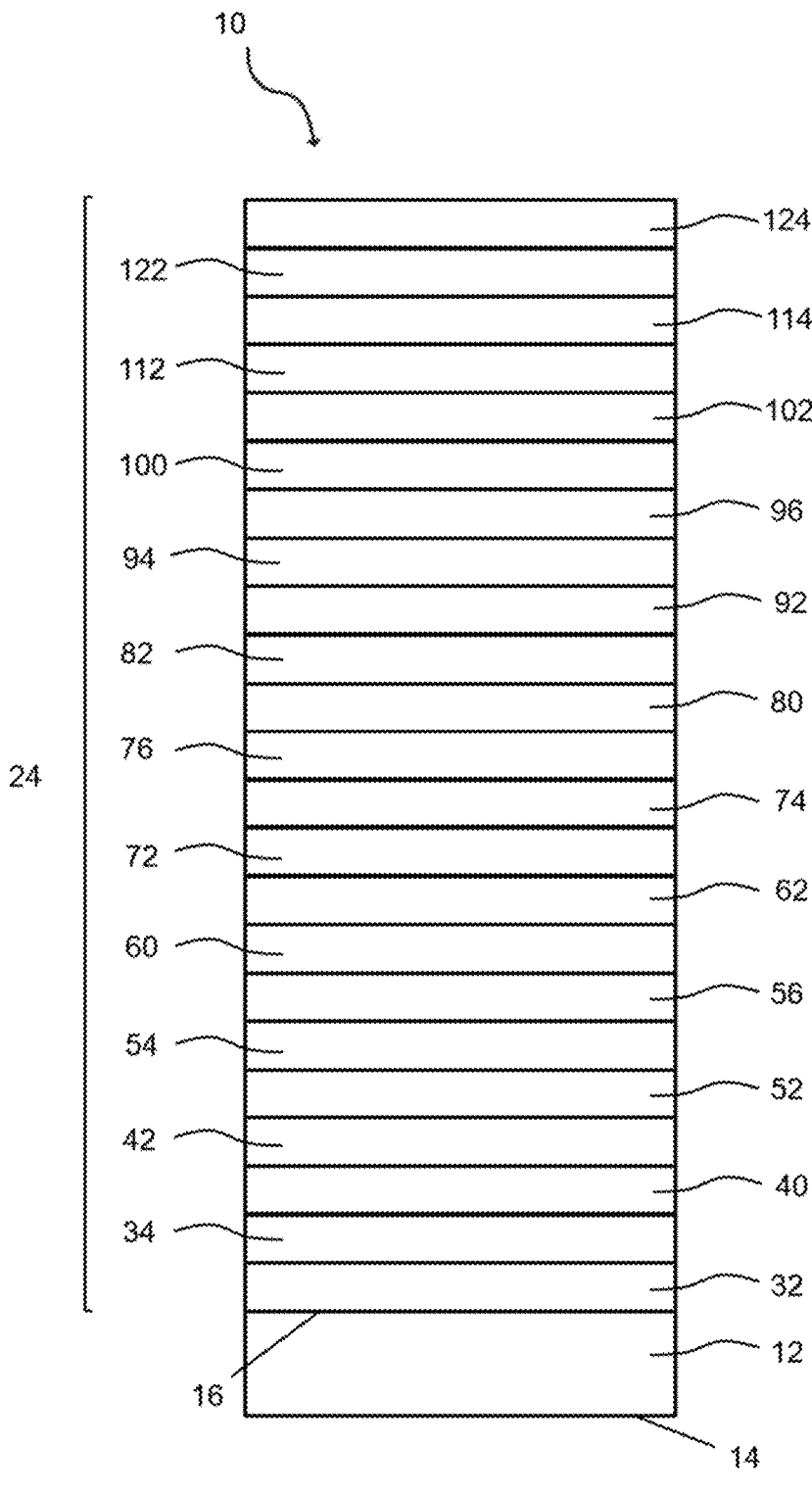
Figure 5C:
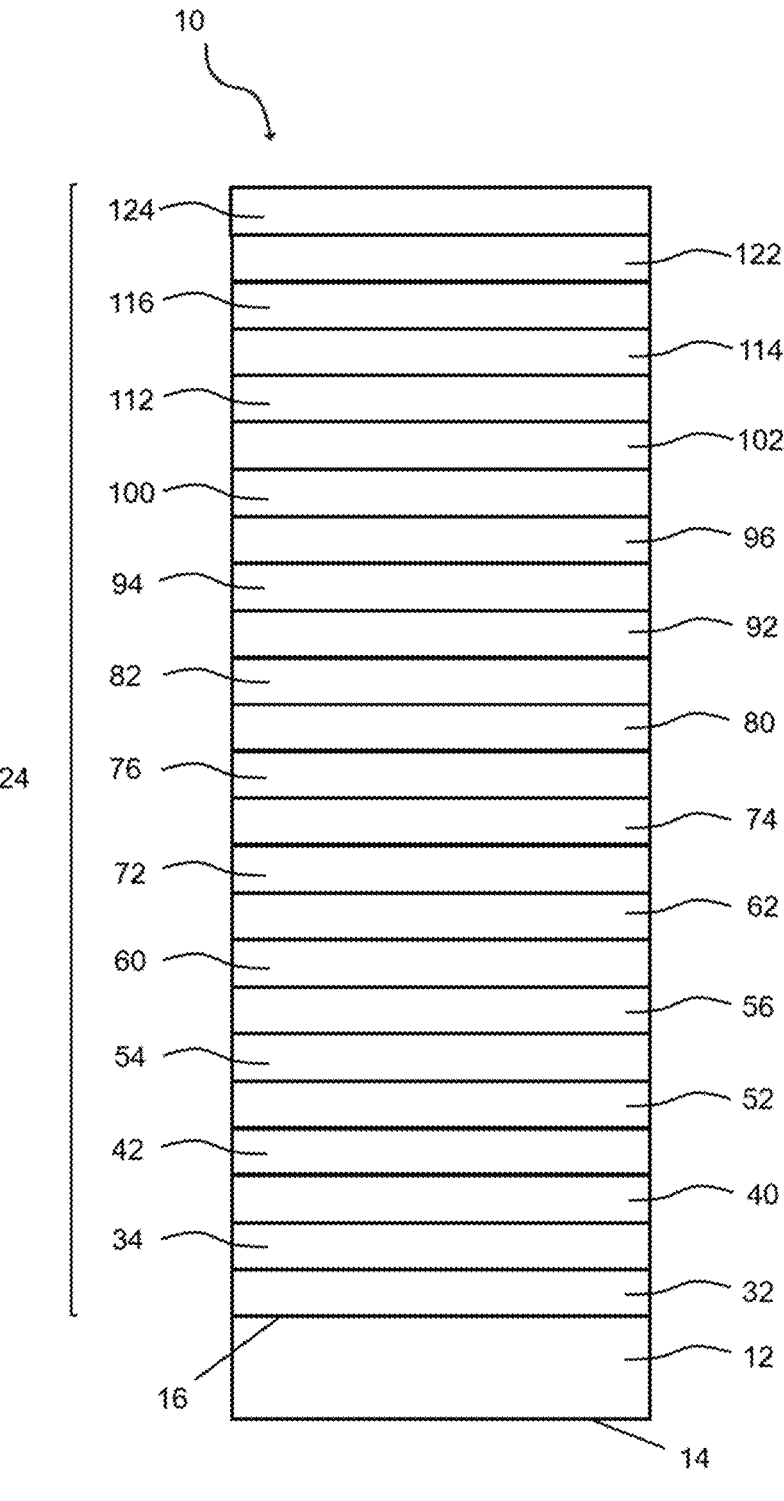

The functional coating 20 can be a single metal coating 21 (e.g., one metallic layer), or a double metal coating 22 (e.g., two metallic layers), or a triple metal coating 23 (e.g., three metallic layers), or a quadruple metal coating 24 (e.g., four metallic layers). Exemplary non-limiting coatings suitable for the single metal coating 21 are shown in FIGS. 2A-2C. Exemplary non-limiting coatings suitable for the double metal coating 22 are shown in FIGS. 3A-3C. Exemplary non-limiting coatings suitable for the triple metal coating 23 are shown in FIGS. 4A-4C. Exemplary non-limiting coatings suitable for the quadruple metal coating 24 are shown in FIGS. 5A-5C.

An exemplary functional coating 20 includes one metallic layer (i.e., a single metal coating 21), as shown in FIG. 2A. The single metal coating 21 includes a base layer 30 positioned over and in direct contact with the second surface 16 of the substrate 12. The base layer 30 may be positioned over and in direct contact with a portion or the entire second surface 16 of the substrate 12). A metallic layer 40 is positioned over or in direct contact with at least a portion of the base layer 30. An optional first primer layer 42 may be positioned over or in direct contact with at least a portion of the metallic layer 40. A top layer 110 is positioned over or in direct contact with at least a portion of the optional first primer layer 42 or the metallic layer 40. An optional outermost protective coating 120 may be positioned over or in direct contact with at least a portion of the top layer 110.

An exemplary functional coating 20 includes two metallic layers (i.e., a double metal coating 22), as shown in FIG. 3A. The double metal coating 22 includes a base layer 30 positioned over and in direct contact with the second surface 16 of the substrate 12. The base layer 30 may be positioned over and in direct contact with a portion of or the entire second surface 16 of the substrate 12. A metallic layer 40 is positioned over or in direct contact with at least a portion of the base layer 30. An optional first primer layer 42 may be positioned over or in direct contact with at least a portion of the metallic layer 40. A second layer 50 is positioned over at least a portion of the optional first primer layer 42 or the metallic layer 40. A second metallic layer 60 is positioned over or in direct contact with at least a portion of the second layer 50. An optional second primer layer 62 is positioned over or in direct contact with at least a portion of the second metallic layer 60. A top layer 110 is positioned over or in direct contact with at least a portion of the optional second primer layer 62 or the second metallic layer 60. An optional outermost protective coating 120 may be positioned over or in direct contact with at least a portion of the top layer 110.

An exemplary functional coating 20 includes three metallic layers (i.e., a triple metal coating 23), as shown in FIG. 4A. The triple metal coating 23 includes a base layer 30 positioned over and in direct contact with the second surface 16 of the substrate 12. The base layer 30 may be positioned over and in direct contact with a portion of or the entire second surface 16 of the substrate 12. A metallic layer 40 is positioned over or in direct contact with at least a portion of the base layer 30. An optional first primer layer 42 may be positioned over or in direct contact with at least a portion of the metallic layer 40. A second layer 50 is positioned over at least a portion of the optional first primer layer 42 or the metallic layer 40. A second metallic layer 60 is positioned over or in direct contact with at least a portion of the second layer 50. An optional second primer layer 62 is positioned over or in direct contact with at least a portion of the second metallic layer 60. A third layer 70 is positioned over or in direct contact with at least a portion of the optional second primer layer 62 or the second metallic layer 60. A third metallic layer 80 is positioned over or in direct contact with at least a portion of the third layer 70. An optional third primer layer 82 is positioned over or in direct contact with at least a portion of the third metallic layer 80. A top layer 110 is positioned over or in direct contact with at least a portion of the optional third primer layer 82 or the third metallic layer 80. An optional outermost protective coating 120 may be positioned over or in direct contact with at least a portion of the top layer 110.

An exemplary functional coating 20 includes four metallic layers (i.e., a quadruple metal coating 24), as shown in FIG. 5A. The quadruple metal coating 24 includes a base layer 30 positioned over and in direct contact with the second surface 16 of the substrate 12. The base layer 30 may be positioned over and in direct contact with a portion of or the entire second surface 16 of the substrate 12. A metallic layer 40 is positioned over or in direct contact with at least a portion of the base layer 30. An optional first primer layer 42 may be positioned over or in direct contact with at least a portion of the metallic layer 40. A second layer 50 is positioned over at least a portion of the optional first primer layer 42 or the metallic layer 40. A second metallic layer 60 is positioned over or in direct contact with at least a portion of the second layer 50. An optional second primer layer 62 is positioned over or in direct contact with at least a portion of the second metallic layer 60. A third layer 70 is positioned over or in direct contact with at least a portion of the optional second primer layer 62 or the second metallic layer 60. A third metallic layer 80 is positioned over or in direct contact with at least a portion of the third layer 70. An optional third primer layer 82 is positioned over or in direct contact with at least a portion of the third metallic layer 80. A fourth layer 90 is positioned over or in direct contact with at least a portion of the optional third primer layer 82 or third metallic layer 80. A fourth metallic layer 100 is positioned over or in direct contact with at least a portion of the fourth layer 90. An optional fourth primer layer 102 is positioned over or in direct contact with at least a portion of the fourth metallic layer 100. A top layer 110 is positioned over or in direct contact with at least a portion of the optional fourth primer layer 102 or the fourth metallic layer 100. An optional outermost protective coating 120 may be positioned over or in direct contact with at least a portion of the top layer 110.

Any of the metallic layers 40, 60, 80, 100 described herein can be continuous or discontinuous.

Exemplary non-limiting functional coatings 20 of the invention are shown in FIGS. 2A-2C, 3A-3C, 4A-4C, and 5A-5C. The functional coating 20 is positioned over the second side of the substrate 12 and includes a base layer 30 positioned over and in direct contact with the second surface 16 of the substrate 12. The base layer 30 includes a first film 32. As shown in FIGS. 2B-2C, 3B-3C, 4B-4C, and 5B-5C, the base layer 30 includes a first film 32 positioned over and in direct contact with the second surface 16 of the substrate 12 and a second film 34 positioned over and in direct contact with the first film 32.

The functional coating 20 comprises a base layer 30 positioned over and in direct contact with the second surface 16 of the substrate 12. The base layer 30 may include a first film 32 positioned over and in direct contact with the second surface 16 of the substrate 12 and a second film 34 positioned over and in direct contact with the first film 32. The first film 32 may be positioned over and in direct contact with a portion of the second surface 16 of the substrate 12 or the entire second surface 16 of the substrate 12. The base layer 30 can be transparent to visible light.

The first film 32 of the base layer 30 can comprise metal or metal alloy oxides, nitrides, oxynitrides, or mixtures thereof. Examples of suitable metal oxides, metal nitrides, and/or metal oxynitrides include oxides, nitrides, and/or oxynitrides of titanium, hafnium, zirconium, niobium, zinc, bismuth, lead, indium, tin, aluminum, silicon and mixtures thereof. The metal oxides can have small amounts of other materials, such as manganese in bismuth oxide, tin in indium oxide, etc. Additionally, oxides or nitrides of metal alloys or metal mixtures can be used, such as oxides containing zinc and tin (e.g., zinc stannate, defined below), oxides of indium-tin alloys, silicon nitrides, silicon aluminum nitrides, or aluminum nitrides. Further, doped metal oxides, such as antimony or indium tin oxides or nickel or boron doped silicon oxides, can be used. Alternatively, the first film 32 of the base layer 30 can comprise a transparent conductive oxide. The transparent conductive oxide can be a doped metal oxide such as gallium-doped zinc oxide (GZO), aluminum-doped zinc oxide (AZO), indium-doped zinc oxide (IZO) magnesium-doped zinc oxide (MZO), or tin-doped indium oxide (ITO). The first film 32 of the base layer 30 may comprise silicon nitride, silicon oxide, silicon aluminum nitride, silicon aluminum oxide, silicon oxynitride, silicon aluminum oxynitride, zinc stannate, or tin oxide.

The first film 32 of the base layer 30 may comprise silicon nitride or silicon oxide and be sputtered from a single cathode containing silicon. The first film 32 of the base layer 30 may comprise silicon aluminum nitride or silicon aluminum oxide and be sputtered from two cathodes (e.g., one silicon and one aluminum) or from a single cathode containing both silicon and aluminum. The first film 32 of the base layer 30 may be silicon aluminum nitride or silicon aluminum oxide comprising from 5 wt. % to 20 wt. % aluminum and 95 wt. % to 80 wt. % silicon, such as 10 wt. % to 20 wt. % aluminum and 90 wt. % to 80 wt. % silicon, such as 20 wt. % to 25 wt. % aluminum and 80 wt. % to 75 wt. % silicon. The first film 32 of the base layer 30 may be silicon aluminum nitride or silicon aluminum oxide comprising silicon and aluminum in amount of at least 95 wt. % silicon and at least 5 wt. % aluminum. The first film 32 of the base layer 30 may be silicon aluminum nitride or silicon aluminum oxide comprising silicon and aluminum in an amount of at least 90 wt. % silicon and at least 10 wt. % aluminum. The first film 32 of the base layer 30 may be silicon aluminum nitride or silicon aluminum oxide comprising silicon and aluminum in an amount of at least 85 wt. % silicon and at least 15 wt. % aluminum. The first film 32 of the base layer 30 may be silicon aluminum nitride or silicon aluminum oxide comprising silicon and aluminum in an amount of at least 80 wt. % silicon and at least 20 wt. % aluminum. The first film 32 of the base layer 30 may be silicon aluminum nitride or silicon aluminum oxide comprising silicon and aluminum in an amount of at least 75 wt. % silicon and at least 25 wt. % aluminum.

The first film 32 of the base layer 30 may be formed by sputtering the silicon or silicon aluminum in a nitrogen ($N_2$) atmosphere that has a specific flow rate as to form an atmosphere of greater than 0% $N_2$ to less than or equal to 100% $N_2$. The flow rate is an approximation to the amount of $N_2$ in the atmosphere, but one of ordinary skill in the art would recognize that $N_2$ and/or oxygen ($O_2$) may leak into the coating chamber if there are any leaks from the external atmosphere into the coating chamber. For example, the $N_2$ flow rate (i.e. the concentration of $N_2$ in the atmosphere for the chamber where the material is being deposited) in the coating chamber can be in the range of 10% to 100%, such as 20% to 100%, such as 30% to 100%, such as 40% to 100%, such as 50% to 100%.

The first film 32 of the base layer 30 may be formed by sputtering the silicon or silicon aluminum in an oxygen ($O_2$) atmosphere that has a specific flow rate as to form an atmosphere of greater than 0% $O_2$ to less than or equal to 50% $O_2$. The flow rate is an approximation to the amount of $O_2$ in the atmosphere, but one of ordinary skill in the art would recognize that $N_2$ and/or $O_2$ may leak into the coating chamber if there are any leaks from the external atmosphere into the coating chamber. For example, the $O_2$ flow rate (i.e. the concentration of $O_2$ in the atmosphere for the chamber where the material is being deposited) in the coating chamber can be greater than 0%, such as in the range of 0% to 50%, such as 10% to 50%, such as 20% to 30%, such as 20% to 40%, such as 20% to 50%, such as 30% to 40%, or such as 30% to 50%.

The remainder of the atmosphere in either case ($N_2$ or $O_2$ atmosphere) can be an inert gas, such as, argon.

The tin oxide can be deposited in an oxygen ($O_2$) environment from a tin target or from a tin target that includes other materials to improve the sputtering characteristics of the target. For example, the $O_2$ flow rate (i.e., concentration of $O_2$ in the atmosphere for the chamber where the material is being deposited) can be up to 90% $O_2$, such as, 90% $O_2$, 85% $O_2$, 80% $O_2$, 75% $O_2$, or 70% $O_2$. The remainder of the atmosphere can be an inert gas, such as, argon. The tin oxide can be obtained from magnetron sputtering vacuum deposition from a target of tin or a target of tin and zinc. For example, the tin target can include a small amount (e.g., up to 20 wt. %, up to 15 wt. %, up to 10 wt. %, or up to 5 wt. %) of zinc. In which case, the resultant tin oxide film would include a small percentage of zinc oxide, e.g., up to 20 wt. % zinc oxide, e.g., up to 10 wt. % zinc oxide, e.g., up to 5 wt. % zinc oxide. A coating layer deposited from a tin target having up to from 0 wt. % to 20 wt. % zinc is referred to herein as "a tin oxide film". The first film 32 of the base layer 30 may be a tin oxide film where tin is substantially the only metal in the first film 32. As used herein, "substantially free" means that the tin oxide film contains less than 0.5 wt. % of additional metals other than tin. The tin oxide film 32 may include 80 wt. % tin oxide and 20 wt. % zinc oxide. The tin oxide film 32 may include 90% tin oxide and 10 wt. % zinc oxide.

By "zinc stannate" is meant a composition of $Zn_X$ $Sn_{1-X}O_{2-X}$ (Formula 1) where "x" varies in the range of greater than 0 to less than 1. For instance, "x" can be greater than 0 and can be any fraction or decimal between greater than 0 to less than 1. For example, where x=2/3, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the layer.

The first film 32 of the base layer 30 can comprise a total thickness of from 10 nm to 45 nm, such as, from 15 nm to 40 nm, such as, from 20 nm to 35 nm, such as, from 22 to 30 nm.

The second film 34 of the base layer 30 can comprise antireflective materials and/or dielectric materials, such as, but not limited to, metal or metal alloy oxides, nitrides, oxynitrides, or mixtures thereof. Examples of suitable metal oxides for the second film 34 of the base layer 30 include oxides of titanium, hafnium, zirconium, niobium, zinc, bismuth, lead, indium, tin, aluminum, silicon and mixtures thereof. These metal oxides can have small amounts of other materials, such as, manganese in bismuth oxide, tin in indium oxide, etc. Additionally, oxides of metal alloys or metal mixtures can be used, such as, oxides containing zinc and tin, oxides of indium-tin alloys, oxides containing zinc and aluminum, silicon nitrides, silicon aluminum nitrides, or aluminum nitrides. Further, doped metal oxides, such as, antimony or indium doped tin oxides or nickel or boron doped silicon oxides, can be used. The second film 34 of the base layer 30 can comprise a transparent conductive oxide. The transparent conductive oxide of the second film 34 of the base layer can be a doped metal oxide such as gallium-doped zinc oxide (GZO), aluminum-doped zinc oxide (AZO), indium-doped zinc oxide (IZO), magnesium-doped zinc oxide (MZO), or tin-doped indium oxide (ITO).

The second film 34 of the base layer 30 can be a zinc/tin alloy oxide. By "zinc/tin alloy oxide" is meant both true alloys, and mixtures of the oxides. Zinc oxide can be deposited from a zinc target that includes other materials to improve the sputtering characteristics of the target. As such, the zinc/tin alloy oxide can be obtained from magnetron sputtering vacuum deposition from a target of zinc and tin. For example, the zinc target can include a small amount (e.g., up to 20 wt. %, up to 15 wt. %, up to 10 wt. %, or up to 5 wt. %) of tin to improve sputtering. In which case, the resultant zinc oxide film would include a small percentage of tin oxide, e.g., up to 10 wt. % tin oxide, e.g., up to 5 wt. % tin oxide. A coating layer deposited from a zinc target having up to 10 wt. % tin (added to enhance the conductivity of the target) is referred to herein as "a zinc oxide film" even though a small amount of tin may be present. One non-limiting target can comprise zinc and tin in proportions of from 5 wt. % to 95 wt. % zinc and from 95 wt. % to 5 wt. % tin, such as, from 10 wt. % to 90 wt. % zinc and from 90 wt. % to 10 wt. % tin. However, other ratios of zinc to tin could also be used.

The second film 34 of the base layer 30 can comprise a film of zinc oxide or aluminum zinc oxide film ($Al_xZn_{1-x}$ oxide). By "aluminum/zinc alloy oxide" is meant both true alloys, and mixtures of the oxides. As such, the aluminum/zinc alloy oxide can be obtained from magnetron sputtering vacuum deposition from a target of zinc and aluminum and can include a small of amount (e.g. less than 10 wt. %, such as, greater than 0 to 5 wt. %) of tin to improve sputtering. In which case, the resultant aluminum zinc oxide film would include a small percentage of tin oxide, e.g. 0 wt. % to less than 10 wt. %, e.g., 0 wt. % to 5 wt. % tin oxide. The second film 34 of the base layer 30 can comprise $Al_xZn_{1-x}$ oxide, where x is within the range of 1 wt. % to 25 wt. %, such as, 1 wt. % to 15 wt. %, such as, 1 wt. % to 10 wt. %, such as, 2 wt. % to 5 wt. %. In one non-limiting embodiment, x is 3 wt. %.

The second film 34 of the base layer 30 can comprise a film of titanium oxide, which is defined as a compound comprising both titanium and oxygen. The titanium oxide may comprise, for example, titanium oxide, titanium aluminum oxide, titanium oxynitride, titanium aluminum oxynitride, or any mixtures thereof.

The second film 34 of the base layer 30 can comprise a total thickness of from 5 nm to 20 nm, such as, from 8 nm to 20 nm, such as, from 10 nm to 15 nm.

The first film 32 of the base layer 30 may comprise tin oxide positioned over and in direct contact with the second surface 16 of the substrate 12 and the second film 34 of the base layer 30 may comprise zinc oxide positioned over and in direct contact with the first film 32. Alternatively, the first film 32 of the base layer 30 may comprise zinc stannate positioned over and in direct contact with the second surface 16 of the substrate 12 and the second film 34 of the base layer 30 may comprise zinc oxide positioned over and in direct contact with the first film 32.

The first film 32 and the second film 34 of the base layer 30 may comprise the same material. For example, the first film 32 and the second film 34 of the base layer 30 may both comprise the same transparent conductive oxide, such as gallium-doped zinc oxide (GZO), aluminum-doped zinc oxide (AZO), indium-doped zinc oxide (IZO), magnesium-doped zinc oxide (MZO), or tin-doped indium oxide (ITO).

The base layer 30 may comprise three films. The base layer 30 may include a first film 32 positioned over and in direct contact with the second surface 16 of the substrate 12, a second film 34 positioned over and in direct contact with the first film 32, and a third film positioned over and in direct contact with the second film 34.

The first film 32 of the base layer 30 may comprise tin oxide positioned over and in direct contact with the second surface 16 of the substrate 12, the second film 34 may comprise zinc stannate positioned over and in direct contact with the first film 32, and the third film may comprise zinc oxide positioned over and in direct contact with the second film 34.

Alternatively, the base layer 30 may comprise a single film. For example, the base layer 30 may comprise a single film of a transparent conductive oxide, such as gallium-doped zinc oxide (GZO), aluminum-doped zinc oxide (AZO), indium-doped zinc oxide (IZO), magnesium-doped zinc oxide (MZO), or tin-doped indium oxide (ITO).

The base layer 30 can comprise a total thickness (e.g., combined thickness of the first and second films 32, 34) of from 20 nm to 50 nm, such as, from 25 nm to 45 nm, such as, from 30 nm to 45 nm.

Figure 6:
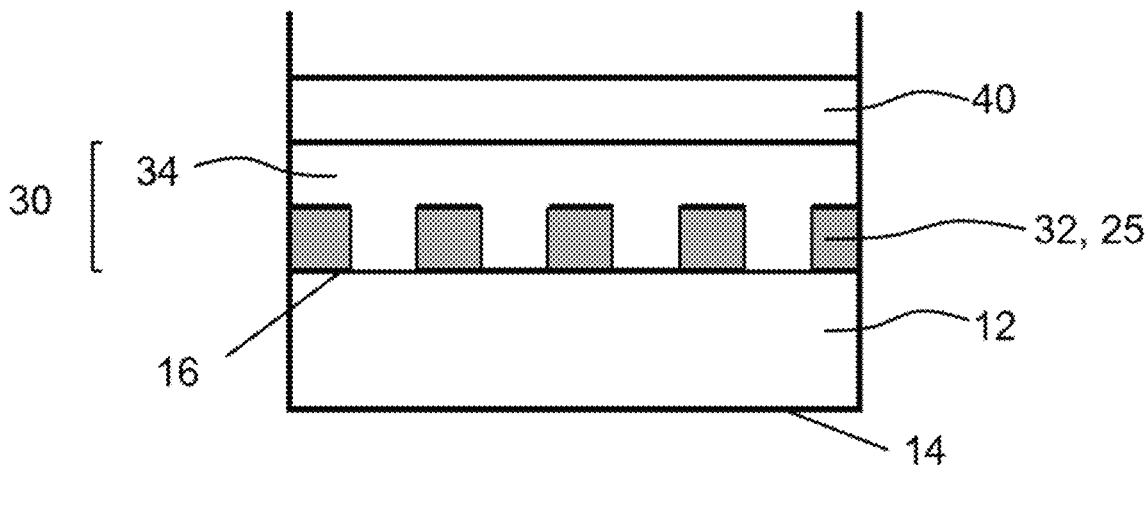
FIG. 6 is a sectional view (not to scale) of a first film of a base layer of a functional coating on the second surface of a substrate having a symmetric patterned feature.

When the patterned feature is formed in the functional coating 20 positioned over at least a portion of the second side of the substrate 12, the patterned feature may be formed in the first film 32 that is positioned over at least a portion of the second surface 16 of the substrate 12. The patterned feature may be a symmetric pattern. The patterned feature may be an asymmetric pattern. When the patterned feature is formed in the first film 32, the second film 34 is in direct contact with at least a portion of the first film 32 and at least a portion of the second surface 16 of the substrate 12. The metallic layer 40 is in direct contact with the second film 34 of the base layer 30. An exemplary coated article having a symmetric patterned feature comprising stripes 25 is provided in FIG. 6. The additional layers of the functional coating 20 are not shown in FIG. 6.

Figure 7:
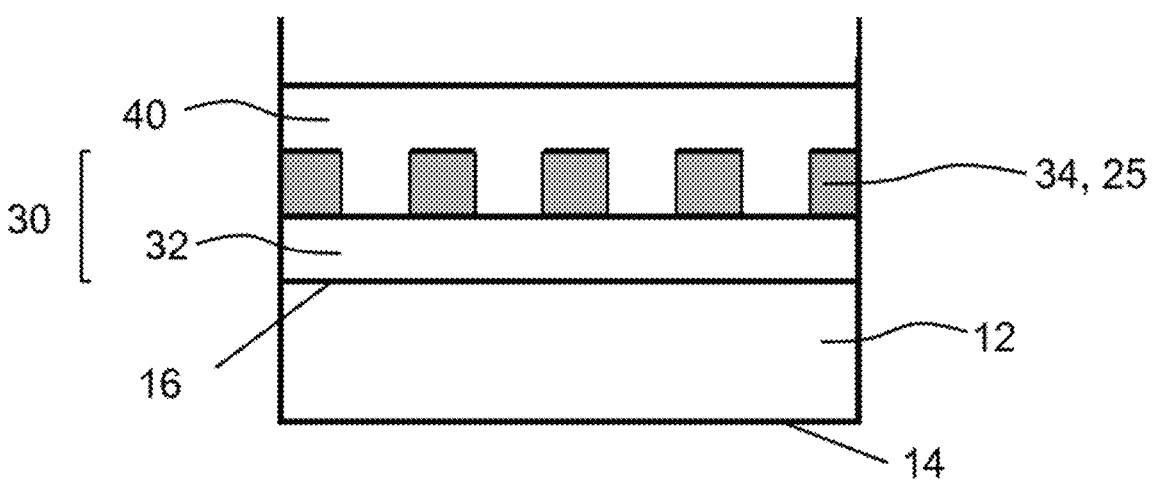
FIG. 7 is a sectional view (not to scale) of a second film of a base layer of a functional coating on the second surface of a substrate having a symmetric patterned feature.

When the patterned feature is formed in the functional coating 20 positioned over at least a portion of the second side of the substrate 12, the patterned feature may be formed in the second film 34 that is positioned over at least a portion of the first film 32. The patterned feature may be a symmetric pattern. The patterned feature may be an asymmetric pattern. When the patterned feature is formed in the second film 34, the metallic layer 40 is in direct contact with at least a portion of the second film 34 of the base layer 30 and at least a portion of the first film 32 of the base layer 30. The first film 32 of the base layer 30 is positioned over and in direct contact with the second surface 16 of the substrate 12. An exemplary coated article having a symmetric patterned feature comprising stripes 25 is provided in FIG. 7. The additional layers of the functional coating 20 are not included in FIG. 7.

When the patterned feature is formed in the functional coating 20 positioned over at least a portion of the second side of the substrate 12 and when the base layer 30 comprises three films, the patterned feature may be formed in the first film 32 positioned over at least a portion of the second surface 216 of the substrate 12. The patterned feature may be a symmetric pattern. The patterned feature may be an asymmetric pattern. When the patterned feature is formed in the first film 32, the second film 34 is in direct contact with at least a portion of the first film 32 and at least a portion of the second surface 16 of the substrate 12. The third film is positioned over and in direct contact with the second film 34.

When the patterned feature is formed in the functional coating 20 positioned over at least a portion of the second side of the substrate 12 and when the base layer 30 comprises three films, the patterned feature may be formed in the second film 34 positioned over at least a portion of the first film 32. The patterned feature may be a symmetric pattern. The patterned feature may be an asymmetric pattern. When the patterned feature is formed in the second film 34, the third film is in direct contact with at least a portion of the second film 34 and at least a portion of the first film 32. The first film 32 is in direct contact with the second surface 16 of the substrate 12.

The patterned feature of the first film 32 or second film 34 of the base layer 30 may comprise a symmetric pattern. For example, the symmetric pattern may comprise stripes 25 over at least a portion of the second surface 16 of the substrate 12. The stripes 25 may comprise a width of at least 0.1 inch (2.54 mm), at least 0.25 inch (6.35 mm), at least 0.5 inch, at least 0.75 inch (19.05 mm), at least 1 inch (25.4 mm), or at least 2 inches (50.8 mm). The stripes 25 may be spaced 1 inch (25.4 inch) or less apart from one another across the substrate 12. For example, the stripes 25 may be spaced at least 0.1 inch (2.54 mm), at least 0.25 inch (6.35 mm), at least 0.5 inch (12.7 mm), at least 0.75 inch (19.05 mm), or 1 inch (25.4 mm) from each other across the substrate 12. Alternatively, the stripes 25 may be spaced by at least 2 inches (50.8 mm), at least 3 inches (76.9 mm), or at least 4 inches (101.6 mm) apart across the substrate 12.

The patterned feature of the first film 32 or second film 34 of the base layer 30 may comprise an asymmetric pattern. For example, the asymmetric pattern may be in the form of a plurality of overlapping, randomly oriented stripes, such as those described in U.S. Pat. No. 9,247,726 B2. The stripes of the asymmetric pattern may comprise a width of from 0.125 inch (3.175 mm) to 1 inch (25.4 mm). For example, the stripes of the asymmetric pattern may comprise a width of 0.125 inch (3.175 mm), such as 0.25 inch (6.35 mm), such as 0.5 inch, such as 0.75 inch (19.05 mm), or such as 1 inch (25.4 mm). The stripes of the asymmetric pattern may all comprise the same width. The stripes of the asymmetric pattern may comprise different widths. Alternatively, the asymmetric pattern may be in the form of a spider web design, such as the spider web design described in U.S. Pat. No. 9,247,726 B2.

When the first film 32 of the base layer 30 includes the patterned feature, there are no microabrasions 18 formed in the second surface 16 of the substrate 12. When the second film 32 of the base layer 30 includes the patterned feature, there are no microabrasions 18 formed in the second surface 16 of the substrate 12.

Figure 8A:
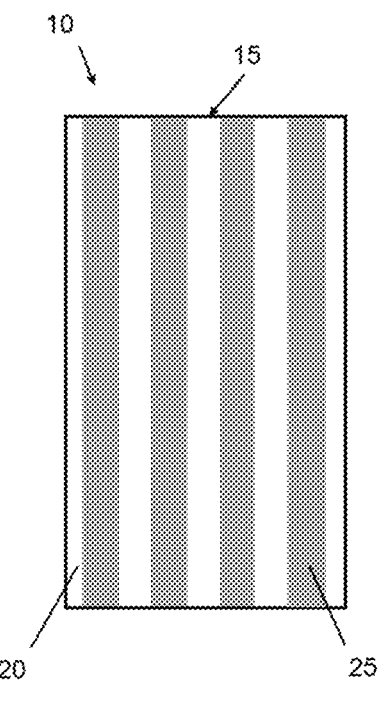
FIGS. 8A-8C are front views (not to scale) of substrates having symmetric patterned features in the first film or second film of the base layer, where the patterned feature is in the form of stripes. Horizontal patterned features are shown in FIG. 8A, vertical patterned features are shown in FIG. 8B, and diagonal patterned features are shown in FIG. 8C, where the patterned features are formed in the functional coating positioned over the second side of a substrate.
Figure 8B:
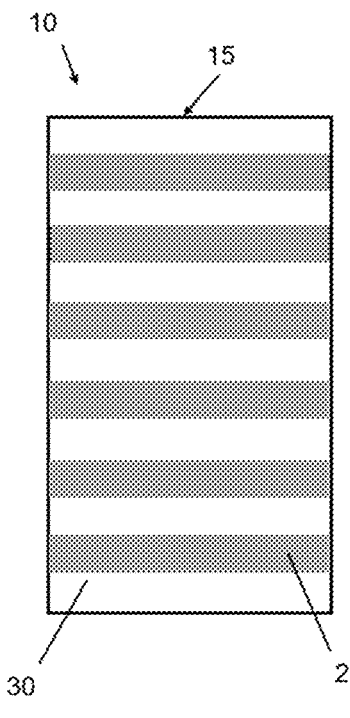
Figure 8C:
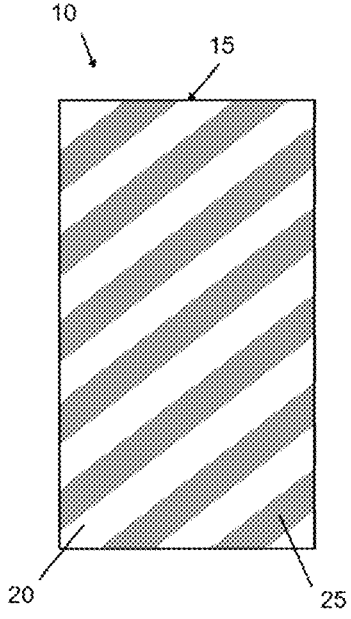

Non-limiting embodiments of coated articles 10 having patterned features comprising a symmetric pattern of stripes 25 formed in the functional coatings 20 positioned over at least a portion of the second side of the substrate 12, are shown in FIGS. 8A-8C. The stripes 25 may be positioned horizontally across the substrate 12, relative to the top edge 15 of the substrate 12, as shown in FIG. 8A. When the substrate 12 is an architectural transparency installed in a building, the top edge 15 of the substrate 12 is positioned closest to the roof of the building and is parallel to the roof of the building. When the stripes 25 are positioned horizontally across the substrate 12, the stripes 25 are parallel to the top edge 15 of the substrate 12. The stripes 25 may be positioned vertically across the substrate 12, such that the stripes 25 are positioned in the direction of gravity, as shown in FIG. 8B. The stripes 25 may be positioned diagonally across the substrate 12, as shown in FIG. 8C. For example, the stripes 25 are positioned horizontally across the substrate 12 and are spaced 1 inch or less apart from one another. For example, the stripes 25 are positioned horizontally across the substrate 12 and are spaced apart from one another by at least 2 inches. For example, the stripes 25 are positioned vertically across the substrate 12 and are spaced 1 inch or less apart from one another. For example, the stripes 25 are positioned vertically across the substrate 12 and are spaced apart from one another by at least 4 inches.

A metallic layer 40 is deposited over at least a portion of the base layer 30, such as over at least a portion of the second film 34 or the optional third film of the base layer 30. The metallic layer 40 can include a reflective metal, such as, but not limited to, metallic gold, copper, palladium, aluminum, silver, or mixtures, alloys, or combinations thereof. In one embodiment, the metallic layer 40 comprises a metallic silver layer. The metallic layer 40 is a continuous layer. By "continuous layer" is meant that the coating forms a continuous film of the material and not isolated coating regions.

The metallic layer 40 can have a thickness in the range of from 5 nm to 25 nm, such as, from 8 nm to 23 nm, such as, from 8 nm to 20 nm, such as, from 8 nm to 17 nm.

When the patterned feature is formed in the functional coating 20 positioned over at least a portion of the second side of the substrate 12, the patterned feature may be formed in the metallic layer 40 that is positioned over at least a portion of the base layer 30, such as over at least a portion of the second film 34 or the optional third film of the base layer 30. The patterned feature may be a symmetric pattern. The patterned feature may be an asymmetric pattern. The patterned feature of the metallic layer 40 may comprise a thickness in the range of from 1 nm to 20 nm, such as from 1 nm to 15 nm, such as from 1 nm to 10 nm, or such as from 2 nm to 8 nm.

Figure 17A:
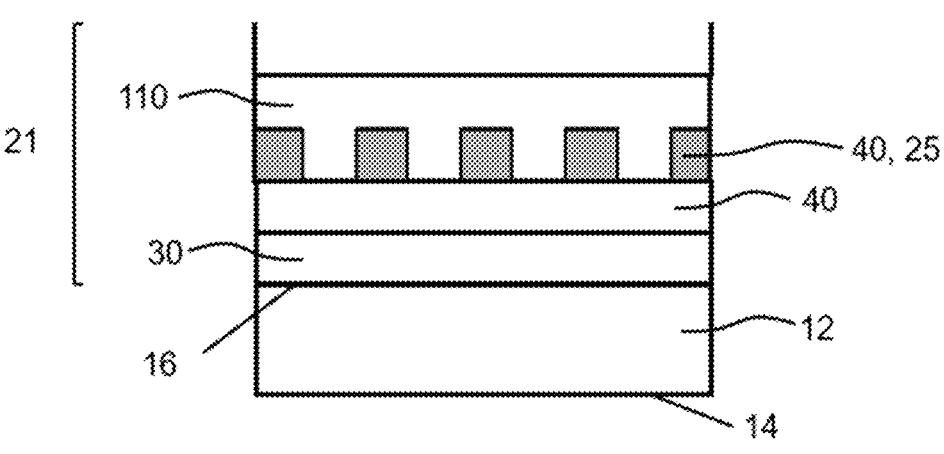
FIGS. 17A-17C are sectional views (not to scale) of a metallic layer of a functional coating on the second surface of a substrate having a symmetric patterned feature.

When the patterned feature is formed in the metallic layer 40 and the functional coating 20 is a single metallic layer functional coating 21, the top layer 110 is in direct contact with at least a portion of the metallic layer 40 and the patterned feature of the metallic layer 40. An exemplary coated article having a symmetric patterned feature comprising stripes 25 is provided in FIG. 17A.

Figure 17B:
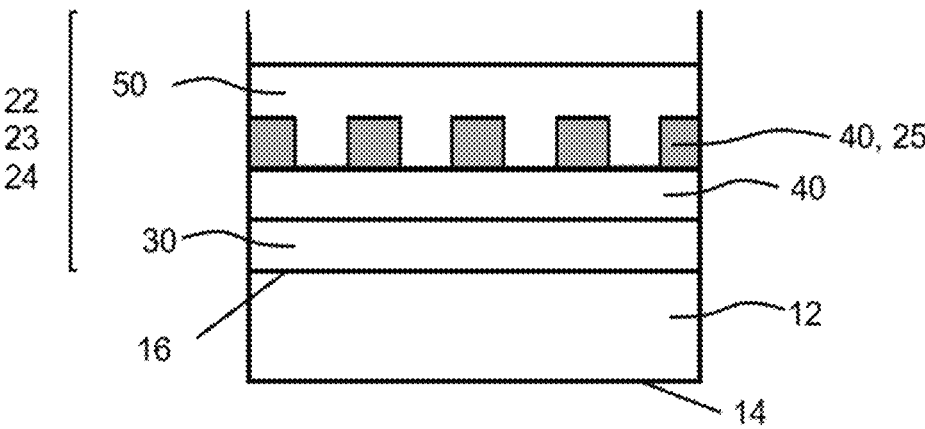

When the patterned feature is formed in the metallic layer 40 and the functional coating includes two or more metallic layers (i.e., the functional coating 20 is a double 22, triple 23, or quadruple 24 metallic layer functional coating), a second layer 50 is in direct contact with at least a portion of the metallic layer 40 and the patterned feature of the metallic layer 40. An exemplary coated article having a symmetric patterned feature comprising stripes 25 is provided in FIG. 17B.

Figure 17C:
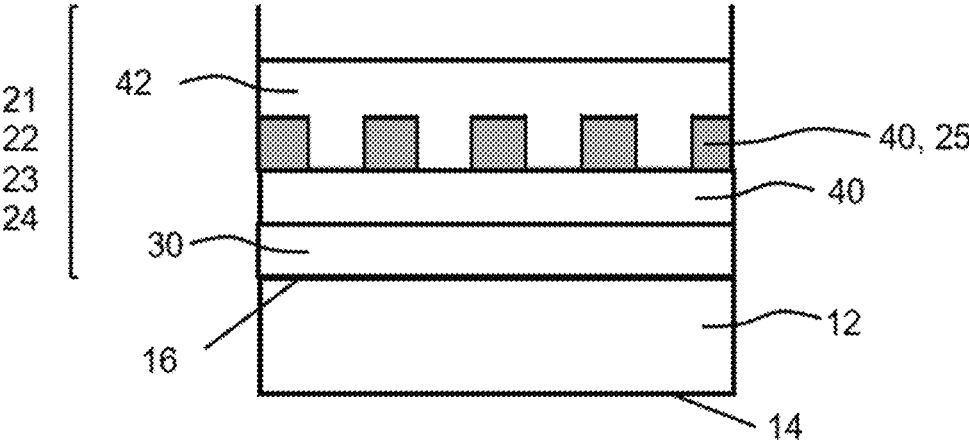

Alternatively, when the patterned feature is formed in the metallic layer 40 and the functional coating includes two or more metallic layers (i.e., the functional coating 20 is a single 21, double 22, triple 23, or quadruple 24 metallic layer functional coating), a first primer layer 42 may be in direct contact with at least a portion of the metallic layer 40 and the patterned feature of the metallic layer 40. An exemplary coated article having a symmetric patterned feature comprising stripes 25 is provided in FIG. 17C. The additional layers of the functional coating 20 are not included in FIGS. 17A-17C.

The patterned feature of the metallic layer 40 may comprise a symmetric pattern. For example, the symmetric pattern may comprise stripes 25 over at least a portion of the second surface 16 of the substrate 12. The stripes 25 may comprise a width of at least 0.1 inch (2.54 mm), at least 0.25 inch (6.35 mm), at least 0.5 inch, at least 0.75 inch (19.05 mm), at least 1 inch (25.4 mm), or at least 2 inches (50.8 mm). The stripes 25 may be spaced 1 inch (25.4 inch) or less apart from one another across the substrate 12. For example, the stripes 25 may be spaced at least 0.1 inch (2.54 mm), at least 0.25 inch (6.35 mm), at least 0.5 inch (12.7 mm), at least 0.75 inch (19.05 mm), or 1 inch (25.4 mm) from each other across the substrate 12. Alternatively, the stripes 25 may be spaced by at least 2 inches (50.8 mm), at least 3 inches (76.9 mm), or at least 4 inches (101.6 mm) apart across the substrate 12.

The patterned feature of the metallic layer 40 may comprise an asymmetric pattern. For example, the asymmetric pattern may be in the form of a plurality of overlapping, randomly oriented stripes, such as those described in U.S. Pat. No. 9,247,726 B2. The stripes of the asymmetric pattern may comprise a width of from 0.125 inch (3.175 mm) to 1 inch (25.4 mm). For example, the stripes of the asymmetric pattern may comprise a width of 0.125 inch (3.175 mm), such as 0.25 inch (6.35 mm), such as 0.5 inch, such as 0.75 inch (19.05 mm), or such as 1 inch (25.4 mm). The stripes of the asymmetric pattern may all comprise the same width. The stripes of the asymmetric pattern may comprise different widths. Alternatively, the asymmetric pattern may be in the form of a spider web design, such as the spider web design described in U.S. Pat. No. 9,247,726 B2.

When the metallic layer 40 includes the patterned feature, there are no microabrasions 18 formed in the second surface 16 of the substrate 12. When the functional coating has a patterned feature in the metallic layer 40, the patterned feature in the metallic layer 40 may be the only patterned feature on the second side of the substrate 12.

A first primer layer 42 can be positioned over the metallic layer 40. The first primer layer 42 can be a single film or a multiple film layer. The first primer layer 42 can include an oxygen-capturing material that can be sacrificial during the deposition process to prevent degradation or oxidation of the metallic layer 40 during the sputtering process or subsequent heating processes. The first primer layer 42 can also absorb at least a portion of electromagnetic radiation, such as, visible light, passing through the functional coating 20. Examples of materials useful for the first primer layer 42 include titanium, silicon, silicon dioxide, silicon nitride, silicon oxynitride, nickel, zirconium, aluminum, cobalt, chromium, titanium, aluminum, an alloy thereof, or a mixture thereof. In one non-limiting embodiment, the first primer layer 42 comprises titanium, titanium and aluminum, or zinc and aluminum, which are deposited as a metal and at least a portion of the titanium, or titanium and aluminum, or zinc and aluminum are subsequently oxidized. In another embodiment, the primer layer 42 comprises a nickel-chromium alloy, such as, Inconel. In another embodiment, the primer layer 42 comprises a cobalt-chromium alloy, such as, Stellite®.

The first primer layer 42 can have a thickness in the range of from 0.5 nm to 5 nm, such as, from 1 nm to 4 nm, such as, from 1 nm to 2.5 nm.

In embodiments where there are two or more metallic layers, a second layer 50 is located over at least a portion of the metallic layer 40 (e.g., over the first primer layer 42). The second layer 50 can comprise one or more metal oxide, metal alloy oxide, metal nitride, metal alloy nitride, metal oxynitride, or metal alloy oxynitride-containing films, such as, those described above with respect to the first film 32 and second film 34 of the base layer 30. For example, the second layer 50 can include a first film 52 comprising a metal oxide, e.g., a zinc oxide or aluminum zinc oxide, deposited over at least a portion of the first primer layer 42, a second film 54 comprising a metal oxide, e.g., a zinc stannate film over at least a portion of the first film 52, and a third film 56 comprising a metal oxide, e.g., a zinc oxide film or aluminum zinc oxide film, over at least a portion of the second film 54.

Figure 15:
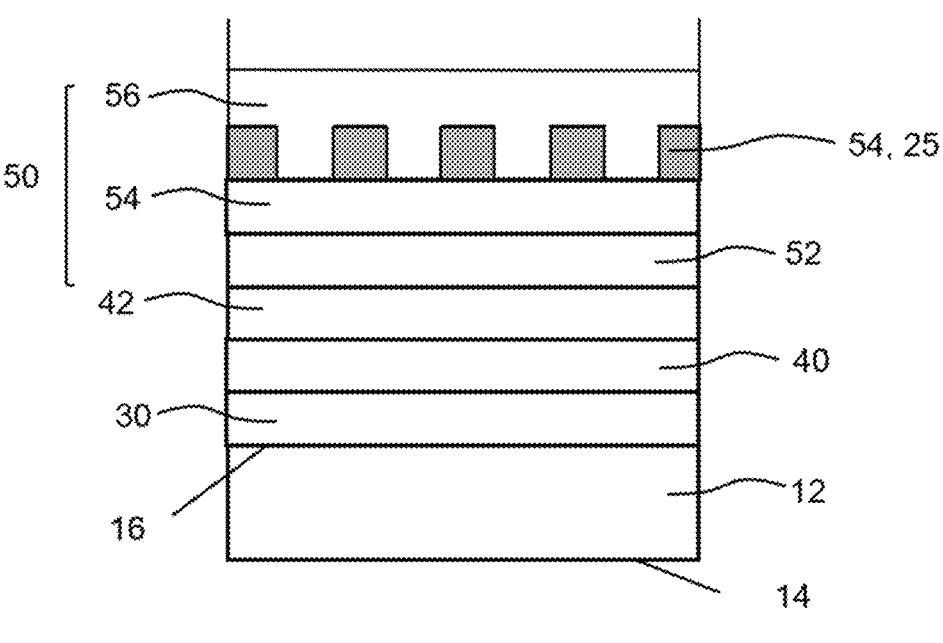
FIG. 15 is a sectional view (not to scale) of a second film of a second layer of a functional coating on the second surface of a substrate having a symmetric patterned feature.
Figure 16:
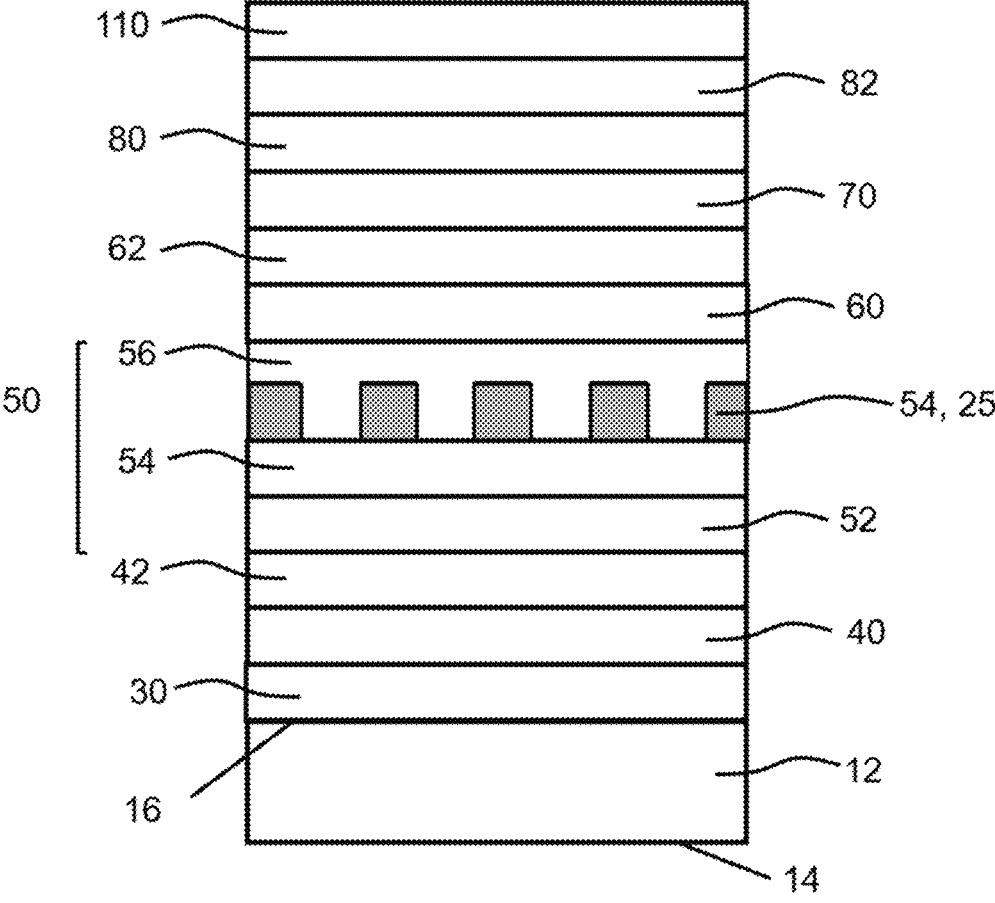
FIG. 16 is a sectional view (not to scale) of triple metal coating according to an example of the invention.

When the patterned feature is formed in the functional coating 20 positioned over at least a portion of the second side of the substrate 12 and the functional coating 20, the patterned feature may be formed in the second film 54 of the second layer 50. The patterned feature may be a symmetric pattern. The patterned feature may be an asymmetric pattern. When the patterned feature is formed in the second film 54, the second film 54 is in direct contact with at least a portion of the first film 52 and at least a portion of third film 56. An exemplary coated article having a symmetric patterned feature comprising stripes 25 is provided in FIG. 15. The additional layers of the functional coating 20 are not shown in FIG. 15. When the patterned feature is formed in the functional coating 20 positioned over at least a portion of the second side of the substrate 12 and the functional coating 20 has three metallic layers, the patterned feature may be formed in the second film 54 of the second layer 50. An exemplary coated article having a functional coating having three metallic layers 23 and having a symmetric patterned feature comprising stripes 25 is provided in FIG. 16.

The patterned feature of the second film 54 of the second layer 50 may comprise a symmetric pattern. For example, the symmetric pattern may comprise stripes 25 over at least a portion of the second surface 16 of the substrate 12. The stripes 25 may comprise a width of at least 0.1 inch (2.54 mm), at least 0.25 inch (6.35 mm), at least 0.5 inch, at least 0.75 inch (19.05 mm), at least 1 inch (25.4 mm), or at least 2 inches (50.8 mm). The stripes 25 may be spaced 1 inch (25.4 inch) or less apart from one another across the substrate 12. For example, the stripes 25 may be spaced at least 0.1 inch (2.54 mm), at least 0.25 inch (6.35 mm), at least 0.5 inch (12.7 mm), at least 0.75 inch (19.05 mm), or 1 inch (25.4 mm) from each other across the substrate 12. Alternatively, the stripes 25 may be spaced by at least 2 inches (50.8 mm), at least 3 inches (76.9 mm), or at least 4 inches (101.6 mm) apart across the substrate 12.

The patterned feature of the second film 54 of the second layer 50 may comprise an asymmetric pattern. For example, the asymmetric pattern may be in the form of a plurality of overlapping, randomly oriented stripes, such as those described in U.S. Pat. No. 9,247,726 B2. The stripes of the asymmetric pattern may comprise a width of from 0.125 inch (3.175 mm) to 1 inch (25.4 mm). For example, the stripes of the asymmetric pattern may comprise a width of 0.125 inch (3.175 mm), such as 0.25 inch (6.35 mm), such as 0.5 inch, such as 0.75 inch (19.05 mm), or such as 1 inch (25.4 mm). The stripes of the asymmetric pattern may all comprise the same width. The stripes of the asymmetric pattern may comprise different widths. Alternatively, the asymmetric pattern may be in the form of a spider web design, such as the spider web design described in U.S. Pat. No. 9,247,726 B2.

When the patterned feature is in the second film 54 of the second layer 50, there are no microabrasions 18 formed in the second surface 16 of the substrate 12. When the functional coating 20 has a patterned feature in the second film 54 of the second layer 50, the patterned feature in the second film 54 of the second layer 50 may be the only patterned feature on the second side of the substrate 12.

In one example, both of the first and third films 54, 56 are present and each has a thicknesses in the range of from 1 nm to 20 nm, such as, from 5 nm to 20 nm, such as, from 6 nm to 15 nm, such as, from 8 nm to 10 nm. The second film 54 can have a thickness in the range of from 5 nm to 80 nm, such as, 5 nm to 70 nm, such as, from 10 nm to 70 nm, such as, from 20 nm to 70 nm, such as, from 30 to 70 nm, such as, from 50 nm to 70 nm. The patterned feature of the second film 54 can have a thickness in the range of from 18 nm to 35 nm or such as from 22 nm to 30 nm.

The second layer 50 can comprise a total thickness (e.g., the combined thicknesses of the films) in the range of from 20 nm to 100 nm, such as, from 20 nm to 85 nm, such as, from 25 nm to 80 nm. When the second layer 50 comprises the patterned feature, the second layer 50 can comprise a total thickness (e.g., the combined thickness of the films and patterned feature) in the range of from 38 nm to 135 nm, such as from 38 nm to 130 nm, or such as from 42 nm to 130 nm.

A second metallic layer 60 can be formed over a least a portion of the second layer 50. The second metallic layer 60 can include a reflective metal, such as, but not limited to, metallic gold, copper, palladium, aluminum, silver, or mixtures, alloys, or combinations thereof. In one embodiment, the second metallic layer 60 comprises a metallic silver layer.

When the patterned feature is formed in a functional coating 20 that includes two metallic layers (i.e., a double metal coating 22) positioned over at least a portion of the second side of the substrate 12, the patterned feature may be formed in the second metallic layer 60 that is positioned over at least a portion of the second layer 50, such as over at least a portion of the third film 56 of the second layer 50. The patterned feature may be a symmetric pattern. The patterned feature may be an asymmetric pattern. The patterned feature of the second metallic layer 60 may comprise a thickness in the range of from 1 nm to 20 nm, such as from 1 nm to 15 nm, such as from 1 nm to 10 nm, such as from 2 nm to 8 nm.

Figures 18A, 18B:
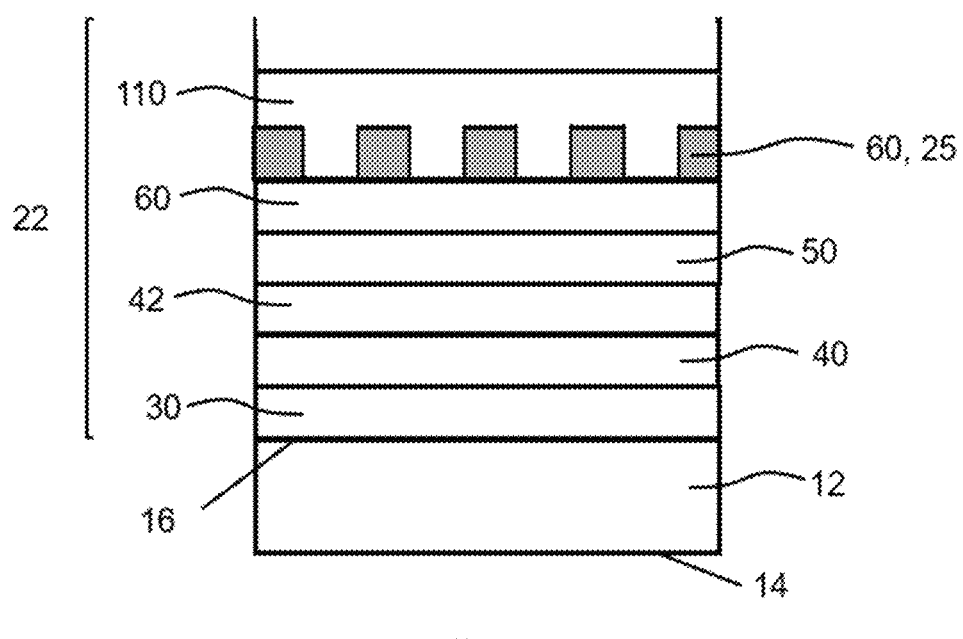
FIGS. 18A and 18B are sectional views (not to scale) of a second metallic layer of a functional coating, which includes two metallic layers (i.e., a double metal coating), on the second surface of a substrate having a symmetric patterned feature.

When the patterned feature is formed in the second metallic layer 60 and the functional coating 20 is a double metallic layer functional coating 22, the top layer 110 is in direct contact with at least a portion of the second metallic layer 60 and the patterned feature of the metallic layer 60. An exemplary coated article having a symmetric patterned feature comprising stripes 25 is provided in FIG. 18A. Alternatively, when the patterned feature is formed in the second metallic layer 60 and the functional coating 20 is a double metallic layer functional coating 22, a second primer layer 62 may be in direct contact with at least a portion of the second metallic layer 60 and the patterned feature of the second metallic layer 60. An exemplary coated article having a functional coating having two metallic layers 22 and having a symmetric patterned feature comprising stripes 25 is provided in FIG. 18B. The additional layers of the functional coating 22 are not included in FIGS. 18A and 18B.

The patterned feature of the second metallic layer 60 may comprise a symmetric pattern. For example, the symmetric pattern may comprise stripes 25 over at least a portion of the second surface 16 of the substrate 12. The stripes 25 may comprise a width of at least 0.1 inch (2.54 mm), at least 0.25 inch (6.35 mm), at least 0.5 inch, at least 0.75 inch (19.05 mm), at least 1 inch (25.4 mm), or at least 2 inches (50.8 mm). The stripes 25 may be spaced 1 inch (25.4 inch) or less apart from one another across the substrate 12. For example, the stripes 25 may be spaced at least 0.1 inch (2.54 mm), at least 0.25 inch (6.35 mm), at least 0.5 inch (12.7 mm), at least 0.75 inch (19.05 mm), or 1 inch (25.4 mm) from each other across the substrate 12. Alternatively, the stripes 25 may be spaced by at least 2 inches (50.8 mm), at least 3 inches (76.9 mm), or at least 4 inches (101.6 mm) apart across the substrate 12.

The patterned feature of the second metallic layer 60 may comprise an asymmetric pattern. For example, the asymmetric pattern may be in the form of a plurality of overlapping, randomly oriented stripes, such as those described in U.S. Pat. No. 9,247,726 B2. The stripes of the asymmetric pattern may comprise a width of from 0.125 inch (3.175 mm) to 1 inch (25.4 mm). For example, the stripes of the asymmetric pattern may comprise a width of 0.125 inch (3.175 mm), such as 0.25 inch (6.35 mm), such as 0.5 inch, such as 0.75 inch (19.05 mm), or such as 1 inch (25.4 mm). The stripes of the asymmetric pattern may all comprise the same width. The stripes of the asymmetric pattern may comprise different widths. Alternatively, the asymmetric pattern may be in the form of a spider web design, such as the spider web design described in U.S. Pat. No. 9,247,726 B2.

When the second metallic layer 60 includes the patterned feature, there are no microabrasions 18 formed in the second surface 16 of the substrate 12. When the functional coating has a patterned feature in the second metallic layer 60, the patterned feature in the second metallic layer 60 may be the only patterned feature on the second side of the substrate 12.

In one embodiment, the second metallic layer 60 is a continuous layer formed over at least a portion of the second layer 240. The second metallic layer 60 is a continuous layer having a total thickness of from 5 nm to 30 nm, such as, from 10 nm to 20 nm, such as, from 10 nm to 15 nm, or such as, from 10 nm to 12 nm.

In another embodiment, the second metallic layer 60 is a discontinuous layer, having a subcritical thickness, formed over at least a portion of the second layer 50. The metallic material, such as, but not limited to, metallic gold, copper, palladium, aluminum, silver, or mixtures, alloys, or combinations thereof, is applied at a subcritical thickness such that isolated regions or islands of the material are formed, rather than a continuous layer of the material. For silver, it has been determined that the critical thickness is less than 5 nm, such as, less than 4 nm, such as, less than 3 nm, such as, less than 2.5 nm. For silver, the transition between a continuous layer and a subcritical layer occurs in the range of 2.5 nm to 5 nm. For copper, it has been determined that the effective thickness is at most 9 nm; e.g., 5 nm; 4 nm; e.g., 3.6 nm, e.g., 2.6 nm; e.g., 2 nm; e.g., 1.7 nm; and at least 0.1 nm; e.g., 0.2 nm; e.g. 0.3 nm; e.g. 0.4 nm; e.g. 0.5 nm; e.g. 0.6 nm; e.g. 0.7 nm. It is estimated that copper, gold, and palladium would exhibit similar subcritical behavior in this range. In one non-limiting embodiment, the second metallic layer 60 comprises islanded silver with the islands having an effective thickness of at most 7 nm, e.g. at most 4 nm, e.g., at most 3.5 nm, e.g., at most 3 nm, e.g., at most 2.5 nm, e.g., at most 2 nm; e.g., at most 1.7 nm; and at least 0.1 nm; e.g., at least 0.2 nm; e.g., at least 0.4 nm; e.g., at least 0.5 nm; e.g. at least 0.7 nm; e.g., at least 1 nm. In another embodiment, the second metallic layer 60 comprises copper with the islands having an effective thickness is at most 9 nm; e.g., 5 nm; 4 nm; e.g., 3.6 nm, e.g., 2.6 nm; e.g., 2 nm; e.g., 1.7 nm; and at least 0.1 nm; e.g., 0.2 nm; e.g. 0.3 nm; e.g. 0.4 nm; e.g. 0.5 nm; e.g. 0.6 nm; e.g. 0.7 nm; and, optionally, silver with islands having an effective thickness of at most 7 nm, e.g. at most 4 nm, e.g., at most 3.5 nm, e.g., at most 3 nm, e.g., at most 2.5 nm, e.g., at most 2 nm; e.g., at most 1.7 nm; and at least 0.1 nm; e.g., at least 0.2 nm; e.g., at least 0.5 nm; e.g., at least 0.7 nm; e.g., at least 1 nm. The second metallic layer 60 absorbs electromagnetic radiation according to the Plasmon Resonance Theory. This absorption depends at least partly on the boundary conditions at the interface of the metallic islands. The second metallic layer 60 is not an infrared reflecting layer, like the metallic layer 40. It is estimated that for silver and copper, the metallic islands or balls of silver metal and copper metal deposited below the subcritical thickness can have a height of about 2 nm to 7 nm, such as, 5 nm to 7 nm. It is estimated that if the subcritical metal layer could be spread out uniformly, it would have a thickness of about 1.1 nm. It is estimated that optically, the discontinuous metal layer behaves as an effective layer thickness of 2.6 nm. Depositing the discontinuous metallic layer over zinc stannate rather than zinc oxide or aluminum zinc oxide appears to increase the visible light absorbance of the coating, e.g., of the discontinuous metallic layer.

A second primer layer 62 can be located over the second metallic layer 60. The second primer layer 62 can be a single film or a multiple film layer. The second primer layer 62 can include an oxygen-capturing material that can be sacrificial during the deposition process to prevent degradation or oxidation of the second metallic layer 60 during the sputtering process or subsequent heating processes. The second primer layer 62 can also absorb at least a portion of electromagnetic radiation, such as, visible light, passing through the functional coating 20. Examples of materials useful for the second primer layer 62 include titanium, silicon, silicon dioxide, silicon nitride, silicon oxynitride, nickel, zirconium, aluminum, cobalt, chromium, titanium, aluminum, an alloy thereof, or a mixture thereof. In one non-limiting embodiment, the second primer layer 62 comprises titanium, titanium and aluminum, or zinc and aluminum, which are deposited as a metal and at least a portion of the titanium, or titanium and aluminum, or zinc and aluminum are subsequently oxidized. In another embodiment, the second primer layer 62 comprises a nickel-chromium alloy, such as, Inconel. In another embodiment, the second primer layer 62 comprises a cobalt-chromium alloy, such as, Stellite®.

The second primer layer 62 can have a thickness in the range of from 0.5 nm to 5 nm, such as, from 1 nm to 4 nm, or such as, from 1 nm to 2.5 nm.

In embodiments where there are three or more metallic layers, a third layer 70 is located over at least a portion of the second metallic layer 60 (e.g., over the second primer layer 62). The third layer 70 can comprise one or more metal oxide, metal alloy oxide, metal nitride, metal alloy nitride, metal oxynitride, or metal alloy oxynitride-containing films, such as, those described above with respect to the first film 32 and second film 34 of the base layer 30. For example, the third layer 70 can include a first film 72 comprising a metal oxide, e.g., a zinc oxide or an aluminum zinc oxide, deposited over at least a portion of the second primer layer 62, a second film 74 comprising a metal oxide, e.g., a zinc stannate film over at least a portion of the first film 72, and a third film 76 comprising a metal oxide, e.g., a zinc oxide film or an aluminum zinc oxide film, over at least a portion of the second film 74.

The third layer 70 comprises a total thickness (e.g., the combined thicknesses of the layers) in the range of from 20 nm to 100 nm, such as, from 20 nm to 80 nm, such as, from 20 nm to 50 nm, or such as, from 25 nm to 40 nm.

In one example, both of the first and third films 72, 76 are present and each has a thicknesses in the range of from 5 nm to 20 nm, such as, from 5 nm to 20 nm, such as, from 7 nm to 15 nm, such as, from 8 to 15 nm, such as, from 9.5 nm to 10 nm. The second film 74 can have a thickness in the range of from 10 nm to 80 nm, such as, from 20 nm to 70 nm, such as, from 30 nm to 60 nm, such as, from 38 nm to 50 nm, such as, from 38 nm to 45 nm.

A third metallic layer 80 can be formed over a least a portion of the third layer 70. The third metallic layer 80 can include a reflective metal, such as, but not limited to, metallic gold, copper, palladium, aluminum, silver, or mixtures, alloys, or combinations thereof. In one embodiment, the third metallic layer 80 comprises a metallic silver layer.

When the patterned feature is formed in a functional coating 20 that includes three metallic layers (i.e., a triple metal coating 23) positioned over at least a portion of the second side of the substrate 12, the patterned feature may be formed in the third metallic layer 80 that is positioned over at least a portion of the third layer 70, such as over at least a portion of the third film 76 of the third layer 70. The patterned feature of the third metallic layer 80 may comprise a thickness in the range of from 1 nm to 20 nm, such as from 1 nm to 15 nm, such as from 1 nm to 10 nm, or such as from 2 nm to 8 nm. The patterned feature may be a symmetric pattern. The patterned feature may be an asymmetric pattern.

Figure 19A:
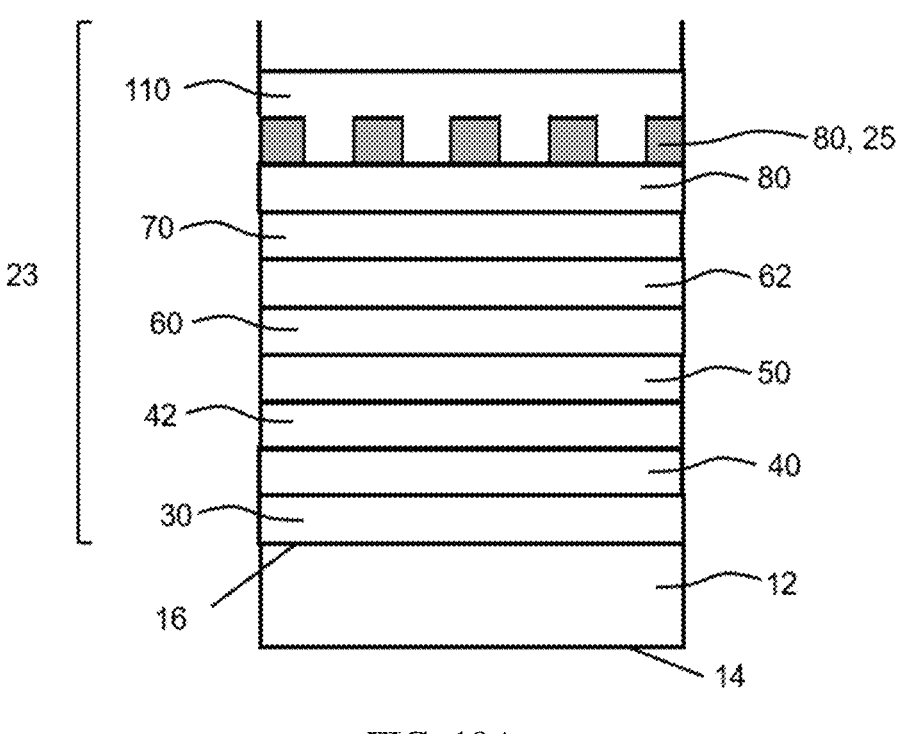
FIGS. 19A and 19B are sectional views (not to scale) of a third metallic layer of a functional coating, which includes three metallic layers (i.e., a triple metal coating), on the second surface of a substrate having a symmetric patterned feature.
Figure 19B:
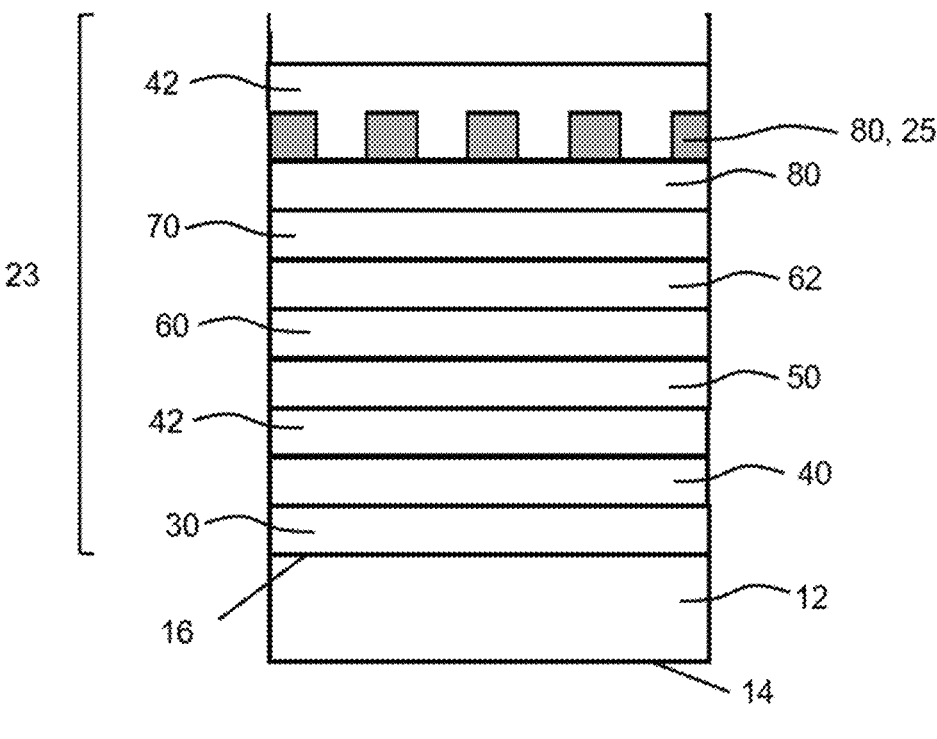

When the patterned feature is formed in the third metallic layer 80 and the functional coating 20 is a triple metallic layer functional coating 23, the top layer 110 is in direct contact with at least a portion of the third metallic layer 80 and the patterned feature of the third metallic layer 80. An exemplary coated article having a functional coating having three metallic layers 23 and having a symmetric patterned feature comprising stripes 25 is provided in FIG. 19A. Alternatively, when the patterned feature is formed in the third metallic layer 80 and the functional coating 20 is a triple metallic layer functional coating 23, a third primer layer 82 may be in direct contact with at least a portion of the third metallic layer 80 and the patterned feature of the third metallic layer 80. An exemplary coated article having a functional coating having three metallic layers 23 and having a symmetric patterned feature comprising stripes 25 is provided in FIG. 19B. The additional layers of the functional coating 23 are not included in FIGS. 19A and 19B.

The patterned feature of the third metallic layer 80 may comprise a symmetric pattern. For example, the symmetric pattern may comprise stripes 25 over at least a portion of the second surface 16 of the substrate 12. The stripes 25 may comprise a width of at least 0.1 inch (2.54 mm), at least 0.25 inch (6.35 mm), at least 0.5 inch, at least 0.75 inch (19.05 mm), at least 1 inch (25.4 mm), or at least 2 inches (50.8 mm). The stripes 25 may be spaced 1 inch (25.4 inch) or less apart from one another across the substrate 12. For example, the stripes 25 may be spaced at least 0.1 inch (2.54 mm), at least 0.25 inch (6.35 mm), at least 0.5 inch (12.7 mm), at least 0.75 inch (19.05 mm), or 1 inch (25.4 mm) from each other across the substrate 12. Alternatively, the stripes 25 may be spaced by at least 2 inches (50.8 mm), at least 3 inches (76.9 mm), or at least 4 inches (101.6 mm) apart across the substrate 12.

The patterned feature of the third metallic layer 80 may comprise an asymmetric pattern. For example, the asymmetric pattern may be in the form of a plurality of overlapping, randomly oriented stripes, such as those described in U.S. Pat. No. 9,247,726 B2. The stripes of the asymmetric pattern may comprise a width of from 0.125 inch (3.175 mm) to 1 inch (25.4 mm). For example, the stripes of the asymmetric pattern may comprise a width of 0.125 inch (3.175 mm), such as 0.25 inch (6.35 mm), such as 0.5 inch, such as 0.75 inch (19.05 mm), or such as 1 inch (25.4 mm). The stripes of the asymmetric pattern may all comprise the same width. The stripes of the asymmetric pattern may comprise different widths. Alternatively, the asymmetric pattern may be in the form of a spider web design, such as the spider web design described in U.S. Pat. No. 9,247,726 B2.

When the third metallic layer 80 includes the patterned feature, there are no microabrasions 18 formed in the second surface 16 of the substrate 12. When the functional coating has a patterned feature in the third metallic layer 80, the patterned feature in the third metallic layer 80 may be the only patterned feature on the second side of the substrate 12.

In one embodiment, the third metallic layer 80 is a continuous layer formed over at least a portion of the third layer 70. The third metallic layer 80 is a continuous layer having a total thickness of such as, from 2.5 nm to 30 nm, such as, from 5 nm to 30 nm, such as, from 5 nm to 20 nm, such as, from 7 nm to 20 nm, such as, from, such as, from 12 nm to 18 nm, or such as, from 15 nm to 18 nm.

In another embodiment, the third metallic layer 80 is a discontinuous layer, having a subcritical thickness, formed over at least a portion of the third layer 70. The metallic material, such as, but not limited to, metallic gold, copper, palladium, aluminum, silver, or mixtures, alloys, or combinations thereof, is applied at a subcritical thickness such that isolated regions or islands of the material are formed rather than a continuous layer of the material. For silver, it has been determined that the critical thickness is less than 5 nm, such as, less than 4 nm, such as, less than 3 nm, such as, less than 2.5 nm. For silver, the transition between a continuous layer and a subcritical layer occurs in the range of 2.5 nm to 5 nm. For copper, it has been determined that the effective thickness is at most 9 nm; e.g., 5 nm; 4 nm; e.g., 3.6 nm, e.g., 2.6 nm; e.g., 2 nm; e.g., 1.7 nm; and at least 0.1 nm; e.g., 0.2 nm; e.g. 0.3 nm; e.g. 0.4 nm; e.g. 0.5 nm; e.g. 0.6 nm; e.g. 0.7 nm. It is estimated that copper, gold, and palladium would exhibit similar subcritical behavior in this range. In one non-limiting embodiment, the third metallic layer 80 comprises islanded silver with the islands having an effective thickness of at most 7 nm, e.g., at most 4 nm, e.g., at most 3.5 nm, e.g., at most 3 nm, e.g., at most 2.5 nm, e.g., at most 2 nm; e.g., at most 1.7 nm; and at least 0.1 nm; e.g., at least 0.2 nm; e.g., at least 0.4 nm; e.g., at least 0.5 nm; e.g., at least 0.7 nm; e.g., at least 1 nm. In another embodiment, the third metallic layer 80 comprises copper with the islands having an effective thickness is at most 9 nm; e.g., 5 nm; 40 nm; e.g., 3.6 nm, e.g., 2.6 nm; e.g., 2 nm; e.g., 1.7 nm; and at least 0.1 nm; e.g., 0.2 nm; e.g., 0.3 nm; e.g. 0.4 nm; e.g., 0.5 nm; e.g., 0.6 nm; e.g., 0.7 nm; and, optionally, silver with islands having an effective thickness of at most 7 nm, e.g., at most 4 nm, e.g., at most 3.5 nm, e.g., at most 3 nm, e.g., at most 2.5 nm, e.g., at most 2 nm; e.g., at most 1.7 nm; and at least 0.1 nm; e.g., at least 0.2 nm; e.g., at least 0.4 nm; e.g., at least 0.5 nm; e.g., at least 0.7 nm; e.g., at least 1 nm. The third metallic layer 80 absorbs electromagnetic radiation according to the Plasmon Resonance Theory. This absorption depends at least partly on the boundary conditions at the interface of the metallic islands. The third metallic layer 80 is not an infrared reflecting layer, like the metallic layer 40. It is estimated that for silver and copper, the metallic islands or balls of silver metal and copper metal deposited below the subcritical thickness can have a height of about 2 nm to 7 nm, such as, 5 nm to 7 nm. It is estimated that if the subcritical metal layer could be spread out uniformly, it would have a thickness of about 1.1 nm. It is estimated that optically, the discontinuous metal layer behaves as an effective layer thickness of 2.6 nm.

A third primer layer 82 is located over the third metallic layer 80. The third primer layer 82 can be a single film or a multiple film layer. The third primer layer 82 can include an oxygen-capturing material that can be sacrificial during the deposition process to prevent degradation or oxidation of the third metallic layer 80 during the sputtering process or subsequent heating processes. The third primer layer 82 can also absorb at least a portion of electromagnetic radiation, such as, visible light, passing through the functional coating 20. Examples of materials useful for the third primer layer 82 include titanium, silicon, silicon dioxide, silicon nitride, silicon oxynitride, nickel, zirconium, aluminum, cobalt, chromium, titanium, aluminum, an alloy thereof, or a mixture thereof. In one non-limiting embodiment, the third primer layer 82 comprises titanium, titanium and aluminum, or zinc and aluminum, which are deposited as a metal and at least a portion of the titanium, or titanium and aluminum, or zinc and aluminum are subsequently oxidized. In another embodiment, the third primer layer 82 comprises a nickel-chromium alloy, such as, Inconel. In another embodiment, the third primer layer 82 comprises a cobalt-chromium alloy, such as, Stellite®.

The third primer layer 82 can have a thickness in the range of from 0.5 nm to 5 nm, such as, from 1 nm to 4 nm, or such as, from 1 nm to 2.5 nm.

In embodiments were there are four or more metallic layers, a fourth layer 90 is located over at least a portion of the third metallic layer 80 (e.g., over the third primer layer 82). The fourth layer 90 can comprise one or more metal oxide, metal alloy oxide, metal nitride, metal alloy nitride, metal oxynitride, or metal alloy oxynitride-containing films, such as, those described above with respect to the first film 32 and second film 34 of the base layer 30. For example, the fourth layer 90 can include a first film 92 comprising a metal oxide, e.g., a zinc oxide or an aluminum zinc oxide, deposited over at least a portion of the third primer layer 82, a second film 94 comprising a metal oxide, e.g., a zinc stannate film over at least a portion of the first film 92, and a third film 96 comprising a metal oxide, e.g., a zinc oxide film or an aluminum zinc oxide film, over at least a portion of the second film 94.

The fourth layer 90 comprises a total thickness (e.g., the combined thicknesses of the layers) in the range of from 20 nm to 100 nm, such as, from 40 nm to 90 nm, such as, from 50 nm to 90 nm, such as, from 65 nm to 80 nm, such as, from 30 nm to 40 nm.

In one example, both of the first and third films 92, 96 are present and each has a thicknesses in the range of from 5 nm to 20 nm, such as, from 7.5 nm to 15 nm, such as, from 8 nm to 15 nm, or such as, from 9.5 to 10 nm. The second film 94 can have a thickness in the range of from 10 nm to 80 nm, such as, from 20 nm to 70 nm, such as, from 30 nm to 60 nm, such as, from 38 nm to 50 nm, such as, from 38 nm to 45 nm.

A fourth metallic layer 100 can be formed over a least a portion of the fourth layer 90. The fourth metallic layer 100 can include a reflective metal, such as, but not limited to, metallic gold, copper, palladium, aluminum, silver, or mixtures, alloys, or combinations thereof. The fourth metallic layer 100 is a continuous layer. In some embodiments, the fourth metallic layer 100 comprises a metallic silver layer.

The fourth metallic layer 100 is a continuous layer having a total thickness of from 5 nm to 30 nm, such as, from 6 nm to 15 nm, such as, from 6 nm to 10 nm, such as, from 10 nm to 25 nm, such as, from 15 nm to 25 nm, such as, from 20 nm to 25 nm, such as, from 21 nm to 23 nm.

When the patterned feature is formed in a functional coating 20 that includes four metallic layers (i.e., a quadruple metal coating 24) positioned over at least a portion of the second side of the substrate 12, the patterned feature may be formed in the fourth metallic layer 100 that is positioned over at least a portion of the fourth layer 90, such as over at least a portion of the third film 96 of the fourth layer 90. The patterned feature may be a symmetric pattern. The patterned feature may be an asymmetric pattern. The patterned feature of the fourth metallic layer 100 may comprise a thickness in the range of from 1 nm to 20 nm, such as from 1 nm to 15 nm, such as from 1 nm to 10 nm, or such as from 2 nm to 8 nm.

Figure 20A:
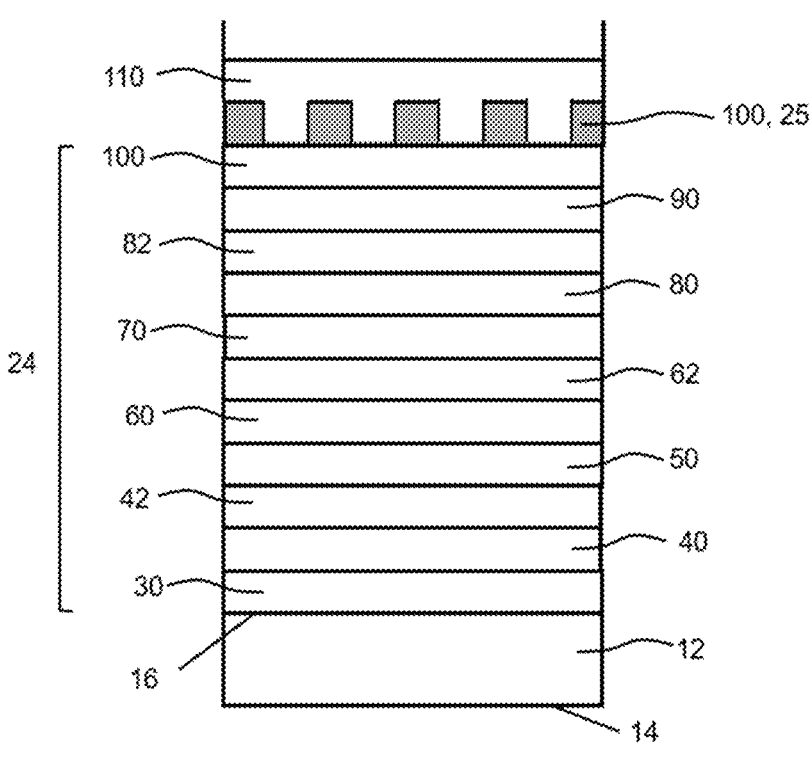
FIGS. 20A and 20B are sectional views (not to scale) of a fourth metallic layer of a functional coating, which includes four metallic layers (i.e., a quadruple metal coating), on the second surface of a substrate having a symmetric patterned feature.
Figure 20B:
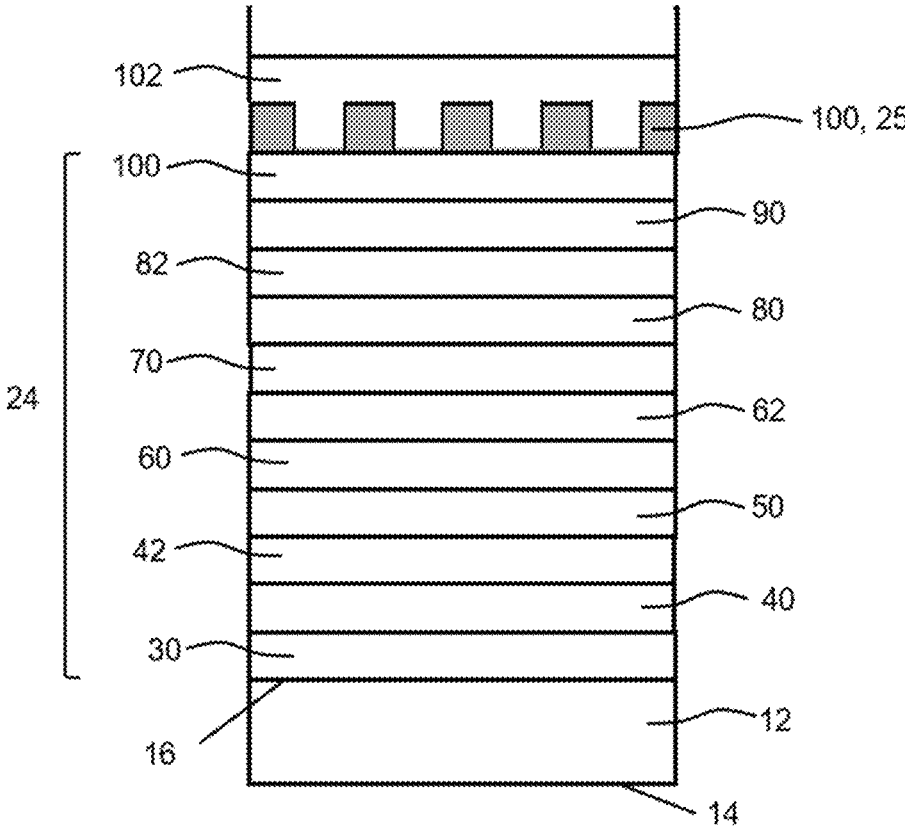

When the patterned feature is formed in the fourth metallic layer 100 and the functional coating 20 is a quadruple metallic layer functional coating 24, the top layer 110 is in direct contact with at least a portion of the fourth metallic layer 100 and the patterned feature of the fourth metallic layer 100. An exemplary coated article having a functional coating having four metallic layers 24 and having a symmetric patterned feature comprising stripes 25 is provided in FIG. 20A. Alternatively, when the patterned feature is formed in the fourth metallic layer 100 and the functional coating 20 is a quadruple metallic layer functional coating 23, a fourth primer layer 102 may be in direct contact with at least a portion of the fourth metallic layer 100 and the patterned feature of the fourth metallic layer 100. An exemplary coated article having a functional coating having four metallic layers 24 and having a symmetric patterned feature comprising stripes 25 is provided in FIG. 20B. The additional layers of the functional coating 24 are not included in FIGS. 20A and 20B.

The patterned feature of the fourth metallic layer 100 may comprise a symmetric pattern. For example, the patterned feature may comprise stripes 25 over at least a portion of the second surface 16 of the substrate 12. The stripes 25 may comprise a width of at least 0.1 inch (2.54 mm), at least 0.25 inch (6.35 mm), at least 0.5 inch, at least 0.75 inch (19.05 mm), at least 1 inch (25.4 mm), or at least 2 inches (50.8 mm). The stripes 25 may be spaced 1 inch (25.4 inch) or less apart from one another across the substrate 12. For example, the stripes 25 may be spaced at least 0.1 inch (2.54 mm), at least 0.25 inch (6.35 mm), at least 0.5 inch (12.7 mm), at least 0.75 inch (19.05 mm), or 1 inch (25.4 mm) from each other across the substrate 12. Alternatively, the stripes 25 may be spaced by at least 2 inches (50.8 mm), at least 3 inches (76.9 mm), or at least 4 inches (101.6 mm) apart across the substrate 12.

The patterned feature of the fourth metallic layer 100 may comprise an asymmetric pattern. For example, the asymmetric pattern may be in the form of a plurality of overlapping, randomly oriented stripes, such as those described in U.S. Pat. No. 9,247,726 B2. The stripes of the asymmetric pattern may comprise a width of from 0.125 inch (3.175 mm) to 1 inch (25.4 mm). For example, the stripes of the asymmetric pattern may comprise a width of 0.125 inch (3.175 mm), such as 0.25 inch (6.35 mm), such as 0.5 inch, such as 0.75 inch (19.05 mm), or such as 1 inch (25.4 mm). The stripes of the asymmetric pattern may all comprise the same width. The stripes of the asymmetric pattern may comprise different widths. Alternatively, the asymmetric pattern may be in the form of a spider web design, such as the spider web design described in U.S. Pat. No. 9,247,726 B2.

When the fourth metallic layer 100 includes the patterned feature, there are no microabrasions 18 formed in the second surface 16 of the substrate 12. When the functional coating has a patterned feature in the fourth metallic layer 100, the patterned feature in the fourth metallic layer 100 may be the only patterned feature on the second side of the substrate 12.

A fourth primer layer 102 is located over the fourth metallic layer 100. The third primer layer 102 can be a single film or a multiple film layer. The fourth primer layer 102 can include an oxygen-capturing material that can be sacrificial during the deposition process to prevent degradation or oxidation of the fourth metallic layer 100 during the sputtering process or subsequent heating processes. The fourth primer layer 102 can also absorb at least a portion of electromagnetic radiation, such as, visible light, passing through the functional coating 20. Examples of materials useful for the fourth primer layer 102 include titanium, silicon, silicon dioxide, silicon nitride, silicon oxynitride, nickel, zirconium, aluminum, cobalt, chromium, titanium, aluminum, an alloy thereof, or a mixture thereof. In one non-limiting embodiment, the fourth primer layer 102 comprises titanium, titanium and aluminum, or zinc and aluminum, which are deposited as a metal and at least a portion of the titanium, or titanium and aluminum, or zinc and aluminum are subsequently oxidized. In another embodiment, the fourth primer layer 102 comprises a nickel-chromium alloy, such as, Inconel. In another embodiment, the fourth primer layer 102 comprises a cobalt-chromium alloy, such as, Stellite®.

The fourth primer layer 102 can have a thickness in the range of from 0.5 nm to 5 nm, such as, from 1 nm to 4 nm, or such as, from 1 nm to 2.5 nm.

A top layer 110 is located over the uppermost metallic layer (e.g., over the uppermost primer layer). In a single metallic layer functional coating 21, the top layer 110 is formed over at least a portion of the metallic layer 40 (e.g., over the first primer layer 42). In a double metallic layer functional coating 22, the top layer 110 is formed over at least a portion of the second metallic layer 60 (e.g., over the second primer layer 62). In a triple metallic layer functional coating 23, the top layer 110 is formed over at least a portion of the third metallic layer 80 (e.g., over the third primer layer 82). In a quadruple metallic layer functional coating 24 the top layer 110 is formed over at least a portion of the fourth metallic layer 100 (e.g., over the fourth primer layer 102).

The top layer 110 can comprise one or more metal oxide, metal alloy oxide, metal nitride, metal alloy nitride, metal oxynitride, or metal alloy oxynitride-containing films, such as, those described above with respect to the first film 32 and second film 34 of the base layer 30. For example, the top layer 110 can include a first metal oxide film 112, e.g., a zinc oxide film, deposited over the uppermost metallic layer (e.g., uppermost primer layer) and a second metal alloy film 114, e.g., a zinc stannate film, deposited over at least a portion of the first metal oxide film 112 (FIGS. 2B, 3B, 4B, and 5B), and an optional third metal alloy or metal alloy oxynitride film 116, e.g., a zinc stannate film or a silicon aluminum oxynitride film, deposited over at least a portion of the second metal alloy film 114 (FIGS. 2C, 3C, 4C, and 5C). For example, the top layer 110 can include a first metal alloy film 112, e.g., a zinc stannate film, deposited over the uppermost metallic layer (e.g., uppermost primer layer) and a metal oxynitride film 114, e.g., a silicon aluminum oxynitride film, deposited over at least a portion of the first metal alloy film 112. The top layer 110 can include a first metal oxide film 112, e.g., a zinc oxide film or an aluminum zinc oxide film, deposited over the uppermost metallic layer (e.g., uppermost primer layer), a second metal alloy film 114, e.g., a zinc stannate film, deposited over at least a portion of the first film 112, and a third metal alloy oxynitride film 116, e.g., a silicon aluminum oxynitride film, deposited over the second zinc stannate film 114 (FIGS. 2C, 3C, 4C, and 5C). The top layer 110 can include a first metal oxide film 112, e.g., a zinc oxide film or an aluminum zinc oxide film, deposited over the uppermost metallic layer (e.g., uppermost primer layer), a second metal alloy film 114, e.g., a zinc stannate film, or a second metal oxide film 114, e.g., a tin oxide film, deposited over at least a portion of the first film 112, and a third metal alloy film 116, e.g., a zinc stannate film, or a third metal oxide film 116, e.g., a tin oxide film, deposited over the second zinc stannate film 114 (FIGS. 2C, 3C, 4C, and 5C). In some non-limiting embodiments, the second film 114 of the top layer 110 and the third film 116 of the top layer 110 may comprise the same material. For example, the second film 114 of the top layer 110 may comprise zinc stannate and the third film 116 of the top layer 110 may comprise zinc stannate. Alternatively, the second film 114 of the top layer 110 may comprise tin oxide and the third film 116 of the top layer 110 may comprise tin oxide.

Figure 9:
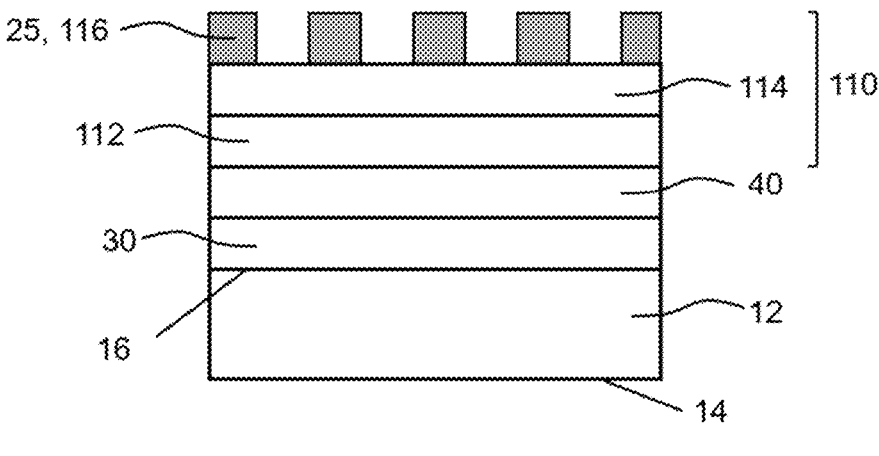
FIG. 9 is a sectional view (not to scale) of a third film of a top layer of a functional coating having a symmetric patterned feature.

When the patterned feature is formed in the functional coating 20 positioned over at least a portion of the second side of the substrate 12, the patterned feature may be formed in the third film 116 of the top layer 110 that is positioned over at least a portion of the second film 114 of the top layer 110. The patterned feature may be a symmetric pattern. The patterned feature may be an asymmetric pattern. When the patterned feature is formed in the third film 116 of the top layer 110, the third film 116 may be the outermost layer of the functional coating 20. An exemplary coated article having a symmetric patterned feature comprising stripes 25 is provided in FIG. 9.

The patterned feature of the third film 116 of the top layer 110 may comprise a symmetric pattern. For example, the symmetric pattern may comprise stripes 25 over at least a portion of the second film 114 of the top layer 110. The stripes 25 may comprise a width of at least 0.1 inch (2.54 mm), at least 0.25 inch (6.35 mm), at least 0.5 inch (12.7 mm), at least 0.75 inch (19.05 mm), at least 1 inch (25.4 mm), or at least 2 inches (50.8 mm). The stripes 25 may be spaced 1 inch (25.4 mm) or less apart from one another across the substrate 12. For example, the stripes 25 may be spaced at least 0.1 inch (2.54 mm), at least 0.25 inch (6.35 mm), at least 0.5 inch (12.7 mm), at least 0.75 inch (19.05 mm), or 1 inch (25.4 mm) from each other across the substrate 12. Alternatively, the stripes 25 may be spaced by at least 2 inches (50.8 mm), such as by at least 3 inches (76.2 mm), or such as by at least 4 inches (101.6 mm) apart across the substrate 12. When the substrate 12 is an architectural transparency installed in a building, the top edge of the substrate 12 is positioned closest to the roof of the building and is parallel to the roof of the building. The stripes 25 may be positioned horizontally across the substrate 12 (FIG. 8A). When the stripes 25 are positioned horizontally across the substrate 12, the stripes 25 are parallel to the top edge 15 of the substrate. The stripes 25 may be positioned vertically across the substrate 12, such as in the direction of gravity (FIG. 8B). The stripes 25 may be positioned diagonally across the substrate 12 (FIG. 8C). In one non-limiting embodiment, the stripes are 25 are positioned horizontally across the substrate 12 and are spaced 1 inch or less apart from one another. In one non-limiting embodiment, the stripes 25 are positioned horizontally across the substrate 12 and are spaced apart from one another by at least 2 inches. In one non-limiting embodiment, the stripes are 25 are positioned vertically across the substrate 12 and are spaced 1 inch or less apart from one another. In one non-limiting embodiment, the stripes 25 are positioned vertically across the substrate 12 and are spaced apart from one another by at least 4 inches.

The patterned feature of the third film 116 of the top layer 110 may comprise an asymmetric pattern. For example, the asymmetric pattern may be in the form of a plurality of overlapping, randomly oriented stripes, such as those described in U.S. Pat. No. 9,247,726 B2. The stripes of the asymmetric pattern may comprise a width of from 0.125 inch (3.175 mm) to 1 inch (25.4 mm). For example, the stripes of the asymmetric pattern may comprise a width of 0.125 inch (3.175 mm), such as 0.25 inch (6.35 mm), such as 0.5 inch, such as 0.75 inch (19.05 mm), or such as 1 inch (25.4 mm). The stripes of the asymmetric pattern may all comprise the same width. The stripes of the asymmetric pattern may comprise different widths. Alternatively, the asymmetric pattern may be in the form of a spider web design, such as the spider web design described in U.S. Pat. No. 9,247,726 B2.

When the third film 116 of the top layer 110 includes the patterned feature, there are no microabrasions 18 formed in the second surface 16 of the substrate 12.

When the third film 116 has a patterned feature, the third film 116 of the top layer 110 can have a total thickness in the range of from 3 nm to 60 nm, such as, from 5 nm to 55 nm, from 5 to 50 nm, from 5 nm to 40 nm, from 5 to 35 nm, from 10 nm to 55 nm, from 10 nm to 50 nm, from 10 nm to 40 nm, from 10 nm to 35 nm, from 15 nm to 55 nm, from 15 nm to 50 nm, from 15 nm to 40 nm, or from 15 to 35 nm.

The top layer 110 can have a total thickness (e.g., the combined thicknesses of the layers) in the range of from 25 nm to 100 nm, such as, from 25 nm to 95 nm, from 30 to 95 nm, from 35 nm to 95 nm, from 40 nm to 95 nm, from 45 nm to 95 nm, from 50 nm to 95 nm, from 25 nm to 45 nm, or from 25 nm to 40 nm.

The functional coating 20 may comprise a symmetric patterned feature comprising stripes 25 in the first film 32 of the base layer 30 positioned over at least a portion of the second surface 16 of the substrate 12 and a symmetric patterned feature comprising stripes 25 in third film 116 of the top layer 110. Alternatively, the functional coating 20 may comprise an asymmetric patterned feature in the first film 32 of the base layer 30 positioned over at least a portion of the second surface 16 of the substrate 12 and an asymmetric patterned feature in third film 116 of the top layer 110.

The functional coating 20 may comprise a symmetric patterned feature comprising stripes 25 in the second film 34 of the base layer 30 positioned over at least a portion of the second surface 16 of the substrate 12 and a symmetric patterned feature comprising stripes 25 in third film 116 of the top layer 110. Alternatively, the functional coating 20 may comprise an asymmetric patterned feature in the second film 34 of the base layer 30 positioned over at least a portion of the second surface 16 of the substrate 12 and an asymmetric patterned feature in third film 116 of the top layer 110.

The functional coating 20 may only comprise a symmetric patterned feature comprising stripes 25 in the third film 116 of the top layer 110. Alternatively, the functional coating 20 may only comprise an asymmetric patterned feature comprising stripes 25 in the third film 116 of the top layer 110.

The functional coating 20 that includes one metallic layer (i.e., a single metal coating 21) may comprise a symmetric patterned feature comprising stripes 25 in the metallic layer 40. Alternatively, the functional coating 20 that includes one metallic layer (i.e., a single metal coating 21) may comprise an asymmetric patterned feature in the metallic layer 40.

The functional coating 20 that includes two metallic layers (i.e., a double metal coating 22) may comprise a symmetric patterned feature comprising stripes 25 in the metallic layer 40. Alternatively, the functional coating 20 that includes two metallic layers (i.e., a double metal coating 22) may comprise an asymmetric patterned feature in the metallic layer 40. The functional coating 20 that includes two metallic layers (i.e., a double metal coating 22) may comprise a symmetric patterned feature comprising stripes 25 in the second metallic layer 60. Alternatively, the functional coating 20 that includes two metallic layers (i.e., a double metal coating 22) may comprise an asymmetric patterned feature in the second metallic layer 60.

The functional coating 20 that includes three metallic layers (i.e., a triple metal coating 23) may comprise a symmetric patterned feature comprising stripes 25 in the metallic layer 40. Alternatively, the functional coating 20 that includes three metallic layers (i.e., a triple metal coating 23) may comprise an asymmetric patterned feature in the metallic layer 40.

The functional coating 20 that includes three metallic layers (i.e., a triple metal coating 23) may comprise a symmetric patterned feature comprising stripes 25 in the second metallic layer 60. Alternatively, the functional coating 20 that includes three metallic layers (i.e., a triple metal coating 23) may comprise an asymmetric patterned feature in the second metallic layer 60. The functional coating 20 that includes three metallic layers (i.e., a triple metal coating 23) may comprise a symmetric patterned feature comprising stripes 25 in the third metallic layer 80. Alternatively, the functional coating 20 that includes three metallic layers (i.e., a triple metal coating 23) may comprise an asymmetric patterned feature in the third metallic layer 80.

The functional coating 20 that includes four metallic layers (i.e., a quadruple metal coating 24) may comprise a symmetric patterned feature comprising stripes 25 in the metallic layer 40. Alternatively, the functional coating 20 that includes four metallic layers (i.e., a quadruple metal coating 24) may comprise an asymmetric patterned feature in the metallic layer 40. The functional coating 20 that includes four metallic layers (i.e., a quadruple metal coating 24) may comprise a symmetric patterned feature comprising stripes 25 in the second metallic layer 60. Alternatively, the functional coating 20 that includes four metallic layers (i.e., a quadruple metal coating 24) may comprise an asymmetric patterned feature in the second metallic layer 60. The functional coating 20 that includes four metallic layers (i.e., a quadruple metal coating 24) may comprise a symmetric patterned feature comprising stripes 25 in the third metallic layer 80. Alternatively, the functional coating 20 that includes four metallic layers (i.e., a quadruple metal coating 24) may comprise an asymmetric patterned feature in the third metallic layer 80. The functional coating 20 that includes four metallic layers (i.e., a quadruple metal coating 23) may comprise a symmetric patterned feature comprising stripes 25 in the fourth metallic layer 100. Alternatively, the functional coating 20 that includes four metallic layers (i.e., a quadruple metal coating 24) may comprise an asymmetric patterned feature in the fourth metallic layer 100.

The functional coating 20 may comprise only one layer that comprises a patterned feature. Alternatively, the functional coating 20 may comprise two or more layers that comprise a patterned feature.

The functional coating 20 may be the only coating on the second side of the substrate 12.

An optional outermost protective coating 120 can be formed over at least a portion of the top layer 110 of the functional coating 20 and can be the outermost coating of the coated article. The outermost protective coating 120 can help protect the underlying functional coating layers, from mechanical and/or chemical attack. The outermost protective coating 120 can be an oxygen barrier coating layer to prevent or reduce the passage of ambient oxygen into the underlying layers of the coating, such as, during heating or bending. The outermost protective coating 120 can be of any desired material or mixture of materials and can be comprised of one or more protective films. The outermost protective coating 120 comprises a protective layer, wherein the protective layer comprises at least one of $Si_3N_4$, SiAlN, SiAlON, SiAlO, TiAlO, titania, alumina, silica, zirconia, or combinations thereof.

In one embodiment, the outermost protective coating 120 may be comprised of a first protective film 122 and second protective film 124 over at least a portion of the first protective film 122. In one embodiment, the first protective film 122 comprises a metal nitride film, e.g., a silicon aluminum nitride, disposed over and in contact with metal oxynitride film (e.g., silicon aluminum oxynitride) of the top layer 110 and the second protective film 124 comprises a metal alloy oxide, such as titanium aluminum oxide, disposed over and in contact with the first protective film 122.

In one embodiment, the metal oxynitride film of the top layer 110 is a metal oxynitride of the same metal as in the first protective metal nitride film 122 that contacts the metal oxynitride film of the top layer 110. In another embodiment, the metal oxynitride film of the top layer 110 is a gradient layer wherein the portion of the metal oxynitride film that is closest to the uppermost metal alloy film of the top layer 110 comprises a greater amount of oxygen, and the opposite portion of the metal oxynitride film, e.g., that is closest to the first protective metal nitride film 122, comprises a greater amount of nitrogen, for example, in atomic ratios described above. In one embodiment, the metal oxynitride film of the top layer 110 and the first protective metal nitride film 122 form a continuous, single gradient layer. In another embodiment, the metal oxynitride film of the top layer 110 is applied over a metal alloy oxide film and/or in between a metal alloy oxide film and the first protective metal nitride film 122. In another embodiment, the first protective metal nitride film 122 is not present, and the metal oxynitride film of the top layer 110 is a gradient layer, wherein amount of oxygen in the metal oxynitride film of the top layer 110 decreases with increased distance from the metal alloy oxide film of top layer 110. For example, the portion of the metal oxynitride film of the top layer 110 that is closest to the uppermost metal alloy oxide film of the top layer 110 comprises a greater amount of oxygen, and the opposite portion of the oxynitride film of the top layer 110, comprises a greater amount of nitrogen, where the atomic ratio of oxygen and nitrogen in metal oxynitrides is an approximation based on the flow rate of nitrogen ($N_2$) and the flow rate of $O_2$. The oxynitride film of the top layer 110 comprises 0 wt. % oxygen, and not more than 50 wt. % oxygen; not more than 40 wt. % oxygen; not more than 30 wt. % oxygen; not more than 20 wt. % oxygen; not more than 10 wt. % oxygen; not more than 5 wt. % oxygen. Non-limiting examples of useful atomic ratios of oxygen and nitrogen in the oxynitride film of the top layer 110 include, for example, and without limitation, from 5% to 45% O with from 95% to 55% N; from 10 to 50% O with from 90% to 50% N; from 15% to 40% O to 85% to 60% N; from 20% to 50% O to 80% to 50% N; from 25% to 45% O to 75% to 55% N; from 30% to 50% O to 70% to 50% N; from 40% to 50% O to 60% to 50% N; or 50% O with 50% N.

The metal oxynitride film of the top layer 110 can have a thickness in the range of from >0 nm to 40 nm, such as, from 7 nm to 40 nm, from 10 nm to 40 nm, from 28 nm to 33 nm, or from 12 nm to 22 nm. In embodiments where the metal oxynitride film of the top layer 110 is a gradient layer, or where there is no metal nitride film in the outermost protective coating, it may have a thickness of from 20 nm to 40 nm, such as, from 22.5 nm to 39 nm, such as, from 25 nm to 38 nm, such as, from 28 nm to 37.5 nm.

The first protective metal nitride film 122 can have a thickness in the range of from >0 nm to 40 nm, such as, from 7 nm to 40 nm, such as, from 10 nm to 40 nm, such as, from 25 nm to 40 nm, such as, from 28 nm to 33 nm, such as, from 20 nm to 25 nm, such as, from 20 nm to 40 nm, such as, from 10 nm to 16 nm. In embodiments where there is no metal oxynitride film of the top layer 110 and/or no second protective film, the first protective metal nitride film 122 can have a thickness in the range of 10 nm to 40 nm, preferably, 25 nm to 40 nm, most preferably, 28 nm to 33 nm. In embodiments where the top layer 110 has a metal oxynitride film and the outermost protective coating 120 has a second protective film 124, the first protective metal nitride film 122 can have a thickness of 10 nm to 40 nm, such as, from 10 nm to 33 nm, such as, from 10.5 nm to 30 nm, such as, from 11.5 nm to 25 nm. In embodiments where the protective coating 120 has both a first protective metal nitride 122 film and a second protective film 124, the metal oxynitride film of the top layer 110 can have a thickness of from 5 nm to 28 nm, such as, from 7.5 nm to 26 nm, such as, from 10 nm to 24 nm, such as, from 12 nm to 22 nm.

In certain embodiments, the invention has a combined thickness of the metal oxynitride film of the top layer 110 (if present) and/or the first protective metal nitride film 122 (if present) of between 20 nm and 80 nm, for example, 32 nm to 80 nm, 32 nm to 38 nm, or 28 nm to 37 nm.

In certain embodiments, the outermost protective coating 120 can comprise a second protective film 124 comprising TiAlO. Non-limiting examples of the second protective film 124 may have a thickness range of such as, from 10 nm to 40 nm, such as, from 20 nm to 37 nm, such as, from 24.5 nm to 30 nm, such as, from 28.5 nm to 30 nm. It is to be understood that the second protective film 124 may be applied, e.g., as the top-most layer, to any other configuration of the top layer, metal nitride films, and metal oxynitride films consistent with the present disclosure. Alternatively, additional functional layers or protective layers may be applied over the second protective film 124 (not shown). This additional protective film can be any of the materials used to form the protective coating 120, or the second protective film 124, or any material that may be used as a topcoat. Similarly, it is to be understood that a coated article need not include a second protective film 124.

The outermost protective coating 120 has a total thickness (i.e., the sum of all of the thickness of the layers or films within the protective coating 120) in the range of from 20 nm to 80 nm, such as, from 30 nm to 70 nm, such as, from 35 nm to 60 nm, such as, from 40 nm to 55 nm.

The outermost protective coating 120 can also comprise a single titania film. The single titania film can have a thickness of from 1 nm to 10 nm, such as, from 2 nm to 8 nm, or such as, from 2 nm to 3 nm.

Figure 10:
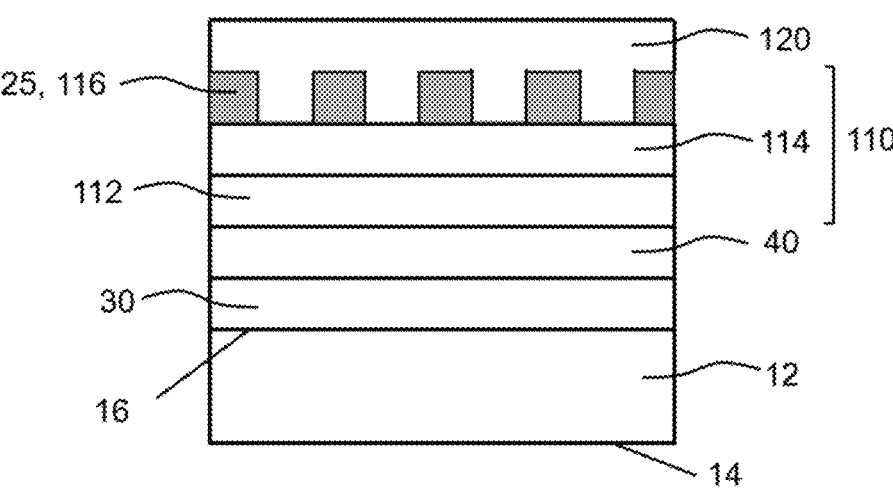
FIG. 10 is a sectional view (not to scale) of a third film of a top layer of a functional coating having a symmetric patterned feature.

When the functional coating 20 comprises a patterned feature comprising stripes 25 in third film 116 of the top layer 110, the outermost protective coating 120 may be in direct contact with at least a portion of the third film 116 of the top layer 110 and the second film 114 of the top layer 110. An exemplary coated article having a symmetric patterned feature comprising stripes 25 is provided in FIG. 10. For example, when the functional coating 20 comprises a patterned feature comprising stripes 25 in third film 116 of the top layer 110, the first protective film 122 of the outermost protective coating 120 may be in direct contact with at least a portion of the third film 116 of the top layer 110 and the second film 114 of the top layer 110.

When the outermost protective coating 120 is positioned over the functional coating 20 positioned over at least a portion of the second side of the substrate 12, the outermost protective coating 120 may comprise a patterned feature. The patterned feature may comprise a symmetric pattern. The patterned feature may comprise an asymmetric pattern.

Figure 21:
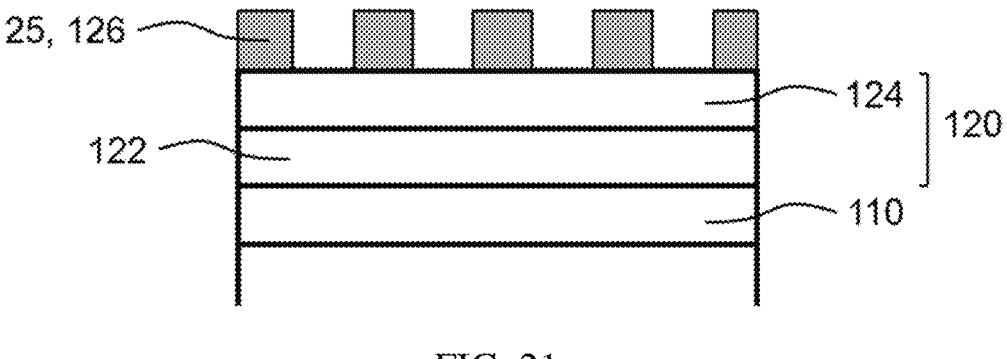
FIG. 21 is a sectional view (not to scale) of an outermost protective coating having a symmetric patterned feature.

When the outermost protective coating 120 comprises a first protective film 122 and a second protective film 124, a patterned film 126 may be positioned over at least a portion of the second protective film 124 to form the patterned feature. An exemplary coated article having a symmetric patterned feature comprising stripes 25 is provided in FIG. 21. The additional layers of the functional coating 20 are not included in FIG. 21.

When the outermost protective coating 120 comprises a single protective film, a patterned film 126 may be positioned over at least a portion of the single protective film to form the patterned feature. An exemplary coated article having a symmetric patterned feature comprising stripes 25 is provided in FIG. 22. The additional layers of the functional coating 20 are not included in FIG. 22. For example, the outermost protective coating 120 may comprise a single titania film and a patterned film 126 of silicon aluminum oxide may be positioned over at least a portion of the single titania film to form the patterned feature.

The patterned film 126 may comprise a thickness in the range of from 1 nm to 100 nm or such as from 10 nm to 100 nm. When the outermost protective coating 120 comprises a single protective film, the patterned film 126 may comprise a thickness in the range of from 10 nm to 25 nm or such as from 12 nm to 25 nm. When the outermost protective coating 120 comprises a first protective film 122 and a second protective film 124, the patterned film 126 may comprise a thickness in the range of from 15 nm to 100 nm or such as from 20 nm to 100 nm.

The patterned film 126 may be a metal oxide, metal alloy oxide, metal nitride, metal alloy nitride, metal oxynitride, or metal alloy oxynitride-containing film, such as, those described above with respect to the first film 32 and second film 34 of the base layer 30.

For example, the patterned film 126 may be positioned over at least a portion of the second protective film 124 (FIG. 21) or the single protective film (FIG. 22) to form a symmetric pattern. The symmetric pattern may comprise stripes over at least of a portion of the second surface 16 of the substrate 12. The stripes 25 may comprise a width of at least 0.1 inch (2.54 mm), at least 0.25 inch (6.35 mm), at least 0.5 inch (12.7 mm), at least 0.75 inch (19.05 mm), at least 1 inch (25.4 mm), or at least 2 inches (50.8 mm). The stripes 25 may be spaced 1 inch (25.4 mm) or less apart from one another across the substrate 12. For example, the stripes 25 may be spaced at least 0.1 inch (2.54 mm), at least 0.25 inch (6.35 mm), at least 0.5 inch (12.7 mm), at least 0.75 inch (19.05 mm), or 1 inch (25.4 mm) from each other across the substrate 12. Alternatively, the stripes 25 may be spaced by at least 2 inches (50.8 mm), such as by at least 3 inches (76.2 mm), or such as by at least 4 inches (101.6 mm) apart across the substrate 12.

Alternatively, the patterned film 126 may be positioned over at least a portion of the second protective film 124 or the single protective film to form an asymmetric pattern. For example, the asymmetric pattern may be in the form of a plurality of overlapping, randomly oriented stripes, such as those described in U.S. Pat. No. 9,247,726 B2. The stripes of the asymmetric pattern may comprise a width of from 0.125 inch (3.175 mm) to 1 inch (25.4 mm). For example, the stripes of the asymmetric pattern may comprise a width of 0.125 inch (3.175 mm), such as 0.25 inch (6.35 mm), such as 0.5 inch, such as 0.75 inch (19.05 mm), or such as 1 inch (25.4 mm). The stripes of the asymmetric pattern may all comprise the same width. The stripes of the asymmetric pattern may comprise different widths. Alternatively, the asymmetric pattern may be in the form of a spider web design, such as the spider web design described in U.S. Pat. No. 9,247,726 B2.

In the practice of the invention, by selecting a particular metal for the metallic layers, selecting a primer material and thickness, and selecting dielectric material(s) and thickness, the absorbed color (e.g., tint) of the coating can be varied. The coated articles of the present invention may be non-temperable. The coated articles of the present invention may be temperable. In the practice of the invention, it is desired to maintain the color of the coated article before and after tempering.

The present invention is also directed to a method of making a coated article. A substrate 12 comprising a first side comprising a first surface 14 and a second side comprising a second surface 16, where the second surface 16 is opposite the first surface 14 is provided. A functional coating 20 is formed over at least a portion of the second side of the substrate 12. Forming the functional coating 20, includes forming a base layer 30 over at least a portion of the second surface 16, wherein forming the base layer 30 comprises: forming a first film 32 over at least a portion of the second surface 16, and forming a second film 34 over at least a portion of the first film 32. The first film 32 and the second film 34 can be any of the materials as described herein. A metallic layer 40 is formed over at least a portion of the base layer 30. The metallic layer 40 can be any metallic layer as described herein. A top layer 110 is formed over at least a portion of the metallic layer 40. The top layer 110 can be any top layer 110 as described herein. The forming of the base layer 30, metallic layer 40, and top layer 110 creates the functional coating 20 of the coated article 10. The functional coating 20 may comprise additional layers as described herein. The second side of the substrate 12 comprises a patterned feature. The patterned feature may be a symmetric pattern. The patterned feature may be an asymmetric pattern. The patterned feature may be formed in the second surface 16 of the substrate 12 and may comprise microabrasions 18. Alternatively, the patterned feature may be formed in the functional coating 20 over at least a portion of the second side of the substrate 12. When the functional coating 20 on the second side of the substrate 12 comprises the patterned feature, the patterned feature may be formed in the first film 32 of the base layer 30. Alternatively, when the functional coating 20 on the second side of the substrate 12 comprises the patterned feature, the patterned feature may be formed in the second film 34 of the base layer 30. Alternatively, when the functional coating 20 on the second side of the substrate 12 comprises the patterned feature, the patterned feature may be formed in the third film 116 of the top layer 110. Alternatively, when the functional coating 20 on the second side of the substrate 12 comprises the patterned feature, the patterned feature may be formed in the second film 54 of the second layer 50. Alternatively, when the functional coating 20 on the second side of the substrate 12 comprises the patterned feature and the functional coating 20 includes one, two, three, or metallic layers (i.e., a single metal coating 21, a double metal coating 22, a triple metal coating 23, or a quadruple metal coating), the patterned feature may be formed in the metallic layer 40. Alternatively, when the functional coating 20 on the second side of the substrate 12 comprises the patterned feature and the functional coating 20 includes two metallic layers (i.e., a double metal coating 22), the patterned feature may be formed in the metallic layer 40. Alternatively, when the functional coating 20 on the second side of the substrate 12 comprises the patterned feature and the functional coating 20 includes two metallic layers (i.e., a double metal coating 22), the patterned feature may be formed in the second metallic layer 60. Alternatively, when the functional coating 20 on the second side of the substrate 12 comprises the patterned feature and the functional coating 20 includes three metallic layers (i.e., a triple metal coating 23), the patterned feature may be formed in the metallic layer 40. Alternatively, when the functional coating 20 on the second side of the substrate 12 comprises the patterned feature and the functional coating 20 includes three metallic layers (i.e., a triple metal coating 23), the patterned feature may be formed in the second metallic layer 60. Alternatively, when the functional coating 20 on the second side of the substrate 12 comprises the patterned feature and the functional coating 20 includes three metallic layers (i.e., a triple metal coating 23), the patterned feature may be formed in the third metallic layer 80. Alternatively, when the functional coating 20 on the second side of the substrate 12 comprises the patterned feature and the functional coating 20 includes four metallic layers (i.e., a quadruple metal coating 24), the patterned feature may be formed in the metallic layer 40. Alternatively, when the functional coating 20 on the second side of the substrate 12 comprises the patterned feature and the functional coating 20 includes four metallic layers (i.e., a quadruple metal coating 24), the patterned feature may be formed in the second metallic layer 60. Alternatively, when the functional coating 20 on the second side of the substrate 12 comprises the patterned feature and the functional coating 20 includes four metallic layers (i.e., a quadruple metal coating 24), the patterned feature may be formed in the third metallic layer 80. Alternatively, when the functional coating 20 on the second side of the substrate 12 comprises the patterned feature and the functional coating 20 includes four metallic layers (i.e., a quadruple metal coating 24), the patterned feature may be formed in the fourth metallic layer 100.

The patterned feature can be formed in the second surface 16 of the second side of the substrate 12 and can comprise microabrasions 18. The microabrasions 18 may be formed by chemical process, such as through a chemical etching process. The microabrasions 18 may be formed by a mechanical process. For example, the microabrasions 18 may be formed in the second surface 16 of the substrate 12 by scratching the second surface 16 of the substrate 12. The microabrasions 18 may be formed in the second surface 16 of the substrate 12 by scratching the second surface 16 of the substrate 12 with a wire brush, steel wool, sandpaper, a knife, or a combination thereof. The microabrasions 18 are formed prior to forming to the functional coating 20. The functional coating 20 may then be applied over at least a portion of the second surface 16 of the substrate 12 comprising the microabrasions 18. The coated article may then be heated to a temperature of greater than or equal to 1,185° F. (641° C.), such as a temperature greater than or equal to 1,200° F. (649° C.), such as greater than or equal to 1,260° F. (682° C.).

The patterned features may be formed in the first film 32 or second film 34 of the base layer 30 of the functional coating 20 using any method known in the art, such as by masking, laser ablation, chemical etching, ion beam for material removal, ultraviolet radiation treatment, and combinations thereof.

For example, a mask may be applied over at least a portion of the second surface 16 of the substrate 12, where at least a portion of the second surface 16 of the substrate 12 is masked and the other portion of the second surface 16 of the substrate 12 is un-masked. A first film 32 of the base layer 30 may then be applied over the un-masked portion of the second surface 16 of the substrate 12. The mask may then be removed and the second film 34 of the base layer 30 is applied over the second surface 16 of the substrate 12 and the first film 32 of the base layer 30, such that the second film 32 of the base layer 30 is in direct contact with at least a portion of the first film 32 and is in direct contact with at least a portion of the second surface 16 of the substrate 12. The remaining layers of the functional coating 20 may then be applied over the second film 34 of the base layer 30. The coated article may then be heated to a temperature of greater than or equal to 1,185° F. (641° C.), such as a temperature greater than or equal to 1,200° F. (649° C.), such as greater than or equal to 1,260° F. (682° C.).

Alternatively, a mask may be applied over at least a portion of the coater comprising a material for the first film 32 of the base layer 30, where at least a portion of the coater is masked and the other portion of the coater is un-masked. The material for the first film 32 of the base layer 30 may then be applied through the un-masked portion of the coater to form the first film 32 of the base layer 30 over the second surface 16 of the substrate 12. The article comprising the first film 32 of the base layer 30 may then be moved to a second coater comprising a material for the second film 34 of the base layer 30. The material of the second film 34 of the base layer 30 may then be applied over the second surface 16 of the substrate 12 and the first film 32 of the base layer 30, such that the second film 32 of the base layer 30 is in direct contact with at least a portion of the first film 32 and is in direct contact with at least a portion of the second surface 16 of the substrate 12. The remaining layers of the functional coating 20 may then be applied over the second film 34 of the base layer 30. The coated article may then be heated to a temperature of greater than or equal to 1,185° F. (641° C.), such as a temperature greater than or equal to 1,200° F. (649° C.), such as greater than or equal to 1,260° F. (682° C.).

A first film 32 of the base layer 30 may be applied over at least a portion of the second surface 16 of the substrate 12. A mask may be applied over at least a portion of the first film 32 of the base layer 30, where at least a portion of the first film 32 of the base layer 30 is masked and the other portion of the first film 32 of the base layer 30 is un-masked. A second film 34 of the base layer 30 may then be applied over the un-masked portion of the first film 32 of the base layer 30. The mask may then be removed and the metallic layer 40 may be applied over the first film 32 of the base layer 30 and the second film 34 of the base layer 30, such that the metallic layer 40 is in direct contact with at least a portion of the first film 32 of the base layer 30 and is in direct contact with at least a portion of the second film 34 of the base layer 30. The remaining layers of the functional coating 20 may then be applied over the metallic layer 40. The coated article may then be heated to a temperature of greater than or equal to 1,185° F. (641° C.), such as a temperature greater than or equal to 1,200° F. (649° C.), such as greater than or equal to 1,260° F. (682° C.).

Alternatively, a first film 32 of the base layer 30 may be applied over at least a portion of the second surface 16 of the substrate 12. The article comprising the first film 32 of the base layer 32 is moved to a coater comprising a material for forming the second film 34 of the base layer 30, wherein at least a portion of the coater is masked and the other portion of the coater is un-masked. The material for the second film 34 of the base layer 30 may then be applied through the un-masked portion of the coater to form the second film 34 of the base layer 30 over the first film 32 of the base layer. The article comprising the first film 32 and the second film 34 of the base layer 30 may then be moved to a second coater comprising a material for the metallic layer 40. The material for the metallic layer 40 may then be applied over the first film 32 and the second film 34 of the base layer 30, such that the metallic layer 40 is in direct contact with at least a portion of the first film 32 of the base layer 30 and is in direct contact with at least a portion of the second film 34 of the base layer 30. The remaining layers of the functional coating 20 may then be applied over the metallic layer 40. The coated article may then be heated to a temperature of greater than or equal to 1,185° F. (641° C.), such as a temperature greater than or equal to 1,200° F. (649° C.), such as greater than or equal to 1,260° F. (682° C.).

A first film 32 of the base layer 30 may be applied over at least a portion of the second surface 16 of the substrate 12. A mask may be applied over at least a portion of the first film 32 of the base layer 30, where at least a portion of the first film 32 of the base layer 30 is masked and the other portion of the first film 32 of the base layer 30 is un-masked. A second film 34 of the base layer 30 may then be applied over the un-masked portion of the first film 32 of the base layer 30. The mask may then be removed and the third film of the base layer 30 may be applied over the first film 32 of the base layer 30 and the second film 34 of the base layer 30, such that the third film of the base layer 30 is in direct contact with at least a portion of the first film 32 of the base layer 30 and is in direct contact with at least a portion of the second film 34 of the base layer 30. The remaining layers of the functional coating 20 may then be applied over the third film of the base layer 30. The coated article may then be heated to a temperature of greater than or equal to 1,185° F.

(641° C.), such as a temperature greater than or equal to 1,200° F. (649° C.), such as greater than or equal to 1,260° F. (682° C.).

Alternatively, a first film 32 of the base layer 30 may be applied over at least a portion of the second surface 16 of the substrate 12. The article comprising the first film 32 of the base layer 32 is moved to a coater comprising a material for forming the second film 34 of the base layer 30, wherein at least a portion of the coater is masked and the other portion of the coater is un-masked. The material for the second film 34 of the base layer 30 may then be applied through the un-masked portion of the coater to form the second film 34 of the base layer 30 over the first film 32 of the base layer. The article comprising the first film 32 and the second film 34 of the base layer 30 may then be moved to a second coater comprising a material for the third film of the base layer 30. The material for the third film of the base layer 30 may then be applied over the first film 32 and the second film 34 of the base layer 30, such that the third film of the base layer 30 is in direct contact with at least a portion of the first film 32 of the base layer 30 and is in direct contact with at least a portion of the second film 34 of the base layer 30. The remaining layers of the functional coating 20 may then be applied over the third film of the base layer 30. The coated article may then be heated to a temperature of greater than or equal to 1,185° F. (641° C.), such as a temperature greater than or equal to 1,200° F. (649° C.), such as greater than or equal to 1,260° F. (682° C.).

The patterned feature may be formed in the second film 54 of the second layer 54 of the functional coating 20 using any method known in the art, such as by masking, laser ablation, chemical etching, ion bombardment for material removal, ultraviolet radiation treatment, and combinations thereof.

For example, a mask may be applied over at least a portion of the second film 54 of the second layer 50, where at least a portion of the second film 54 of the second layer 50 is masked and the other portion of the second film 54 of the second layer 54 is un-masked. From 18 nm to 35 nm, or such as from 22 nm to 30 nm of second film 54 may then be applied over the un-masked portion of the second film 54 of the second layer 54 to form the patterned feature. The mask may then be removed and the third film 56 of the second layer 50 may then be applied over the second film 54 and the patterned feature of the second film 54 of the second layer 50.

For example, the second film 54 of the second layer 50 may be applied over at least portion of the first film 52 of the second layer 50. A mask may be applied over a coater comprising the material for forming the second film 54, wherein at least a portion of the coater is masked and the other portion of the coater is un-masked. The material for forming the second film 54 of the second layer 50, such as from 18 nm to 35 nm, or such as from 22 nm to 30 nm of the material for forming the second film, may then be applied through the un-masked portion of the coater onto the second film 54 of the second layer 50. The article comprising the first film 52 and the second film 54 may then be moved to a second coater comprising a material for forming the third film 56 of the second layer 50. The material for forming the third film 56 of the second layer 50 may then be applied over the second film 54 of the second layer 50 to form the third film 56. The remaining layers of the functional coating 20 may then be applied over the third film 56 of the second layer 50.

The patterned feature may be formed in the third film 116 of the top layer 110 of the functional coating 20 using any method known in the art, such as by masking, laser ablation, method known in the art, such as by masking, laser ablation, chemical etching, ion bombardment for material removal, ultraviolet radiation treatment, and combinations thereof.

For example, a mask may be applied over at least a portion of the second film 114 of the top layer 110, where at least a portion of the second film 114 of the top layer 110 is masked and the other portion of the second film 114 of the top layer 110 is un-masked. The third film 116 of the top layer 110 may then be applied over the un-masked portion of the second film 114 of the top layer 110. The mask may then be removed.

Alternatively, a mask may be applied over a coater comprising a material for forming the third film 116 of the top layer 110, wherein at least a portion of the coater is masked and the other portion of the coater is un-masked. The material for the third film 116 of the top layer 110 may then be applied through the un-masked portion of the coater to form the third film 116 of the top layer 110. The outermost protective coating 120, if present, may then be applied over the third film 116 of the top layer 110.

The patterned feature may be formed in the outermost protective coating 120 positioned over at least a portion of the functional coating 20 using any method known in the art, such as by masking, laser ablation, chemical etching, ion bombardment for material removal, ultraviolet radiation treatment, and combinations thereof.

When the outermost protective coating 120 comprises a first protective film 122 and a second protective film 124, a mask may be applied over at least a portion of the second protective film 124 of the outermost protective coating 120, where at least a portion of the second protective film 124 of the outermost protective coating 120 is masked and the other portion of the second protective film 124 of the outermost protective coating 120 is un-masked. The patterned film 126 may then be applied over the un-masked portion of the second protective film 120 of the outermost protective coating 120. The mask may then be removed.

When the outermost protective coating 120 comprises a single protective layer, a mask may be applied over at least a portion of the single protective layer of the outermost protective coating 120, where at least a portion of the single protective layer of the outermost protective coating 120 is masked and the other portion of the single protective layer of the outermost protective coating 120 is un-masked. The patterned film 126 may then be applied over the un-masked portion of the single protective layer of the outermost protective coating 120. The mask may then be removed.

Figure 22:
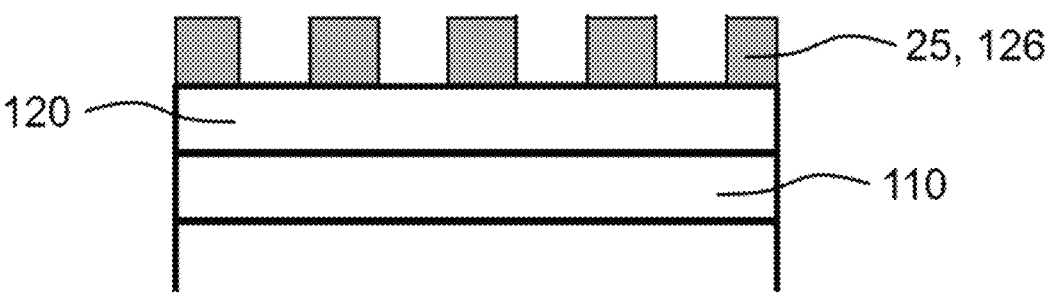
FIG. 22 is a sectional view (not to scale) of an outermost protective coating having a symmetric patterned feature.

Alternatively, a mask may be applied over a coater comprising a material for forming the patterned film 126, wherein at least a portion of the coater is masked and the other portion of the coater is un-masked. The material for the patterned film 126 may then be applied through the un-masked portion of the coater to form the patterned film 126 over at least a portion of the second film 124 of the outermost protective coating 120 (FIG. 21) or the single protective layer of the outermost protective coating 120 (FIG. 22).

Substrates comprising a functional coating 20 positioned over at least a portion of the second side of the substrate 12 may be heated to a temperature that is greater than or equal to 1,185° F., such as greater than or equal to 1,200° F. (649° C.), such as greater than or equal to 1,260° F. (682° C.) to induce microscopic scattering center formation and red haze when the patterned feature comprises microabrasions 18 that are formed in the second surface 16 of the second side of the substrate 12, when the patterned feature is formed in the first film 32 of the base layer 30 over at least a portion of the second surface 16 of the substrate 12, or when the patterned feature is formed in the second film 34 of the base layer 30 over at least a portion of the first film 32 of the base layer 30.

By "scattering center" is meant a feature with a length scale of less than 1 nm to hundreds of microns in the functional coating. For example, the scattering center can be a crystal or a crystal mass. The scattering can be a void that develops after the metallic layer is heated. Scattering centers may form due to the migration and reorganization of species in the functional coating after heating. Scattering centers may form in or around a metallic layer after heating. Scattering centers may form as a result of metallic atom migration from a metallic layer into other layers of the functional coating.

Scattering centers that do form when the coated article is heated to a temperature of greater than or equal to 1,185° F. may increase in size when the coated article is then heated to a temperature that is greater than or equal to 1,200° F. As used herein, this temperature refers to the temperature of the surface of the substrate comprising the coating.

Scattering centers that form within the metallic layer, as described herein above, can be light scattering features, where light scattering features cause the coated article to have an increase in haze (i.e., light scattering), such as an increase in red haze. Scattering centers within the metallic layer cause the light waves of electromagnetic energy to travel more randomly and disrupt the waveguide effect, which increases the amount of electromagnetic energy that passes through the metallic layer, into the substrate, and then exits the bottom surface of the substrate. "Red haze" as described herein relates to a light scattering effect which is visible if a coated article is illuminated by a bright light in front of a dark background. The red haze is formed as a result of voids (depletions or vacancies) that form in the metallic layer during the tempering or heat strengthening process. Alkali metal ion, such as sodium ions, mobility in the glass and the coating stack during heating leads to nucleation and growth that results in the scattering center formation. The interference effects of the multi-layer functional coating and the location of the scattering center formation leads to a coated article having red haze, allowing for the patterned feature to viewed.

The patterned features may be formed in the metallic layer 20 of the functional coating 20 that includes one, two, three, or four metallic layers (i.e., a single metal coating 21, a double metal coating 22, a triple metal coating 23, or a quadruple metal coating 24) using any method known in the art, such as by masking, laser ablation, chemical etching, ion beam for material removal, ultraviolet radiation treatment, and combinations thereof.

For example, a mask may be applied over at least a portion of the metallic layer 40, where at least a portion of the metallic layer 40 is masked and the other portion of the metallic layer 40 is un-masked. From 1 nm to 20 nm, such as from 1 nm to 15 nm, such as from 1 nm to 10 nm, or such as from 2 nm to 8 nm of additional metallic layer 40 may be applied over the un-masked portion of the metallic layer 40 to form the patterned feature. The mask may then be removed and the remaining layers of the functional coating 20 may then be applied over the metallic layer 40.

Alternatively, after applying the metallic layer 40, a mask may be applied over the coater comprising a material for forming the metallic layer 40, wherein at least a portion of the coater is masked and the other portion of the coater is un-masked. From 1 nm to 20 nm, such as from 1 nm to 15 nm, such as from 1 nm to 10 nm, or such as from 2 nm to 8 nm of the material for forming the metallic layer 40 may then be applied through the un-masked portion of the coater to form the patterned feature. The remaining layers of the functional coating 20 may then be applied over the metallic layer 40.

The patterned feature may be formed in the second metallic layer 60 of the functional coating 20 that includes two, three, or four metallic layers (i.e., a double metal coating 22, a triple metal coating 23, or a quadruple metal coating 24) using any method known in the art, such as by masking, laser ablation, chemical etching, ion beam for material removal, ultraviolet radiation treatment, and combinations thereof.

For example, after applying the second metallic layer 60, a mask may be applied over at least a portion of the second metallic layer 60, where at least a portion of the second metallic layer 60 is masked and the other portion of the second metallic layer 60 is un-masked. From 1 nm to 20 nm, such as from 1 nm to 15 nm, such as from 1 nm to 10 nm, or such as from 2 nm to 8 nm of additional second metallic layer 60 may be applied over the un-masked portion of the second metallic layer 60 to form the patterned feature. The mask may then be removed and the remaining layers of the functional coating 22, 23, or 24 may then be applied over the second metallic layer 60.

Alternatively, after applying the second metallic layer 60, a mask may be applied over the coater comprising a material for forming the second metallic layer 60, wherein at least a portion of the coater is masked and the other portion of the coater is un-masked. From 1 nm to 20 nm, such as from 1 nm to 15 nm, such as from 1 nm to 10 nm, or such as from 2 nm to 8 nm of the material for forming the second metallic layer 60 may then be applied through the un-masked portion of the coater to form the patterned feature. The remaining layers of the functional coating 22, 23, or 24 may then be applied over the second metallic layer 60.

When the functional coating 20 is a double metal coating 22, the top layer 110 is applied over the second metallic layer 60, such that the top layer 110 is in direct contact with at least a portion of the second metallic layer 60 and is in direct contact with at least a portion of the patterned feature of the second metallic layer 60 (i.e., the additional second metallic layer). The remaining layers of the functional coating 22 may then be applied over the top layer 110. Alternatively, when the functional coating 20 is a double metal coating 22, the second primer layer 62 is applied over the second metallic layer 60, such that the second primer layer 52 is in direct contact with at least a portion of the second metallic layer 60 and is in direct contact with at least a portion of the patterned feature of the second metallic layer 60 (i.e., the additional second metallic layer). The remaining layers of the functional coating 22 may then be applied over the second primer layer 52. The patterned features may be formed in the third metallic layer 80 of the functional coating 20 that includes three metallic layers (i.e., a triple metal coating 23 or a quadruple metal coating 24) using any method known in the art, such as by masking, laser ablation, chemical etching, ion beam for material removal, ultraviolet radiation treatment, and combinations thereof.

For example, after applying the third metallic layer 80, a mask may be applied over at least a portion of the third metallic layer 80, where at least a portion of the third metallic layer 80 is masked and the other portion of the third metallic layer 80 is un-masked. From 1 nm to 20 nm, such as from 1 nm to 15 nm, such as from 1 nm to 10 nm, or such as from 2 nm to 8 nm of additional third metallic layer 80 may be applied over the un-masked portion of the third metallic layer 80 to form the patterned feature. The mask may then be removed.

Alternatively, after applying the third metallic layer 80, a mask may be applied over the coater comprising a material for forming the third metallic layer 80, wherein at least a portion of the coater is masked and the other portion of the coater is un-masked. From 1 nm to 20 nm, such as from 1 nm to 15 nm, such as from 1 nm to 10 nm, or such as from 2 nm to 8 nm of the material for forming the third metallic layer 80 may then be applied through the un-masked portion of the coater to form the patterned feature. The remaining layers of the functional coating 23 or 24 may then be applied over the third metallic layer 80.

When the functional coating 20 is a triple metal coating 23, the top layer 110 is applied over the third metallic layer 80, such that the top layer 110 is in direct contact with at least a portion of the third metallic layer 80 and is in direct contact with at least a portion of the patterned feature of the third metallic layer 80 (i.e., the additional third metallic layer). The remaining layers of the functional coating 23 may then be applied over the top layer 110. Alternatively, when the functional coating 20 is a triple metal coating 23, the third primer layer 82 is applied over the third metallic layer 80, such that the third primer layer 82 is in direct contact with at least a portion of the third metallic layer 80 and is in direct contact with at least a portion of the patterned feature of the third metallic layer 80 (i.e., the additional third metallic layer). The remaining layers of the functional coating 23 may then be applied over the third primer layer 82.

The patterned features may be formed in the fourth metallic layer 100 of the functional coating 20 that includes four metallic layers (i.e., a quadruple metal coating 24) using any method known in the art, such as by masking, laser ablation, chemical etching, ion beam for material removal, ultraviolet radiation treatment, and combinations thereof.

For example, after forming the fourth metallic layer 100, a mask may be applied over at least a portion of the fourth metallic layer 100, where at least a portion of the fourth metallic layer 100 is masked and the other portion of the fourth metallic layer 100 is un-masked. From 1 nm to 20 nm, such as from 1 nm to 15 nm, such as from 1 nm to 10 nm, or such as from 2 nm to 8 nm of additional fourth metallic layer 100 may be applied over the un-masked portion of the fourth metallic layer 100 to form the patterned feature. The mask may then be removed.

Alternatively, after applying the fourth metallic layer 100, a mask may be applied over the coater comprising a material for forming the fourth metallic layer 100, wherein at least a portion of the coater is masked and the other portion of the coater is un-masked. From 1 nm to 20 nm, such as from 1 nm to 15 nm, such as from 1 nm to 10 nm, or such as from 2 nm to 8 nm of the material for forming fourth metallic layer 100 may then be applied through the un-masked portion of the coater to form the patterned feature. The remaining layers of the functional coating 22 may then be applied over the fourth metallic layer.

When the functional coating 20 is a quadruple metal coating 24, the top layer 110 is applied over the fourth metallic layer 100, such that the top layer 110 is in direct contact with at least a portion of the fourth metallic layer 100 and is in direct contact with at least a portion of the patterned feature of the fourth metallic layer 100 (i.e., the additional fourth metallic layer). The remaining layers of the functional coating 24 may then be applied over the top layer 110. Alternatively, when the functional coating 20 is a quadruple metal coating 24, the fourth primer layer 102 is applied over the fourth metallic layer 100, such that the fourth primer layer 102 is in direct contact with at least a portion of the fourth metallic layer 100 and is in direct contact with at least a portion of the patterned feature of the fourth metallic layer 100 (i.e., the additional fourth metallic layer). The remaining layers of the functional coating 24 may then be applied over the fourth primer layer 102.

Figure 11:
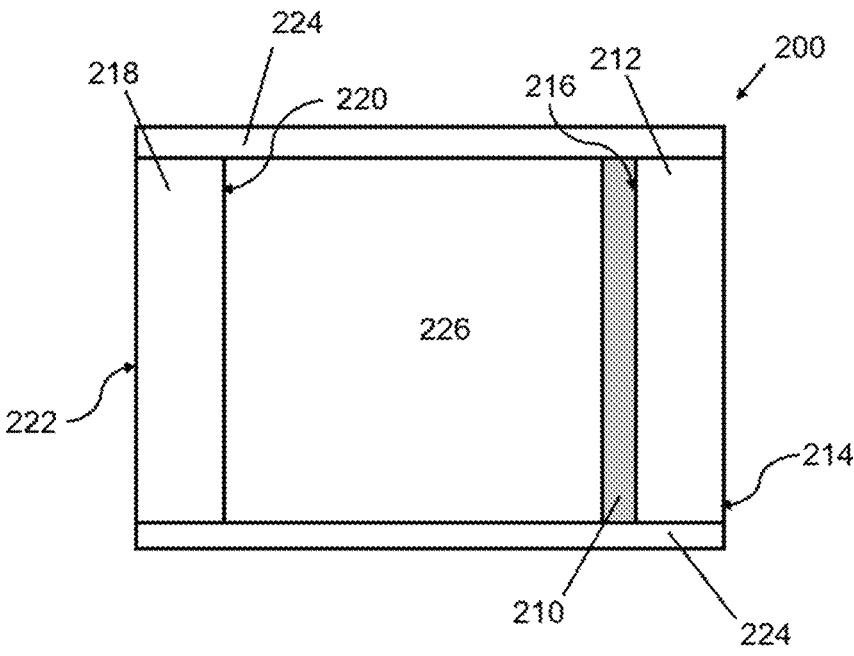
FIG. 11 is a side view (not to scale) of an exemplary insulating glass unit ("IGU") having a coating of the invention.

The coated articles described herein can be used in an architectural transparency or architectural glazing, such as, but not limited to, an insulating glass unit. A non-limiting insulating glass unit 200 incorporating the features of the invention is provided in FIG. 11. The insulating glass unit 200 includes a first ply 212 comprising a first side comprising a No. 1 surface 214 and second side comprising a No. 2 surface 216, where the No. 2 surface 216 is opposite the No. 1 surface 214. In the illustrated non-limiting embodiment, the first major surface 214 faces the building exterior, i.e., is an outer major surface, and the second major surface 216 faces the interior of the building. The insulated glass unit 200 also includes a second ply 218 comprising a first side comprising a No. 3 surface 220 and a second side comprising a No. 4 surface 222, where the No. 4 surface is opposite the No. 3 surface 220. The second ply 18 is spaced from the first ply 12. In some embodiments, the insulating glass unit 200 includes a third ply with a first side and a second side. The first side of the third ply comprises a first major surface (No. 5 surface) and an opposed second side of the third ply comprises a second major surface (No. 6 surface). This numbering of the ply surfaces is in keeping with conventional practice in the fenestration art. The plies 212, 218 can have any desired visible light, infrared radiation, or ultraviolet radiation transmission and/or reflection. For example, the plies 212, 128 can have a visible light transmission of any desired amount, e.g., greater than 0% up to 100%. The plies 212, 218 can each be, for example, clear float glass or can be tinted or colored glass or one ply 212, 218 can be clear glass and the other ply 212, 218 colored glass. Although not limiting to the invention, examples of glass suitable for the first ply 212 and/or second ply 218 are described in U.S. Pat. Nos. 4,746,347; 4,792,536; 5,030,593; 5,030,594; 5,240,886; 5,385,872; and 5,393,593. Examples of insulating glass units are found, for example, in U.S. Pat. Nos. 4,193,236; 4,464,874; 5,088,258; and 5,106,663.

The first ply 212 and second ply 218 are connected together in any suitable manner, such as, by being adhesively bonded to a conventional spacer frame 224. A gap or chamber 226 is formed between the first ply 212 and the second ply 218. The chamber 226 can be filled with a selected atmosphere, such as, air, or a non-reactive gas such as, argon or krypton gas.

A functional coating 210 (or any of the other coatings described herein) is positioned over at least a portion of the second side comprising the No. 2 surface 216 of the first ply 212. The functional coating 210 may comprise, consist essentially of, or consist of any of the functional coatings described herein. The functional coating 210 is not over at least a portion of the first side comprising the No. 1 surface 214 of the first ply 212. The functional coating 210 is not over at least a portion of the first side comprising the No. 3 surface 220 of the second ply 218. The functional coating 210 is not over at least a portion of the second side comprising the No. 4 surface 222 of the second ply 218.

The functional coating 210 comprises a base layer 30 positioned over at least a portion of the No. 2 surface 216 of the first ply 212. The base layer 30 comprises a first film 32 positioned over at least a portion of the No. 2 surface 216 and a second film 34 positioned over at least a portion of the first film 34. The first film 32 and the second film 34 can be any of the materials as described herein. A metallic layer 40 is positioned over at least a portion of the base layer 30. The metallic layer 40 can be any metallic layer as described herein. A top layer 110 is positioned over at least a portion of the metallic layer 40. The functional coating 120 may comprise additional layers as described herein.

The second side comprising the No. 2 surface 216 comprises a patterned feature. The patterned feature may be formed in the No. 2 surface 216 of the first ply 212 and may comprise microabrasions 18. Alternatively, the patterned feature may be formed in the functional coating 210 over at least a portion of the second side comprising the No. 2 surface 216 of the first ply 212. When the functional coating 210 on the second side comprising the No. 2 surface 216 of the first ply 212 comprises the patterned feature, the patterned feature may be formed in the first film 32 of the base layer 30. Alternatively, when the functional coating 210 on the second side comprising the No. 2 surface 216 of the first ply 212 comprises the patterned feature, the patterned feature may be formed in the second film 34 of the base layer 30. Alternatively, when the functional coating 210 on the second side comprising the No. 2 surface 216 of the first ply 212 comprises the patterned feature, the patterned feature may be formed in the third film 116 of the top layer 110. Alternatively, when the functional coating 210 on the second side comprising the No. 2 surface 216 of the first ply 212 comprises the patterned feature, the patterned feature may be formed in the second film 54 of the second layer 50. Alternatively, when the functional coating 210 on the second side comprising the No. 2 surface 216 of the first ply 212 comprises the patterned feature, the patterned feature may be formed in the metallic layer 40. Alternatively, when the functional coating 210 on the second side comprising the No. 2 surface 216 of the first ply 212 is a double metal coating 212 and comprises the patterned feature, the patterned feature may be formed in the metallic layer 40. Alternatively, when the functional coating 210 on the second side comprising the No. 2 surface 216 of the first ply 212 is a double metal coating 212 and comprises the patterned feature, the patterned feature may be formed in the second metallic layer 60. Alternatively, when the functional coating 210 on the second side comprising the No. 2 surface 216 of the first ply 212 is a triple metal coating 213 and comprises the patterned feature, the patterned feature may be formed in the metallic layer 40. Alternatively, when the functional coating 210 on the second side comprising the No. 2 surface 216 of the first ply 212 is a triple metal coating 213 and comprises the patterned feature, the patterned feature may be formed in the second metallic layer 60. Alternatively, when the functional coating 210 on the second side comprising the No. 2 surface 216 of the first ply 212 is a triple metal coating 213 and comprises the patterned feature, the patterned feature may be formed in the third metallic layer 80. Alternatively, when the functional coating 210 on the second side comprising the No. 2 surface 216 of the first ply 212 is a quadruple metal coating 214 and comprises the patterned feature, the patterned feature may be formed in the metallic layer 40. Alternatively, when the functional coating 210 on the second side comprising the No. 2 surface 216 of the first ply 212 is a quadruple metal coating 214 and comprises the patterned feature, the patterned feature may be formed in the second metallic layer 60. Alternatively, when the functional coating 210 on the second side comprising the No. 2 surface 216 of the first ply 212 is a quadruple metal coating 214 and comprises the patterned feature, the patterned feature may be formed in the third metallic layer 80. Alternatively, when the functional coating 210 on the second side comprising the No. 2 surface 216 of the first ply 212 is a quadruple metal coating 214 and comprises the patterned feature, the patterned feature may be formed in the fourth metallic layer 100. When the first ply comprises the functional coating 210 on the second side comprising the No. 2 surface 216 and the second side comprises a patterned feature comprising microabrasions 18 that are formed in the second surface 16 of the second side of the substrate 12, a patterned feature that is formed in the first film 32 of the base layer 30 over at least a portion of the second surface 16 of the substrate 12, or a patterned feature that is formed in the second film 34 of the base layer 30 over at least a portion of the first film 32 of the base layer 30, the first ply 218 may be heated to a temperature that is greater than or equal to 1,185° F. (641° C.), such as greater than or equal to 1,200° F. (649° C.), or such as greater than or equal to 1,260° F. (682° C.) to induce microscopic scattering center formation and red haze.

The following numbered clauses are illustrative of various aspects of the invention:

Clause 1: A coated article comprising: a substrate comprising a first side comprising a first surface and a second side comprising a second surface, wherein the second surface is opposite the first surface; a functional coating positioned over at least a portion of the second side, the functional coating comprising: a base layer positioned over at least a portion of the second surface, wherein the base layer comprises a first film positioned over at least a portion of the second surface, and a second film positioned over at least a portion of the first film; a metallic layer positioned over at least a portion of the base layer; and a top layer positioned over at least a portion of the metallic layer, wherein the second side comprises a patterned feature.

Clause 2: The coated article of clause 1, wherein the coated article is temperable.

Clause 3: The coated article of clause 1 or 2, wherein the patterned feature is formed in the second surface as microabrasions.

Clause 4: The coated article of clause 3, wherein the microabrasions comprise a width of at least 0.1 inch.

Clause 5: The coated article of clause 3 or 4, wherein the microabrasions are spaced apart from one another by at least 2 inches.

Clause 6: The coated article of any of clauses 3 to 5, wherein the microabrasions are positioned horizontally, vertically, or diagonally across the second surface.

Clause 7: The coated article of clause 1 or 2, wherein the patterned feature is formed in the functional coating positioned over at least a portion of the second side.

Clause 8: The coated article of clause 7, wherein the patterned feature is formed in the first film positioned over at least a portion of the second surface, and wherein the second film is in direct contact with at least a portion of the first film and is in direct contact with at least a portion of the second surface.

Clause 9: The coated article of clause 7 or 8, wherein the patterned feature is a symmetric feature comprising stripes.

Clause 10: The coated article of clause 9, wherein the stripes comprise a width of at least 0.1 inch.

Clause 11: The coated article of clause 9 or 10, wherein the stripes are spaced apart from one another by at least 2 inches.

Clause 12: The coated article of any of clauses 9 to 11, wherein the stripes are positioned horizontally, vertically, or diagonally across the second surface.

Clause 13: The coated article of clause 12, wherein the stripes are positioned horizontally across the second surface.

Clause 14: The coated article of clause 12, wherein the stripes are positioned vertically across the second surface.

Clause 15: The coated article of clause 7 or 8, wherein the patterned feature is an asymmetric pattern.

Clause 16: The coated article of clause 7, wherein the patterned feature is formed in the second film positioned over at least a portion of the first film, and wherein the metallic layer is in direct contact with at least a portion of the first film and is in direct contact with at least a portion of the second film.

Clause 17: The coated article of clause 16, wherein the patterned feature is a symmetric pattern comprising stripes.

Clause 18: The coated article of clause 17, wherein the stripes comprise a width of at least 0.1 inch.

Clause 19: The coated article of clause 17 or 18, wherein the stripes are spaced apart from one another by at least 2 inches.

Clause 20: The coated article of any of clauses 17 to 19, wherein the stripes are positioned horizontally, vertically, or diagonally across the second surface.

Clause 21: The coated article of clause 20, wherein the stripes are positioned horizontally across the second surface.

Clause 22: The coated article of clause 20, wherein the stripes are positioned vertically across the second surface.

Clause 23: The coated article of clause 16, wherein the patterned feature is an asymmetric pattern.

Clause 24: The coated article of any of clauses 1 to 23, wherein the first film comprises zinc stannate, silicon nitride, silicon oxide, silicon aluminum nitride, silicon aluminum oxide, silicon oxynitride, silicon aluminum oxynitride or tin oxide and the second film comprises zinc oxide or aluminum zinc oxide.

Clause 25: The coated article of clause 24, wherein the first film comprises zinc stannate or tin oxide and the second film comprises zinc oxide.

Clause 26: The coated article of any of clauses 7, 24, and 25, wherein the patterned feature is formed in the metallic layer positioned over at least a portion of the base layer.

Clause 27: The coated article of clause 26, wherein the patterned feature of the metallic layer comprises a thickness in the range of from 1 nm to 20 nm, such as from 1 nm to 15 nm, such as from 1 nm to 10 nm, or such as from 2 nm to 8 nm.

Clause 28: The coated article of clause 26 or 27, wherein the patterned feature is a symmetric pattern comprising stripes.

Clause 29: The coated article of clause 28, wherein the stripes comprise a width of at least 0.1 inch.

Clause 30: The coated article of clause 28 or 29, wherein the stripes are spaced apart from one another by at least 2 inches.

Clause 31: The coated article of any one of clauses 28 to 30, wherein the stripes are positioned horizontally, vertically, or diagonally across the second surface.

Clause 32: The coated article of clause 31, wherein the stripes are positioned horizontally across the second surface.

Clause 33: The coated article of clause 31, wherein the stripes are positioned vertically across the second surface.

Clause 34: The coated article of clause 26 or 27, wherein the patterned feature is an asymmetric pattern.

Clause 35: The coated article of any of clauses 1 to 34, wherein the metallic layer comprises silver, gold, palladium, copper, alloys thereof, mixtures thereof, or combinations thereof.

Clause 36: The coated article of any of clauses 1 to 35, wherein the metallic layer comprises silver.

Clause 37: The coated article of any of clauses 1 to 36, wherein the top layer comprises a first film and a second film.

Clause 38: The coated article of any of clauses 1 to 37, wherein the first film of the top layer comprises zinc oxide over at least a portion of the metallic layer and the second film comprises zinc stannate or tin oxide over at least a portion of the first film.

Clause 39: The coated article of any one of clauses 7, 24, 25, and 35 to 38, wherein the patterned feature is formed in the top layer, wherein the top layer comprises a first film, a second film, and a third film.

Clause 40: The coated article of clause 39, wherein the third film of the top layer comprises the patterned feature.

Clause 41: The coated article of clause 39 or 40, wherein the first film of the top layer comprises zinc oxide over at least a portion of the metallic layer, the second film comprises zinc stannate or tin oxide positioned over at least a portion of the first film, and the third film comprises zinc stannate or tin oxide positioned over at least a portion of the second film.

Clause 42: The coated article of any one of clauses 39 to 41, wherein the third film of the top layer comprises a thickness in the range of from 3 nm to 60 nm, such as from 5 nm to 55 nm.

Clause 43: The coated article of any one of clauses 39 to 42, wherein the patterned feature is a symmetric pattern comprising stripes.

Clause 44: The coated article of clause 43, wherein the stripes comprise a width of at least 0.1 inch.

Clause 45: The coated article of clause 43 or 44, wherein the stripes are spaced apart from one another by at least 2 inches.

Clause 46: The coated article of any one of clauses 43 to 45, wherein the stripes are positioned horizontally, vertically, or diagonally across the second surface.

Clause 47: The coated article of clause 46, wherein the stripes are positioned horizontally across the second surface.

Clause 48: The coated article of clause 46, wherein the stripes are positioned vertically across the second surface.

Clause 49: The coated article of any one of clauses 39 to 42, wherein the patterned feature is an asymmetric pattern.

Clause 50: The coated article of any of clauses 1 to 49, wherein the functional coating further comprises a primer layer over at least a portion of the metallic layer.

Clause 51: The coated article of clause 50, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 52: The coated article of any of clauses 1 to 51, wherein the functional coating further comprises an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 53: The coated article of clause 52, wherein the protective layer comprises titania.

Clause 54: The coated article of clause 52, wherein the protective layer comprises a first protective film and a second protective film, wherein the second protective film is positioned over at least a portion of the first protective film.

Clause 55: The coated article of clause 54, wherein the first protective film comprises SiAlO.

Clause 56: The coated article of clause 54, wherein the second protective film comprises TiAlO.

Clause 57: The coated article of any one of clauses 7, 24, 25, 35 to 38, or 50 to 56, wherein the patterned feature is formed in the outermost protective coating, wherein the outermost protective coating further comprises a patterned film over at least a portion of the protective layer.

Clause 58: The coated article of clause 57, wherein the patterned film comprises a thickness in the range of from 1 nm to 100 nm or such as from 10 nm to 100 nm.

Clause 59: The coated article of clause 57 or 58, wherein the patterned feature is a symmetric pattern comprising stripes.

Clause 60: The coated article of clause 59, wherein the stripes comprise a width of at least 0.1 inch.

Clause 61: The coated article of clause 59 or 60, wherein the stripes are spaced apart from one another by at least 2 inches.

Clause 62: The coated article of clause 59 to 61, wherein the stripes are positioned horizontally, vertically, or diagonally across the second surface.

Clause 63: The coated article of clause 62, wherein the stripes are positioned horizontally across the second surface.

Clause 64: The coated article of clause 62, wherein the stripes are positioned vertically across the second surface.

Clause 65: The coated article of clause 57 or 58, wherein the patterned feature is an asymmetric pattern.

Clause 66: The coated article of any of clauses 1 to 65, wherein the substrate comprises glass.

Clause 67: The coated article of any of clauses 1 to 66, wherein the coated article is an architectural glazing.

Clause 68: The coated article of any of clauses 1 to 67, wherein the patterned feature is visible to birds.

Clause 69: The coated article of any of clauses 1 to 68, wherein the functional coating positioned over at least a portion of the second side further comprises: a second layer over at least a portion of the metallic layer; and a second metallic layer over at least a portion of the second layer, wherein the top layer is over at least a portion of the second metallic layer.

Clause 70: The coated article of clause 69, wherein the second layer comprises a first film, a second film, and a third film.

Clause 71: The coated article of clause 70, wherein the first film of the second layer comprises zinc oxide over at least a portion of the metallic layer, the second film comprises zinc stannate over at least a portion of the first film, and the third film comprises zinc oxide over at least a portion of the second film.

Clause 72: The coated article of any one of clauses 7, 24, 25, 35 to 38, and 50 to 56, or 66 to 69, wherein the patterned feature is formed in the second metallic layer over at least a portion of the second layer.

Clause 73: The coated article of clause 72, wherein the patterned feature of the second metallic layer comprises a thickness in the range of from 1 nm to 1 nm to 20 nm, such as from 1 nm to 15 nm, such as from 1 nm to 10 nm, or such as from 2 nm to 8 nm.

Clause 74: The coated article of clause 72 or 73, wherein the patterned feature is a symmetric feature comprising stripes.

Clause 75: The coated article of clause 74, wherein the stripes comprise a width of at least 0.1 inch.

Clause 76: The coated article of clause 74 or 75, wherein the stripes are spaced apart from one another by at least 2 inches.

Clause 77: The coated article of clause 74 to 76, wherein the stripes are positioned horizontally, vertically, or diagonally across the second surface.

Clause 78: The coated article of clause 77, wherein the stripes are positioned horizontally across the second surface.

Clause 79: The coated article of clause 77, wherein the stripes are positioned vertically across the second surface.

Clause 80: The coated article of clause 72 or 73, wherein the patterned feature is an asymmetric pattern.

Clause 81: The coated article of any of clauses 69 to 80, wherein the second metallic layer is a continuous layer.

Clause 82: The coated article of any of clauses 69 to 80, wherein the second metallic layer is a discontinuous layer.

Clause 83: The coated article of any of clauses 69 to 82, wherein the functional coating further comprises a second primer layer formed over the second metallic layer.

Clause 84: The coated article of any of clauses 1 to 68, wherein the functional coating positioned over at least a portion of the second side further comprises: a second layer over at least a portion of the metallic layer; a second metallic layer over at least a portion of the second layer; a third layer over at least a portion of the second metallic layer; and a third metallic layer over at least a portion of the third layer, wherein the top layer is over at least a portion of the third metallic layer.

Clause 85: The coated article of any one of clauses 7, 24, 25, 35 to 38, 50 to 56, 66 to 68, and 84, wherein the patterned feature is formed in the second layer, wherein the second layer comprises a first film, a second film, and a third film, and wherein the first film comprises zinc oxide over at least a portion of the second metallic layer, the second film comprises zinc stannate over at least a portion of the first film, and the third film comprises zinc oxide over at least a portion of the second film.

Clause 86: The coated article of clause 85, wherein the second film comprises the patterned feature.

Clause 87: The coated article of clause 86, wherein the patterned feature of the second film comprises a thickness in the range of from 18 nm to 35 nm, such as from 22 nm to 30 nm.

Clause 88: The coated article of clause 85 to 87, wherein the patterned feature is a symmetric pattern comprising stripes.

Clause 89: The coated article of clause 88, wherein the stripes comprise a width of at least 0.1 inch.

Clause 90: The coated article of clause 88 or 89, wherein the stripes are spaced apart from one another by at least 2 inches.

Clause 91: The coated article of any one of clauses 88 to 90, wherein the stripes are positioned horizontally, vertically, or diagonally across the second surface.

Clause 92: The coated article of clause 91, wherein the stripes are positioned horizontally across the second surface.

Clause 93: The coated article of clause 91, wherein the stripes are positioned vertically across the second surface.

Clause 94: The coated article of clause 85 to 87, wherein the patterned feature is an asymmetric pattern.

Clause 95: The coated article of clause 84, wherein the third layer comprises a first film, a second film, and a third film.

Clause 96: The coated article of clause 95, wherein the first film of the third layer comprises zinc oxide over at least a portion of the second metallic layer, the second film comprises zinc stannate over at least a portion of the first film, and the third film comprises zinc oxide over at least a portion of the second film.

Clause 97: The coated article of any one of clauses 7, 24, 25, 35 to 38, 50 to 56, 66 to 68, 84, 95, and 96, wherein the patterned feature is formed in the third metallic layer over at least a portion of the third layer.

Clause 98: The coated article of clause 97, wherein the patterned feature of the third metallic layer comprises a thickness in the range of from 1 nm to 20 nm, such as from 1 nm to 15 nm, such as from 1 nm to 10 nm, or such as from 2 nm to 8 nm Clause 99: The coated article of clause 97 or 98, wherein the patterned feature is a symmetric pattern comprising stripes.

Clause 100: The coated article of clause 99, wherein the stripes comprise a width of at least 0.1 inch.

Clause 101: The coated article of clause 99 or 100, wherein the stripes are spaced apart from one another by at least 2 inches.

Clause 102: The coated article of any one of clauses 99 to 101, wherein the stripes are positioned horizontally, vertically, or diagonally across the second surface.

Clause 103: The coated article of clause 102, wherein the stripes are positioned horizontally across the second surface.

Clause 104: The coated article of clause 102, wherein the stripes are positioned vertically across the second surface.

Clause 105: The coated article of clause 97 or 98, wherein the patterned feature is an asymmetric pattern.

Clause 106: The coated article of any of clauses 84 to 105, wherein the third metallic layer is a continuous layer.

Clause 107: The coated article of any of clauses 84 to 105, wherein the third metallic layer is a discontinuous layer.

Clause 108: The coated article of any of clauses 84 to 107, wherein the functional coating further comprises a third primer layer formed over the third metallic layer.

Clause 109: The coated article of any of clauses 1 to 68, wherein the functional coating positioned over at least a portion of the second side further comprises: a second layer over at least a portion of the metallic layer; a second metallic layer over at least a portion of the second layer; a third layer over at least a portion of the second metallic layer; a third metallic layer over at least a portion of third layer; a fourth layer over at least a portion of the third metallic layer; and a fourth metallic layer over at least a portion of the fourth layer, wherein the top layer is over at least a portion of the fourth metallic layer.

Clause 110: The coated article of clause 109, wherein the fourth layer comprises a first film, a second film, and a third film.

Clause 111: The coated article of clause 110, wherein the first film of the fourth layer comprises zinc oxide over at least a portion of the third metallic layer, the second film comprises zinc stannate over at least a portion of the first film, and the third film comprises zinc oxide over at least a portion of the second film.

Clause 112: The coated article of any one of clauses 7, 24, 25, 35 to 38, 50 to 56, 66 to 68, and 109 to 111, wherein the patterned feature is formed in the fourth metallic layer over at least a portion of the fourth layer.

Clause 113: The coated article of clause 112, wherein the patterned feature of the fourth metallic layer film comprises a thickness in the range of from 1 nm to 20 nm, such as from 1 nm to 15 nm, such as from 1 nm to 10 nm, such as from 2 nm to 8 nm Clause 114: The coated article of clause 112 or 113, wherein the patterned feature is a symmetric feature comprising stripes.

Clause 115: The coated article of clause 114, wherein the stripes comprise a width of at least 0.1 inch.

Clause 116: The coated article of clause 114 or 115, wherein the stripes are spaced apart from one another by at least 2 inches.

Clause 117: The coated article of any one of clauses 114 to 116, wherein the stripes are positioned horizontally, vertically, or diagonally across the second surface.

Clause 118: The coated article of clause 117, wherein the stripes are positioned horizontally across the second surface.

Clause 119: The coated article of clause 117, wherein the stripes are positioned vertically across the second surface.

Clause 120: The coated article of clause 112 or 113, wherein the patterned feature is an asymmetric pattern.

Clause 121: The coated article of any of clauses 109 to 120, wherein the fourth metallic layer is a continuous layer.

Clause 122: The coated article of any of clauses 109 to 121, wherein the functional coating further comprising a fourth primer layer formed over the fourth metallic layer.

Clause 123: A method of making a coated article, the method comprising: providing a substrate comprising a first side comprising a first surface and a second side comprising a second surface, wherein the second surface is opposite the first surface; forming a functional coating over at least a portion of the second side, wherein forming the functional coating comprises: forming a base layer over at least a portion of the second surface, wherein forming the base layer comprises: forming a first film over at least a portion of the second surface, and forming a second film over at least a portion of the first film; forming a metallic layer over at least a portion of the base layer; and forming a top layer over at least a portion of the metallic layer, wherein the second side comprises a patterned feature.

Clause 124: The method of clause 123, wherein the patterned feature is formed in the second surface as microabrasions, and wherein the microabrasions are formed chemically and/or mechanically prior to the forming the functional coating.

Clause 125: The method of clause 124, further comprising heating the coated article to a temperature of greater than or equal to 1,185° F.

Clause 126: The method of clause 124 or 125, wherein the microabrasions comprise a width of at least 0.1 inch.

Clause 127: The method of any of clauses 124 to 126, wherein the microabrasions are spaced apart from one another by at least 2 inches.

Clause 128: The method of any of clauses 124 to 127, wherein the microabrasions are positioned horizontally, vertically, or diagonally across the second surface.

Clause 129: The method of clause 123, wherein the patterned feature is formed in the functional coating over at least a portion of the second side.

Clause 130: The method of clause 129, wherein the patterned feature is formed in the first film over at least a portion of the second surface.

Clause 131: The method of clause 130, wherein the patterned feature is a symmetric pattern comprising stripes.

Clause 132: The method of clause 130, wherein the stripes comprise a width of at least 0.1 inch.

Clause 133: The method of clause 131 or 132, wherein the stripes are spaced apart from one another by at least 2 inches.

Clause 134: The method of any of clauses 131 to 133, wherein the stripes are positioned horizontally, vertically, or diagonally across the second surface.

Clause 135: The method of clause 134, wherein the stripes are positioned horizontally across the second surface.

Clause 136: The method of clause 134, wherein the stripes are positioned vertically across the second surface.

Clause 137: The method of clause 130, wherein the patterned feature is an asymmetric pattern.

Clause 138: The method of any of clauses 129 to 137, wherein the patterned feature is formed by: applying a mask over at least a portion of the second surface, wherein at least a portion of the second surface is masked and the other portion of the second surface is un-masked; applying the first film over the un-masked portion of the second surface; removing the mask; applying the second film over the first film and the second surface of the substrate, wherein the second film is in direct contact with at least a portion of the second surface and is in direct contact with at least a portion of the first film; and heating the coated article to a temperature of greater than or equal to 1,185° F.

Clause 139: The method of any one of clauses 129 to 137, wherein the patterned feature is formed by: applying a mask over at least a portion of a coater comprising a material for forming the first film, wherein at least a portion of the coater is masked and the other portion of the coater is unmasked; applying the material for forming the first film through the un-masked portion of the coater onto the second surface to form the first film; moving the substrate comprising the first film to a second coater comprising a material for forming the second film; applying the material for forming the second film over the first film and the second surface of the substrate to form the second film, wherein the second film is in direct contact with at least a portion of the second surface and is in direct contact with at least a portion of the first film; and heating the coated article to a temperature of greater than or equal to 1,185° F.

Clause 140: The method of clause 129, wherein the patterned feature is formed in the second film over at least a portion of the first film.

Clause 141: The method of clause 140, wherein the patterned feature is a symmetric pattern comprising stripes.

Clause 142: The method of clause 141, wherein the stripes comprise a width of at least 0.1 inch.

Clause 143: The method of clause 141 or 142, wherein the stripes are spaced apart from one another by at least 2 inches.

Clause 144: The method of any of clauses 141 to 143, wherein the stripes are positioned horizontally, vertically, or diagonally across the second surface.

Clause 145: The method of clause 144, wherein the stripes are positioned horizontally across the second surface.

Clause 146: The method of clause 144, wherein the stripes are positioned vertically across the second surface.

Clause 147: The method of clause 140, wherein the patterned feature is an asymmetric pattern.

Clause 148: The method of any of clauses 140 to 147, wherein the patterned feature is formed by: applying a mask over at least a portion of the first film, wherein at least a portion of the first film is masked and the other portion of the first film is un-masked; applying the second film over the un-masked portion of the first film; removing the mask; applying the metallic layer over the first film and the second film, wherein the metallic layer is in direct contact with at least a portion of the first film and is in direct contact with at least a portion of the second film; and heating the coated article to a temperature of greater than or equal to 1,185° F.

Clause 149: The method of any of clauses 140 to 147, wherein the patterned feature is formed by: applying a mask over at least a portion of a coater comprising a material for forming the second film, wherein at least a portion of the coater is masked and the other portion of the coater is unmasked; applying the material for forming the second film through the un-masked portion of the coater onto the first film to form the second film; moving the substrate comprising the first film and the second film to a second coater comprising a material for forming the metallic layer; applying the material for forming the metallic layer over the first film and the second film to form the metallic layer, wherein the metallic layer is in direct contact with at least a portion of the first film and is in direct contact with at least a portion of the second film; and heating the coated article to a temperature of greater than or equal to 1,185° F.

Clause 150: The method of any of clauses 123 to 149, wherein the first film comprises zinc stannate, silicon nitride, silicon oxide, silicon aluminum nitride, silicon aluminum oxide, silicon oxynitride, silicon aluminum oxynitride or tin oxide and the second film comprises zinc oxide or aluminum zinc oxide.

Clause 151: The method of clause 150, wherein the first film comprises zinc stannate or tin oxide and the second film comprises zinc oxide.

Clause 152: The method of any of clause 129, 150, and 151, wherein the patterned feature is formed in the metallic layer over at least a portion of the base layer.

Clause 153: The method of clause 152, wherein the patterned feature is a symmetric pattern comprising stripes.

Clause 154: The method of clause 153, wherein the stripes comprise a width of at least 0.1 inch.

Clause 155: The method of clause 153 or 154, wherein the stripes are spaced apart from one another by at least 2 inches.

Clause 156: The method of any of clauses 153 to 155, wherein the stripes are positioned horizontally, vertically, or diagonally across the second surface.

Clause 157: The method of clause 156, wherein the stripes are positioned horizontally across the second surface.

Clause 158: The method of clause 156, wherein the stripes are positioned vertically across the second surface.

Clause 159: The method of clause 152, wherein the patterned feature is an asymmetric pattern.

Clause 160: The method of any one of clauses 152 to 159, wherein the patterned feature is formed by: applying a mask over at least a portion of the metallic layer positioned over at least a portion of the base layer, wherein at least a portion of the metallic layer is masked and the other portion of the metallic layer is un-masked; applying from 1 nm to 20 nm, such as from 1 nm to 15 nm, such as from 1 nm to 10 nm, or such as from 2 nm to 8 nm of additional metallic layer over the un-masked portion of the metallic layer; and removing the mask.

Clause 161: The method of any one of clauses 152 to 159, wherein the patterned feature is formed by: applying the metallic layer over at least of the portion of the base layer; applying a mask over at least a portion of a coater comprising a material for forming the metallic layer, wherein at least a portion of the coater is masked and the other portion of the coater is unmasked; and applying from 1 nm to 20 nm, such as from 1 nm to 15 nm, such as from 1 nm to 10 nm, or such as from 2 nm to 8 nm of the material for forming metallic layer through the un-masked portion of the coater.

Clause 162: The method of any of clauses 123 to 161, wherein the metallic layer comprises silver, gold, palladium, copper, alloys thereof, mixtures thereof, or combinations thereof.

Clause 163: The method of any of clauses 123 to 162, wherein the metallic layer comprises silver.

Clause 164: The method of any of clauses 123 to 163, wherein the top layer comprises a first film and a second film.

Clause 165: The method of any of clauses 123 to 164, wherein the first film of the top layer comprises zinc oxide over at least a portion of the metallic layer and the second film comprises zinc stannate or tin oxide over at least a portion of the first film.

Clause 166: The method of any one of clauses 129, 150, 151, 162, and 163, wherein the patterned feature is formed in the top layer, wherein the top layer comprises a first film, a second film, and a third film.

Clause 167: The method of clause 166, wherein the third film of the top layer comprises the patterned feature.

Clause 168: The method of clause 166 or 167, wherein the first film of the top layer comprises zinc oxide over at least a portion of the metallic layer, the second film comprises zinc stannate or tin oxide positioned over at least a portion of the first film, and the third film comprises zinc stannate or tin oxide positioned over at least a portion of the second film.

Clause 169: The method of any one of clauses 166 to 168, wherein the third film of the top layer comprises a thickness in the range of from 3 nm to 60 nm, such as from 5 nm to 55 nm.

Clause 170: The method of any one of clauses 166 to 169, wherein the patterned feature is a symmetric pattern comprising stripes.

Clause 171: The method of clause 170, wherein the stripes comprise a width of at least 0.1 inch.

Clause 172: The method of clause 170 or 171, wherein the stripes are spaced apart from one another by at least 2 inches.

Clause 173: The method of any one of clauses 170 to 172, wherein the stripes are positioned horizontally, vertically, or diagonally across the second surface.

Clause 174: The method of clause 173, wherein the stripes are positioned horizontally across the second surface.

Clause 175: The method of clause 173, wherein the stripes are positioned vertically across the second surface.

Clause 176: The method of any one of clauses 166 to 169, wherein the patterned feature is an asymmetric pattern.

Clause 177: The method of any of clauses 166 to 176, wherein the patterned feature is formed by: applying the first film over at least a portion of the metallic layer; applying the second film over at least a portion of the first film; applying a mask over at least a portion of the second film, wherein at least a portion of the second film is masked and the other portion of the second film is un-masked; applying the third film over the un-masked portion of the second film; and removing the mask.

Clause 178: The method of any one of clauses 166 to 176, wherein the patterned feature is formed by: applying a mask over at least a portion of a coater comprising a material for forming the third film, wherein at least a portion of the coater is masked and the other portion of the coater is unmasked; and applying the material for forming the third film through the un-masked portion of the coater onto the second film to form the third film.

Clause 179: The method of any of clauses 123 to 178, wherein the functional coating further comprises a primer layer over at least a portion of the metallic layer.

Clause 180: The method of clause 179, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 181: The method of any of clauses 123 to 180, wherein the functional coating further comprises an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 182: The method of clause 181, wherein the protective layer comprises titania.

Clause 183: The method of clause 181, wherein the protective layer comprises a first protective film and a second protective film, wherein the second protective film is positioned over at least a portion of the first protective film.

Clause 184: The method of clause 183, wherein the first protective film comprises SiAlO.

Clause 185: The method of clause 183, wherein the second protective film comprises TiAlO.

Clause 186: The method of any one of clauses 129, 150, 151, 162, 163, or 179 to 184, wherein the patterned feature is formed in the outermost protective coating, wherein the outermost protective coating further comprises a patterned film over at least a portion of the protective layer.

Clause 187: The method of clause 186, wherein the patterned film comprises a thickness in the range of from 1 nm to 100 nm or such as from 10 nm to 100 nm.

Clause 188: The method of clause 186 or 187, wherein the patterned feature is a symmetric pattern comprising stripes.

Clause 189: The method of clause 188, wherein the stripes comprise a width of at least 0.1 inch.

Clause 190: The method of clause 188 or 189, wherein the stripes are spaced apart from one another by at least 2 inches.

Clause 191: The method of clause 188 to 190, wherein the stripes are positioned horizontally, vertically, or diagonally across the second surface.

Clause 192: The method of clause 191, wherein the stripes are positioned horizontally across the second surface.

Clause 193: The method of clause 191, wherein the stripes are positioned vertically across the second surface.

Clause 194: The method of clause 186 or 187, wherein the patterned feature is an asymmetric pattern.

Clause 195: The method of clause 186 to 194, wherein when the outermost protective coating comprises a first protective film and a second protective film, the patterned feature is formed by: applying a mask over at least a portion of the second protective film, where at least a portion of the second protective film is masked and the other portion of the second protective film is un-masked; applying the patterned film over the un-masked portion of the second protective film; and removing the mask.

Clause 196: The method of clause 186 to 194, wherein when the outermost protective coating comprises a first protective film and a second protective film, the patterned feature is formed by: applying a mask over a coater comprising a material for forming the patterned film, wherein at least a portion of the coater is masked and the other portion of the coater is un-masked; applying the material for forming the patterned film through the un-masked portion of the coater to form the patterned film.

Clause 197: The method of clause 186 to 194, wherein when the outermost protective coating comprises a single protective layer, the patterned feature is formed by: applying a mask over at least a portion of the single protective layer, where at least a portion of the single protective layer is masked and the other portion of the single protective layer is un-masked; applying the patterned film over the un-masked portion of the single protective layer; and removing the mask.

Clause 198: The method of clause 186 to 194, wherein when the outermost protective coating comprises a single protective layer, the patterned feature is formed by: applying a mask over a coater comprising a material for forming the patterned film, wherein at least a portion of the coater is masked and the other portion of the coater is un-masked;

applying the material for the patterned film through the un-masked portion of the coater to form the patterned film.

Clause 199: The method of any of clauses 123 to 198, wherein the substrate comprises glass.

Clause 200: The method of any of clauses 123 to 199, wherein the coated article is an architectural glazing.

Clause 201: The method of any of clauses 123 to 200, wherein the patterned feature is visible to birds.

Clause 202: The method of any of clauses 123 to 201, wherein the functional coating positioned over at least a portion of the second side further comprises: a second layer over at least a portion of the metallic layer; and a second metallic layer over at least a portion of the second layer, wherein the top layer is over at least a portion of the second metallic layer.

Clause 203: The method of clause 202, wherein the second layer comprises a first film, a second film, and a third film.

Clause 204: The method of clause 203, wherein the first film of the second layer comprises zinc oxide over at least a portion of the metallic layer, the second film comprises zinc stannate over at least a portion of the first film, and the third film comprises zinc oxide over at least a portion of the second film.

Clause 205: The method of any one of clauses 129, 150, 151, 162 to 165, 179 to 185, and 199 to 204, wherein the patterned feature is formed in the second metallic layer over at least a portion of the second layer.

Clause 206: The method of clause 205, wherein the patterned feature is a symmetric pattern comprising stripes.

Clause 207: The method of clause 206, wherein the stripes comprise a width of at least 0.1 inch.

Clause 208: The method of clause 206 or 207, wherein the stripes are spaced apart from one another by at least 2 inches.

Clause 209: The method of any of clauses 206 to 208, wherein the stripes are positioned horizontally, vertically, or diagonally across the second surface.

Clause 210: The method of clause 209, wherein the stripes are positioned horizontally across the second surface.

Clause 211: The method of clause 209, wherein the stripes are positioned vertically across the second surface.

Clause 212: The method of clause 205, wherein the patterned feature is an asymmetric pattern.

Clause 213: The method of any one of clauses 205 to 212, wherein the patterned feature is formed by: applying a mask over at least a portion of the second metallic layer positioned over at least a portion of the second layer, wherein at least a portion of the second metallic layer is masked and the other portion of the metallic layer is un-masked; applying from 1 nm to 20 nm, such as from 1 nm to 15 nm, such as from 1 nm to 10 nm, or such as from 2 nm to 8 nm of additional second metallic layer over the un-masked portion of the second metallic layer; and removing the mask.

Clause 214: The method of any one of clauses 205 to 212, wherein the patterned feature is formed by: applying the second metallic layer over at least of the portion of the second layer; applying a mask over at least a portion of a coater comprising a material for forming the second metallic layer, wherein at least a portion of the coater is masked and the other portion of the coater is unmasked; and applying from 1 nm to 20 nm, such as from 1 nm to 15 nm, such as from 1 nm to 10 nm, or such as from 2 nm to 8 nm of the material for forming the second metallic layer through the un-masked portion of the coater.

Clause 215: The method of any of clauses 202 to 214, wherein the second metallic layer is a continuous layer.

Clause 216: The method of any of clauses 202 to 214, wherein the second metallic layer is a discontinuous layer.

Clause 217: The method of any of clauses 202 to 216, wherein the functional coating further comprises a second primer layer formed over the second metallic layer.

Clause 218: The method of any of clauses 123 to 201, wherein the functional coating positioned over at least a portion of the second side further comprises: a second layer over at least a portion of the metallic layer; a second metallic layer over at least a portion of the second layer; a third layer over at least a portion of the second metallic layer; and a third metallic layer over at least a portion of the third layer, wherein the top layer is over at least a portion of the third metallic layer.

Clause 219: The method of any one of clauses 129, 150, 151, 162 to 165, 179 to 185, 199 to 201, and 218, wherein the patterned feature is formed in the second layer, wherein the second layer comprises a first film, a second film, and a third film, and wherein the first film comprises zinc oxide over at least a portion of the second metallic layer, the second film comprises zinc stannate over at least a portion of the first film, and the third film comprises zinc oxide over at least a portion of the second film.

Clause 220: The method of clause 219, wherein the second film comprises the patterned feature.

Clause 221: The method of clause 220, wherein the patterned feature of the second film comprises a thickness in the range of from 18 nm to 35 nm, such as from 22 nm to 30 nm.

Clause 222: The method of any one of clauses 219 to 221, wherein the patterned feature is a symmetric pattern comprising stripes.

Clause 223: The method of clause 222, wherein the stripes comprise a width of at least 0.1 inch.

Clause 224: The method of clause 222 or 223, wherein the stripes are spaced apart from one another by at least 2 inches.

Clause 225: The method of any one of clauses 222 to 224, wherein the stripes are positioned horizontally, vertically, or diagonally across the second surface.

Clause 226: The method of clause 225, wherein the stripes are positioned horizontally across the second surface.

Clause 227: The method of clause 225, wherein the stripes are positioned vertically across the second surface.

Clause 228: The method of clause 219 to 221, wherein the patterned feature is an asymmetric pattern.

Clause 229: The method of any of clauses 219 to 228, wherein the patterned feature is formed by: applying the first film over at least a portion of the second metallic layer; applying the second film over at least a portion of the first film; applying a mask over at least a portion of the second film, wherein at least a portion of the second film is masked and the other portion of the second film is un-masked; applying from 18 nm to 35 nm, or such as from 22 nm to 30 nm of second film over at least a portion of the second film that is un-masked; removing the mask; and applying the third film over the second film.

Clause 230: The method of any one of clauses 219 to 228, wherein the patterned feature is formed by: applying the first film over at least a portion of the second metallic layer; applying the second film over at least a portion of the first film; applying a mask over a coater comprising the material for the second film, wherein at least a portion of the coater is masked and the other portion of the coater is un-masked; applying the from 18 nm to 35 nm, or such as from 22 nm to 30 nm of the material for forming the second film through the un-masked portion of the coater onto the second film; moving the article comprising the first film and the second film to a second coater comprising a material for forming the third film; applying the material for forming the third film over the second film to form the third film.

Clause 231: The method of clause 218, wherein the third layer comprises a first film, a second film, and a third film.

Clause 232: The method of clause 231, wherein the first film of the third layer comprises zinc oxide over at least a portion of the second metallic layer, the second film comprises zinc stannate over at least a portion of the first film, and the third film comprises zinc oxide over at least a portion of the second film.

Clause 233: The method of clause 129, 150, 151, 162 to 165, 179 to 185, 199 to 201, 218, 231, and 232, wherein the patterned feature is formed in the third metallic layer over at least a portion of the third layer.

Clause 234: The method of clause 233, wherein the patterned feature of the third metallic layer comprises a thickness in the range of from 1 nm to 20 nm, such as from 1 nm to 15 nm, such as from 1 nm to 10 nm, or such as from 2 nm to 8 nm Clause 235: The method of clause 233 or 234, wherein the patterned feature is a symmetric pattern comprising stripes.

Clause 236: The method of clause 235, wherein the stripes comprise a width of at least 0.1 inch.

Clause 237: The method of clause 235 or 236, wherein the stripes are spaced apart from one another by at least 2 inches.

Clause 238: The method of any of clauses 235 to 237, wherein the stripes are positioned horizontally, vertically, or diagonally across the second surface.

Clause 239: The method of clause 238, wherein the stripes are positioned horizontally across the second surface.

Clause 240: The method of clause 238, wherein the stripes are positioned vertically across the second surface.

Clause 241: The method of clause 233 or 234, wherein the patterned feature is an asymmetric pattern.

Clause 242: The method of any of clauses 233 to 241, wherein the patterned feature is formed by: applying a mask over at least a portion of the third metallic layer positioned over at least a portion of the third layer, wherein at least a portion of the third metallic layer is masked and the other portion of the third metallic layer is un-masked; applying from 1 nm to 20 nm, such as from 1 nm to 15 nm, such as from 1 nm to 10 nm, or such as from 2 nm to 8 nm of additional third metallic layer over the un-masked portion of the third metallic layer; and removing the mask.

Clause 243: The method of any one of clauses 233 to 241, wherein the patterned feature is formed by: applying the third metallic layer over at least of the portion of the third layer; applying a mask over at least a portion of a coater comprising a material for forming the third metallic layer, wherein at least a portion of the coater is masked and the other portion of the coater is unmasked; and applying from 1 nm to 20 nm, such as from 1 nm to 15 nm, such as from 1 nm to 10 nm, or such as from 2 nm to 8 nm of the material for forming the third metallic layer through the un-masked portion of the coater.

Clause 244: The method of any of clauses 218 to 243, wherein the third metallic layer is a continuous layer.

Clause 245: The method of any of clauses 218 to 243, wherein the third metallic layer is a discontinuous layer.

Clause 246: The method of any of clauses 218 to 245, wherein the functional coating further comprises a third primer layer formed over the third metallic layer.

Clause 247: The method of any of clauses 123 to 201, wherein the functional coating positioned over at least a portion of the second side further comprises: a second layer over at least a portion of the metallic layer; a second metallic layer over at least a portion of the second layer; a third layer over at least a portion of the second metallic layer; a third metallic layer over at least a portion of the third layer; a fourth layer over at least a portion of the third metallic layer; and a fourth metallic layer over at least a portion of the fourth layer, wherein the top layer is over at least a portion of the fourth metallic layer.

Clause 248: The method of clause 247, wherein the fourth layer comprises a first film, a second film, and a third film.

Clause 249: The method of clause 248, wherein the first film of the fourth layer comprises zinc oxide over at least a portion of the third metallic layer, the second film comprises zinc stannate over at least a portion of the first film, and the third film comprises zinc oxide over at least a portion of the second film.

Clause 250: The method of any one of clauses 129, 150, 151, 162 to 165, 179 to 185, 199 to 201, and 248 to 249, wherein the patterned feature is formed in the fourth metallic layer over at least a portion of the fourth layer.

Clause 251: The method of clause 250, wherein the patterned feature of the fourth metallic layer comprises a thickness in the range of from 1 nm to 20 nm, such as from 1 nm to 15 nm, such as from 1 nm to 10 nm, or such as from 2 nm to 8 nm Clause 252: The method of clause 250 or 251, wherein the patterned feature is a symmetric pattern comprising stripes.

Clause 253: The method of clause 252, wherein the stripes comprise a width of at least 0.1 inch.

Clause 254: The method of clause 252 or 253, wherein the stripes are spaced apart from one another by at least 2 inches.

Clause 255: The method of any of clauses 252 to 254, wherein the stripes are positioned horizontally, vertically, or diagonally across the second surface.

Clause 256: The method of clause 255, wherein the stripes are positioned horizontally across the second surface.

Clause 257: The method of clause 255, wherein the stripes are positioned vertically across the second surface.

Clause 258: The method of clause 250 or 251, wherein the patterned feature is an asymmetric pattern.

Clause 259: The method of any of clauses 250 to 258, wherein the patterned feature is formed by: applying a mask over at least a portion of the fourth metallic layer positioned over at least a portion of the fourth layer, wherein at least a portion of the fourth metallic layer is masked and the other portion of the fourth metallic layer is un-masked; applying from 1 nm to 20 nm, such as from 1 nm to 15 nm, such as from 1 nm to 10 nm, or such as from 2 nm to 8 nm of additional fourth metallic layer over the un-masked portion of the fourth metallic layer; and removing the mask.

Clause 260: The method of any one of clauses 250 to 258, wherein the patterned feature is formed by: applying the fourth metallic layer over at least of the portion of the fourth layer; applying a mask over at least a portion of a coater comprising a material for forming the fourth metallic layer, wherein at least a portion of the coater is masked and the other portion of the coater is unmasked; and applying from 1 nm to 20 nm, such as from 1 nm to 15 nm, such as from 1 nm to 10 nm, or such as from 2 nm to 8 nm of the material for forming the fourth metallic layer through the un-masked portion of the coater.

Clause 261: The method of any of clauses 247 to 260, wherein the fourth metallic layer is a continuous layer.

Clause 262: The method of any of clauses 247 to 261, wherein the functional coating further comprising a fourth primer layer formed over the fourth metallic layer.

Clause 263: An insulating glass unit comprising: a first ply comprising a first side comprising a No. 1 surface and a second side comprising a No. 2 surface, wherein the No. 2 surface is opposite the No. 1 surface, a second ply comprising a first side comprising a No. 3 surface and a second side comprising a No. 4 surface, wherein the No. 4 surface is opposite the No. 3 surface, and wherein the first ply and second ply are connected together; a functional coating positioned over at least a portion of the second side comprising the No. 2 surface, the functional coating comprising: a base layer positioned over at least a portion of the No. 2 surface, wherein the base layer comprises: a first film positioned over at least a portion of the No. 2 surface, and a second film positioned over at least a portion of the first film; a metallic layer positioned over at least a portion of the base layer; and a top layer positioned over at least a portion of the metallic layer; wherein the second side comprising the No. 2 surface comprises a patterned feature.

Clause 264: The insulating glass unit of clause 263, wherein the patterned feature is formed in the No. 2 surface as microabrasions.

Clause 265: The insulating glass unit of clause 264, wherein the microabrasions comprise a width of at least 0.1 inch.

Clause 266: The insulating glass unit of clause 264 or 265, wherein the microabrasions are spaced apart from one another by at least 2 inches.

Clause 267: The insulating glass unit of any of clauses 264 to 266, wherein the microabrasions are positioned horizontally, vertically, or diagonally across the No. 2 surface.

Clause 268: The insulating glass unit of clause 263, wherein the patterned feature is formed in the functional coating positioned over at least a portion of the second side comprising the No. 2 surface.

Clause 269: The insulating glass unit of clause 268, wherein the patterned feature is formed in the first film over at least a portion of the No. 2 surface, and wherein the second film is in direct contact with at least a portion of the first film and is in direct contact with at least a portion of the No. 2 surface.

Clause 270: The insulating glass unit of clause 268 or 269, wherein the patterned feature is a symmetric pattern comprising stripes.

Clause 271: The insulating glass unit of clause 270, wherein the stripes comprise a width of at least 0.1 inch.

Clause 272: The insulating glass unit of clause 270 or 271, wherein the stripes are spaced apart from one another by at least 2 inches.

Clause 273: The insulating glass unit of any of clauses 270 to 272, wherein the stripes are positioned horizontally, vertically, or diagonally across the No. 2 surface.

Clause 274: The insulating glass unit of clause 273, wherein the stripes are positioned horizontally across the No. 2 surface.

Clause 275: The insulating glass unit of clause 274, wherein the stripes are positioned vertically across the No. 2 surface.

Clause 276: The insulating glass unit of clause 268 or 269, wherein the patterned feature is an asymmetric pattern.

Clause 277: The insulating glass unit of clause 268, wherein the patterned feature is formed in the second film positioned over at least a portion of the first film, and wherein the metallic layer is in direct contact with at least a portion of the first film and is in direct contact with at least a portion of the second film.

Clause 278: The insulating glass unit of clause 277, wherein the patterned feature is a symmetric pattern comprising stripes.

Clause 279: The insulating glass unit of clause 278, wherein the stripes comprise a width of at least 0.1 inch.

Clause 280: The insulating glass unit of clause 278 or 279, wherein the stripes are spaced apart from one another by at least 2 inches.

Clause 281: The insulating glass unit of any of clauses 277 to 280, wherein the stripes are positioned horizontally, vertically, or diagonally across the No. 2 surface.

Clause 282: The insulating glass unit of clause 281, wherein the stripes are positioned horizontally across the No. 2 surface.

Clause 283: The insulating glass unit of clause 281, wherein the stripes are positioned vertically across the No. 2 surface.

Clause 284: The insulating glass unit of clause 277, wherein the patterned feature is an asymmetric pattern.

Clause 285: The insulating glass unit of any of clauses 263 to 284, wherein the first film comprises zinc stannate, silicon nitride, silicon oxide, silicon aluminum nitride, silicon aluminum oxide, silicon oxynitride, silicon aluminum oxynitride or tin oxide and the second film comprises zinc oxide or aluminum zinc oxide.

Clause 286: The insulating glass unit of clause 285, wherein the first film comprises zinc stannate or tin oxide and the second film comprises zinc oxide.

Clause 287: The insulating glass unit of any one of clauses 268, 285, and 286, wherein the patterned feature is formed in the metallic layer positioned over at least a portion of the base layer.

Clause 288: The insulating glass unit of clause 287, wherein the patterned feature of the metallic layer comprises a thickness in the range of from 1 nm to 20 nm, such as from 1 nm to 15 nm, such as from 1 nm to 10 nm, or such as from 2 nm to 8 nm.

Clause 289: The insulating glass unit of clause 287 or 288, wherein the patterned feature is a symmetric pattern comprising stripes.

Clause 290: The insulating glass unit of clause 289, wherein the stripes comprise a width of at least 0.1 inch.

Clause 291: The insulating glass unit of clause 289 or 290, wherein the stripes are spaced apart from one another by at least 2 inches.

Clause 292: The insulating glass unit of any one of clauses 289 to 291, wherein the stripes are positioned horizontally, vertically, or diagonally across the second surface.

Clause 293: The insulating glass unit of clause 292, wherein the stripes are positioned horizontally across the second surface.

Clause 294: The insulating glass unit of clause 292, wherein the stripes are positioned vertically across the second surface.

Clause 295: The insulating glass unit of clause 287 or 288, wherein the patterned feature is an asymmetric pattern.

Clause 296: The insulating glass unit of any of clauses 263 to 295, wherein the metallic layer comprises silver, gold, palladium, copper, alloys thereof, mixtures thereof, or combinations thereof.

Clause 297: The insulating glass unit of any of clauses 263 to 296, wherein the metallic layer comprises silver.

Clause 298: The insulating glass unit of any of clauses 263 to 297, wherein the top layer comprises a first film and a second film.

Clause 299: The insulating glass unit of any of clauses 263 to 298, wherein the first film of the top layer comprises zinc oxide over at least a portion of the metallic layer and the second film comprises zinc stannate or tin oxide over at least a portion of the first film.

Clause 300: The insulating glass unit of any one of clauses 268, 285, 286, 296, and 297, wherein the patterned feature is formed in the top layer, wherein the top layer comprises a first film, a second film, and a third film.

Clause 301: The insulating glass unit of clause 300, wherein the third film of the top layer comprises the patterned feature.

Clause 302: The insulating glass unit of clause 300 or 301, wherein the first film of the top layer comprises zinc oxide over at least a portion of the metallic layer, the second film comprises zinc stannate or tin oxide positioned over at least a portion of the first film, and the third film comprises zinc stannate or tin oxide positioned over at least a portion of the second film.

Clause 303: The insulating glass unit of any one of clauses 300 to 302, wherein the third film of the top layer comprises a thickness in the range of from 3 nm to 60 nm, such as from 5 nm to 55 nm.

Clause 304: The insulating glass unit of any one of clauses 300 to 302, wherein the patterned feature is a symmetric pattern comprising stripes.

Clause 305: The insulating glass unit of clause 304, wherein the stripes comprise a width of at least 0.1 inch.

Clause 306: The insulating glass unit of clause 304 or 305, wherein the stripes are spaced apart from one another by at least 2 inches.

Clause 307: The insulating glass unit of any one of clauses 304 to 306, wherein the stripes are positioned horizontally, vertically, or diagonally across the second surface.

Clause 308: The insulating glass unit of clause 307, wherein the stripes are positioned horizontally across the second surface.

Clause 309: The insulating glass unit of clause 307, wherein the stripes are positioned vertically across the second surface.

Clause 310: The insulating glass unit of clause 300 to 302, wherein the patterned feature is an asymmetric feature.

Clause 311: The insulating glass unit of any of clauses 263 to 310, wherein the functional coating further comprises a primer layer over at least a portion of the metallic layer.

Clause 312: The insulating glass unit of clause 311, wherein the primer layer is selected from a group consisting of titanium, silicon, silicon dioxide, silicon nitride, silicon oxynitride, nickel, zirconium, zinc, aluminum, cobalt, chromium, aluminum, an alloy thereof or a mixture thereof.

Clause 313: The insulating glass unit of any of clauses 263 to 312, wherein the functional coating further comprises an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

Clause 314: The insulating glass unit of clause 313, wherein the protective layer comprises titania.

Clause 315: The insulating glass unit of clause 313, wherein the protective layer comprises a first protective film and a second protective film, wherein the second protective film is positioned over at least a portion of the first protective film.

Clause 316: The insulating glass unit of clause 315, wherein the first protective film comprises SiAlO.

Clause 317: The insulating glass unit of clause 315, wherein the second protective film comprises TiAlO.

Clause 318: The insulating glass unit of any one of clauses 268, 285, 286, 296 to 299, and 311 to 317, wherein the patterned feature is formed in the outermost protective coating, wherein the outermost protective coating further comprises a patterned film over at least a portion of the protective layer.

Clause 319: The insulating glass unit of clause 318, wherein the patterned film comprises a thickness in the range of from 1 nm to 100 nm or such as from 10 nm to 100 nm.

Clause 320: The insulating glass unit of clause 318 or 319, wherein the patterned feature is a symmetric pattern comprising stripes.

Clause 321: The insulating glass unit of clause 320, wherein the stripes comprise a width of at least 0.1 inch.

Clause 322: The insulating glass unit of clause 320 or 321, wherein the stripes are spaced apart from one another by at least 2 inches.

Clause 323: The insulating glass unit of clause 320 to 322, wherein the stripes are positioned horizontally, vertically, or diagonally across the second surface.

Clause 324: The insulating glass unit of clause 323, wherein the stripes are positioned horizontally across the second surface.

Clause 325: The insulating glass unit of clause 323, wherein the stripes are positioned vertically across the second surface.

Clause 326: The coated article of clause 318 or 319, wherein the patterned feature is an asymmetric pattern.

Clause 327: The insulating glass unit of any of clauses 263 to 326, wherein the first ply and second ply comprises glass.

Clause 328: The insulating glass unit of any of clauses 263 to 327, wherein the patterned feature is visible to birds.

Clause 329: The insulating glass unit of any of clauses 263 to 328, wherein the functional coating positioned over at least a portion of the second side comprising the No. 2 surface further comprises: a second layer over at least a portion of the metallic layer; and a second metallic layer over at least a portion of the second layer, wherein the top layer is over at least a portion of the second metallic layer.

Clause 330: The insulating glass unit of clause 329, wherein the second layer comprises a first film, a second film, and a third film.

Clause 331: The insulating glass unit of clause 330, wherein the first film of the second layer comprises zinc oxide over at least a portion of the metallic layer, the second film comprises zinc stannate over at least a portion of the first film, and the third film comprises zinc oxide over at least a portion of the second film.

Clause 332: The insulating glass unit of any one of clauses 268, 285, 286, 296 to 299, 311 to 317, and 327 to 331, wherein the patterned feature is formed in the second metallic layer over at least a portion of the second layer.

Clause 333: The insulating glass unit of clause 332, wherein the patterned feature of the second metallic layer comprises a thickness in the range of from 1 nm to 20 nm, such as from 1 nm to 15 nm, such as from 1 nm to 10 nm, or such as from 2 nm to 8 nm.

Clause 334: The insulating glass unit of clause 332 or 333, wherein the patterned feature is a symmetric pattern comprising stripes.

Clause 335: The insulating glass unit of clause 334, wherein the stripes comprise a width of at least 0.1 inch.

Clause 336: The insulating glass unit of clause 334 or 335, wherein the stripes are spaced apart from one another by at least 2 inches.

Clause 337: The insulating glass unit of any one of clauses 334 to 336, wherein the stripes are positioned horizontally, vertically, or diagonally across the second surface.

Clause 338: The insulating glass unit of clause 337, wherein the stripes are positioned horizontally across the second surface.

Clause 339: The insulating glass unit of clause 337, wherein the stripes are positioned vertically across the second surface.

Clause 340: The insulating glass united of clause 332 or 333, wherein the patterned feature is an asymmetric pattern.

Clause 341: The insulating glass unit of any of clauses 329 to 340, wherein the second metallic layer is a continuous layer.

Clause 342: The insulating glass unit of any of clauses 329 to 340, wherein the second metallic layer is a discontinuous layer.

Clause 343: The insulating glass unit of any of clauses 329 to 342, wherein the functional coating further comprises a second primer layer formed over the second metallic layer.

Clause 344: The insulating glass unit of any of clauses 263 to 328, wherein the functional coating positioned over at least a portion of the second side comprising the No. 2 surface further comprises: a second layer over at least a portion of the metallic layer; a second metallic layer over at least a portion of the second layer; a third layer over at least a portion of the second metallic layer; and a third metallic layer over at least a portion of the third layer, wherein the top layer is over at least a portion of the third metallic layer.

Clause 345: The insulating glass unit of any one of clauses 268, 285, 286, 296 to 299, 311 to 317, 327, 328, and 344, wherein the patterned feature is formed in the second layer, wherein the second layer comprises a first film, a second film, and a third film, and wherein the first film comprises zinc oxide over at least a portion of the second metallic layer, the second film comprises zinc stannate over at least a portion of the first film, and the third film comprises zinc oxide over at least a portion of the second film.

Clause 346: The insulating glass unit of clause 345, wherein the second film comprises the patterned feature.

Clause 347: The insulating glass unit of clause 346, wherein the patterned feature of the second film comprises a thickness in the range of from 18 nm to 35 nm, such as from 22 nm to 30 nm.

Clause 348: The insulating glass unit of any one of clauses 345 to 347, wherein the patterned feature is a symmetric pattern comprising stripes.

Clause 349: The insulating glass unit of clause 348, wherein the stripes comprise a width of at least 0.1 inch.

Clause 350: The insulating glass unit of clause 348 or 349, wherein the stripes are spaced apart from one another by at least 2 inches.

Clause 351: The insulating glass unit of any one of clauses 348 to 350, wherein the stripes are positioned horizontally, vertically, or diagonally across the second surface.

Clause 352: The insulating glass unit of clause 351, wherein the stripes are positioned horizontally across the second surface.

Clause 353: The insulating glass unit of clause 351, wherein the stripes are positioned vertically across the second surface.

Clause 354: The insulating glass unit of any one of clauses 345 to 347, wherein the patterned feature is an asymmetric pattern.

Clause 355: The insulating glass unit of clause 344, wherein the third layer comprises a first film, a second film, and a third film.

Clause 356: The insulating glass unit of clause 355, wherein the first film of the third layer comprises zinc oxide over at least a portion of the second metallic layer, the second film comprises zinc stannate over at least a portion of the first film, and the third film comprises zinc oxide over at least a portion of the second film.

Clause 357: The insulating glass unit of any one of clauses 268, 285, 286, 296 to 299, 311 to 317, 327, 328, 344, 355, and 356, wherein the patterned feature is formed in the third metallic layer over at least a portion of the third layer.

Clause 358: The insulating glass unit of clause 357, wherein the patterned feature of the third metallic layer comprises a thickness in the range of from 1 nm to 20 nm, such as from 1 nm to 15 nm, such as from 1 nm to 10 nm, or such as from 2 nm to 8 nm Clause 359: The insulating glass unit of clause 357 or 358, wherein the patterned feature is a symmetric pattern comprising stripes.

Clause 360: The insulating glass unit of clause 359, wherein the stripes comprise a width of at least 0.1 inch.

Clause 361: The insulating glass unit of clause 359 or 360, wherein the stripes are spaced apart from one another by at least 2 inches.

Clause 362: The insulating glass unit of any one of clauses 359 to 361, wherein the stripes are positioned horizontally, vertically, or diagonally across the second surface.

Clause 363: The insulating glass unit of clause 362, wherein the stripes are positioned horizontally across the second surface.

Clause 364: The insulating glass unit of clause 362, wherein the stripes are positioned vertically across the second surface.

Clause 365: The insulating glass unit of clause 357 or 358, wherein the patterned feature is an asymmetric pattern.

Clause 366: The insulating glass unit of any of clauses 344 to 365, wherein the third metallic layer is a continuous layer.

Clause 367: The insulating glass unit of any of clauses 344 to 365, wherein the third metallic layer is a discontinuous layer.

Clause 368: The insulating glass unit of any of clauses 344 to 367, wherein the functional coating further comprises a third primer layer formed over the third metallic layer.

Clause 369: The insulating glass unit of any of clauses 263 to 328, wherein the functional coating positioned over at least a portion of the second side comprising the No. 2 surface further comprises: a second layer over at least a portion of the metallic layer; a second metallic layer over at least a portion of the second layer; a third layer over at least a portion of the second metallic layer; a third metallic layer over at least a portion of the third layer; a fourth layer over at least a portion of the third metallic layer; and a fourth metallic layer over at least a portion of the fourth layer, wherein the top layer is over at least a portion of the fourth metallic layer.

Clause 370: The insulating glass unit of clause 369, wherein the fourth layer comprises a first film, a second film, and a third film.

Clause 371: The insulating glass unit of clause 370, wherein the first film of the fourth layer comprises zinc oxide over at least a portion of the third metallic layer, the second film comprises zinc stannate over at least a portion of the first film, and the third film comprises zinc oxide over at least a portion of the second film.

Clause 372: The insulating glass unit of any one of clauses 268, 285, 286, 296 to 299, 311 to 317, 327, 328, and 369 to 371, wherein the patterned feature is formed in the fourth metallic layer over at least a portion of the fourth layer.

Clause 373: The insulating glass unit of clause 372, wherein the patterned feature of the fourth metallic layer film comprises a thickness in the range of from 1 nm to 20 nm, such as from 1 nm to 15 nm, such as from 1 nm to 10 nm, or such as from 2 nm to 8 nm Clause 374: The insulating glass unit of clause 372 or 373, wherein the patterned feature is a symmetric pattern comprising stripes.

Clause 375: The insulating glass unit of clause 374, wherein the stripes comprise a width of at least 0.1 inch.

Clause 376: The insulating glass unit of clause 374 or 375, wherein the stripes are spaced apart from one another by at least 2 inches.

Clause 377: The insulating glass unit of any one of clauses 374 to 376, wherein the stripes are positioned horizontally, vertically, or diagonally across the second surface.

Clause 378: The insulating glass unit of clause 377, wherein the stripes are positioned horizontally across the second surface.

Clause 379: The insulating glass unit of clause 377, wherein the stripes are positioned vertically across the second surface.

Clause 380: The insulating glass unit of clause 372 or 373, wherein the patterned feature is an asymmetric pattern.

Clause 381: The insulating glass unit of any of clauses 368 to 380, wherein the fourth metallic layer is a continuous layer.

Clause 382: The insulating glass unit of any of clauses 368 to 381, wherein the functional coating further comprising a fourth primer layer formed over the fourth metallic layer.

Clause 383: A coated article comprising: a substrate comprising a first side comprising a first surface and a second side comprising a second surface, wherein the second surface is opposite the first surface; a functional coating positioned over at least a portion of the second side, the functional coating comprising: a base layer positioned over at least a portion of the second surface, wherein the base layer comprises a first film positioned over at least a portion of the second surface, and a second film positioned over at least a portion of the first film; a metallic layer positioned over at least a portion of the base layer; a second layer over at least a portion of the metallic layer; a second metallic layer over at least a portion of the second layer; a third layer over at least a portion of the second metallic layer; a third metallic layer over at least a portion of the third layer, and a top layer positioned over at least a portion of the third metallic layer, wherein the second side comprises a patterned feature.

Clause 384: The coated article of clause 383, wherein the functional coating consists of three metallic layers.

Clause 385: The coated article of clause 383 or 384, wherein the patterned feature is formed in the functional coating over at least a portion of the second side.

Clause 386: The coated article of any one of clauses 383 to 385, wherein the patterned feature is formed in the second layer.

Clause 387: The coated article of clause 386, wherein the second layer comprises a first film, a second film, and a third film.

Clause 388: The coated article of clause 387, wherein the first film comprises zinc oxide over at least a portion of the second metallic layer, the second film comprises zinc stannate over at least a portion of the first film, and the third film comprises zinc oxide over at least a portion of the second film.

Clause 389: The coated article of clause 387 or 388, wherein the second film comprises the patterned feature.

Clause 390: The coated article of clause 389, wherein the patterned feature of the second film comprises a thickness in the range of from 18 nm to 35 nm, such as from 22 nm to 30 nm.

Clause 391: The coated article of any one of clauses 386 to 390, wherein the patterned feature is a symmetric pattern comprising stripes.

Clause 392: The coated article of clause 391, wherein the stripes comprise a width of at least 0.1 inch.

Clause 393: The coated article of clause 391 or 392, wherein the stripes are spaced apart from one another by at least 2 inches.

Clause 394: The coated article of any one of clauses 391 to 393, wherein the stripes are positioned horizontally, vertically, or diagonally across the second surface.

Clause 395: The coated article of clause 394, wherein the stripes are positioned horizontally across the second surface.

Clause 396: The coated article of clause 394, wherein the stripes are positioned vertically across the second surface.

Clause 397: The coated article of any one of clauses 386 to 390, wherein the patterned feature is an asymmetric pattern.

Clause 398: A method of making a coated article, the method comprising: providing a substrate comprising a first side comprising a first surface and a second side comprising a second surface, wherein the second surface is opposite the first surface; forming a functional coating over at least a portion of the second side, wherein forming the functional coating comprises: forming a base layer over at least a portion of the second surface, wherein forming the base layer comprises: forming a first film over at least a portion of the second surface, and forming a second film over at least a portion of the first film; forming a metallic layer over at least a portion of the base layer; forming a second layer over at least a portion of the metallic layer; forming a second metallic layer over at least a portion of the second layer; forming a third layer over at least a portion of the second metallic layer; forming a third metallic layer over at least a portion of the third layer; and forming a top layer over at least a portion of the third metallic layer, wherein the second side comprises a patterned feature.

Clause 399: The method of clause 398, wherein the functional coating consists of three metallic layers.

Clause 400: The method of clause 398 or 399, wherein the patterned feature is formed in the functional coating over at least a portion of the second side.

Clause 401: The method of any one of clauses 398 to 400, wherein the patterned feature is formed in the second layer.

Clause 402: The method of clause 401, wherein the second layer comprises a first film, a second film, and a third film.

Clause 403: The method of clause 402, wherein the first film comprises zinc oxide over at least a portion of the second metallic layer, the second film comprises zinc stannate over at least a portion of the first film, and the third film comprises zinc oxide over at least a portion of the second film.

Clause 404: The method of clause 402 or 403, wherein the second film comprises the patterned feature.

Clause 405: The method of clause 404, wherein the patterned feature of the second film comprises a thickness in the range of from 18 nm to 35 nm, such as from 22 nm to 30 nm.

Clause 406: The method of any one of clauses 401 to 405, wherein the patterned feature is a symmetric pattern comprising stripes.

Clause 407: The method of clause 406, wherein the stripes comprise a width of at least 0.1 inch.

Clause 408: The method of clause 406 or 407, wherein the stripes are spaced apart from one another by at least 2 inches.

Clause 409: The method of any one of clauses 406 to 408, wherein the stripes are positioned horizontally, vertically, or diagonally across the second surface.

Clause 410: The method of clause 409, wherein the stripes are positioned horizontally across the second surface.

Clause 411: The method of clause 409, wherein the stripes are positioned vertically across the second surface.

Clause 412: The method of any one of clauses 401 to 405, wherein the patterned feature is an asymmetric pattern.

Clause 413: The method of any one of clauses 401 to 412, wherein the patterned feature is formed by: applying the first film over at least a portion of the second metallic layer; applying the second film over at least a portion of the first film; applying a mask over at least a portion of the second film, wherein at least a portion of the second film is masked and the other portion of the second film is un-masked; further applying the second film over at least a portion of the second film that is masked and un-masked; removing the mask; and applying the third film over the second film.

Clause 414: The method of any one of clauses 401 to 412, wherein the patterned feature is formed by: applying the first film over at least a portion of the second metallic layer; applying the second film over at least a portion of the first film; applying a mask over a coater comprising the material for the second film, wherein at least a portion of the coater is masked and the other portion of the coater is un-masked; applying the from 18 nm to 35 nm, or such as from 22 nm to 30 nm of the material for forming the second film through the un-masked portion of the coater onto the second film; moving the article comprising the first film and the second film to a second coater comprising a material for forming the third film; applying the material for forming the third film over the second film to form the third film.

Clause 415: An insulating glass unit comprising: a first ply comprising a first side comprising a No. 1 surface and a second side comprising a No. 2 surface, wherein the No. 2 surface is opposite the No. 1 surface, a second ply comprising a first side comprising a No. 3 surface and a second side comprising a No. 4 surface, wherein the No. 4 surface is opposite the No. 3 surface, and wherein the first ply and second ply are connected together; a functional coating positioned over at least a portion of the second side comprising the No. 2 surface, the functional coating comprising: a base layer positioned over at least a portion of the No. 2 surface, wherein the base layer comprises: a first film positioned over at least a portion of the No. 2 surface, and a second film positioned over at least a portion of the first film; a metallic layer positioned over at least a portion of the base layer; a second layer over at least a portion of the metallic layer; a second metallic layer over at least a portion of the second layer; a third layer over at least a portion of the second metallic layer; a third metallic layer over at least a portion of the third layer, and a top layer positioned over at least a portion of the third metallic layer; wherein the second side comprising the No. 2 surface comprises a patterned feature.

Clause 416: The insulating glass unit of clause 415, wherein the functional coating consists of three metallic layers.

Clause 417: The insulating glass unit of clause 415 or 416, wherein the patterned feature is formed in the functional coating over at least a portion of the second side.

Clause 418: The insulating glass unit of any one of clauses 415 to 417, wherein the patterned feature is formed in the second layer.

Clause 419: The insulating glass unit of clause 418, wherein the second layer comprises a first film, a second film, and a third film.

Clause 420: The insulating glass unit of clause 419, wherein the first film comprises zinc oxide over at least a portion of the second metallic layer, the second film comprises zinc stannate over at least a portion of the first film, and the third film comprises zinc oxide over at least a portion of the second film.

Clause 421: The insulating glass unit of clause 419 or 420, wherein the second film comprises the patterned feature.

Clause 422: The insulating glass unit of clause 421, wherein the patterned feature of the second film comprises a thickness in the range of from 18 nm to 35 nm, such as from 22 nm to 30 nm.

Clause 423: The insulating glass unit of any one of clauses 418 to 422, wherein the patterned feature is a symmetric pattern comprising stripes.

Clause 424: The insulating glass unit of clause 423, wherein the stripes comprise a width of at least 0.1 inch.

Clause 425: The insulating glass unit of clause 423 or 424, wherein the stripes are spaced apart from one another by at least 2 inches.

Clause 426: The insulating glass unit of any one of clauses 423 to 425, wherein the stripes are positioned horizontally, vertically, or diagonally across the second surface.

Clause 427: The insulating glass unit of clause 426, wherein the stripes are positioned horizontally across the second surface.

Clause 428: The insulating glass unit of clause 426, wherein the stripes are positioned vertically across the second surface.

Clause 429: The insulating glass unit of any one of clauses 418 to 422, wherein the patterned feature is an asymmetric pattern.

Clause 430: A coated article comprising: a substrate comprising a first side comprising a first surface and a second side comprising a second surface, wherein the second surface is opposite the first surface; a functional coating positioned over at least a portion of the second side, the functional coating comprising: a base layer positioned over at least a portion of the second surface, wherein the base layer comprises a first film positioned over at least a portion of the second surface, and a second film positioned over at least a portion of the first film; a metallic layer positioned over at least a portion of the base layer; a second layer over at least a portion of the metallic layer; a second metallic layer over at least a portion of the second layer; a third layer over at least a portion of the second metallic layer; a third metallic layer over at least a portion of the third layer, and a top layer positioned over at least a portion of the third metallic layer, wherein the second side comprises a patterned feature.

Clause 431: The coated article of clause 430, wherein the functional coating consists of three metallic layers.

Clause 432: The coated article of clause 430 or 431, wherein the patterned feature is formed in the functional coating over at least a portion of the second side.

Clause 433: The coated article of clause 432, wherein the patterned feature is formed in the metallic layer over at least a portion of the base layer.

Clause 434: The coated article of clause 433, wherein the patterned feature of the metallic layer comprises a thickness in the range of from 1 nm to 20 nm, such as from 1 nm to 15 nm, such as from 1 nm to 10 nm, or such as from 2 nm to 8 nm.

Clause 435: The coated article of clause 433 or 434, wherein the patterned feature is a symmetric pattern comprising stripes.

Clause 436: The coated article of clause 435, wherein the stripes comprise a width of at least 0.1 inch.

Clause 437: The coated article of clause 435 or 436, wherein the stripes are spaced apart from one another by at least 2 inches.

Clause 438: The coated article of any one of clauses 435 to 437, wherein the stripes are positioned horizontally, vertically, or diagonally across the second surface.

Clause 439: The coated article of clause 438, wherein the stripes are positioned horizontally across the second surface.

Clause 440: The coated article of clause 438, wherein the stripes are positioned vertically across the second surface.

Clause 441: The coated article of clause 433 or 444, wherein the patterned feature is an asymmetric pattern.

Clause 442: The coated article of clause 432, wherein the patterned feature is formed in the second metallic layer over at least a portion of the second layer.

Clause 443: The coated article of clause 442, wherein the patterned feature of the second metallic layer comprises a thickness in the range of from 1 nm to 1 nm to 20 nm, such as from 1 nm to 15 nm, such as from 1 nm to 10 nm, or such as from 2 nm to 8 nm.

Clause 444: The coated article of clause 442 or 443, wherein the patterned feature is a symmetric feature comprising stripes.

Clause 445: The coated article of clause 444, wherein the stripes comprise a width of at least 0.1 inch.

Clause 446: The coated article of clause 444 or 445, wherein the stripes are spaced apart from one another by at least 2 inches.

Clause 447: The coated article of clause 444 to 446, wherein the stripes are positioned horizontally, vertically, or diagonally across the second surface.

Clause 448: The coated article of clause 447, wherein the stripes are positioned horizontally across the second surface.

Clause 449: The coated article of clause 447, wherein the stripes are positioned vertically across the second surface.

Clause 450: The coated article of clause 442 or 443, wherein the patterned feature is an asymmetric pattern.

Clause 451: The coated article of any one of clauses 430 to 450, wherein the second metallic layer is a continuous layer.

Clause 452: The coated article of any one of clauses 430 to 450, wherein the second metallic layer is a discontinuous layer.

Clause 453: The coated article of clause 432, wherein the patterned feature is formed in the third metallic layer over at least a portion of the third layer.

Clause 454: The coated article of clause 453, wherein the patterned feature of the third metallic layer comprises a thickness in the range of from 1 nm to 20 nm, such as from 1 nm to 15 nm, such as from 1 nm to 10 nm, or such as from 2 nm to 8 nm.

Clause 455: The coated article of clause 453 or 454, wherein the patterned feature is a symmetric pattern comprising stripes.

Clause 456: The coated article of clause 455, wherein the stripes comprise a width of at least 0.1 inch.

Clause 457: The coated article of clause 455 or 456, wherein the stripes are spaced apart from one another by at least 2 inches.

Clause 458: The coated article of any one of clauses 455 to 457, wherein the stripes are positioned horizontally, vertically, or diagonally across the second surface.

Clause 459: The coated article of clause 458, wherein the stripes are positioned horizontally across the second surface.

Clause 460: The coated article of clause 458, wherein the stripes are positioned vertically across the second surface.

Clause 461: The coated article of clause 453 or 454, wherein the patterned feature is an asymmetric pattern.

Clause 462: A method of making a coated article, the method comprising: providing a substrate comprising a first side comprising a first surface and a second side comprising a second surface, wherein the second surface is opposite the first surface; forming a functional coating over at least a portion of the second side, wherein forming the functional coating comprises: forming a base layer over at least a portion of the second surface, wherein forming the base layer comprises: forming a first film over at least a portion of the second surface, and forming a second film over at least a portion of the first film; forming a metallic layer over at least a portion of the base layer; forming a second layer over at least a portion of the metallic layer; forming a second metallic layer over at least a portion of the second layer; forming a third layer over at least a portion of the second metallic layer; forming a third metallic layer over at least a portion of the third layer; and forming a top layer over at least a portion of the third metallic layer, wherein the second side comprises a patterned feature.

Clause 463: The method of clause 462, wherein the functional coating consists of three metallic layers.

Clause 464: The method of clause 462 or 463, wherein the patterned feature is formed in the functional coating over at least a portion of the second side.

Clause 465: The method of clause 464, wherein the patterned feature is formed in the metallic layer over at least a portion of the base layer.

Clause 466: The method of clause 465, wherein the patterned feature of the metallic layer comprises a thickness in the range of from 1 nm to 20 nm, such as from 1 nm to 15 nm, such as from 1 nm to 10 nm, or such as from 2 nm to 8 nm.

Clause 467: The method of clause 465 or 466, wherein the patterned feature is a symmetric pattern comprising stripes.

Clause 468: The method of clause 467, wherein the stripes comprise a width of at least 0.1 inch.

Clause 469: The method of clause 467 or 468, wherein the stripes are spaced apart from one another by at least 2 inches.

Clause 470: The method of any one of clauses 467 to 469, wherein the stripes are positioned horizontally, vertically, or diagonally across the second surface.

Clause 471: The method of clause 470, wherein the stripes are positioned horizontally across the second surface.

Clause 472: The method of clause 470, wherein the stripes are positioned vertically across the second surface.

Clause 473: The method of clause 465 or 466, wherein the patterned feature is an asymmetric pattern.

Clause 474: The method of any one of clauses 465 to 473, wherein the patterned feature is formed by: applying a mask over at least a portion of the metallic layer positioned over at least a portion of the base layer, wherein at least a portion of the metallic layer is masked and the other portion of the metallic layer is un-masked; applying from 1 nm to 20 nm, such as from 1 nm to 15 nm, such as from 1 nm to 10 nm, or such as from 2 nm to 8 nm of additional metallic layer over the un-masked portion of the metallic layer; and removing the mask.

Clause 475: The method of any one of clauses 465 to 473, wherein the patterned feature is formed by: applying the metallic layer over at least of the portion of the base layer; applying a mask over at least a portion of a coater comprising a material for forming the metallic layer, wherein at least a portion of the coater is masked and the other portion of the coater is unmasked; and applying from 1 nm to 20 nm, such as from 1 nm to 15 nm, such as from 1 nm to 10 nm, or such as from 2 nm to 8 nm of the material for forming metallic layer through the un-masked portion of the coater.

Clause 476: The method of clause 464, wherein the patterned feature is formed in the second metallic layer over at least a portion of the second layer.

Clause 477: The method of clause 476, wherein the patterned feature of the second metallic layer comprises a thickness in the range of from 1 nm to 1 nm to 20 nm, such as from 1 nm to 15 nm, such as from 1 nm to 10 nm, or such as from 2 nm to 8 nm.

Clause 478: The method of clause 476 or 477, wherein the patterned feature is a symmetric feature comprising stripes.

Clause 479: The method of clause 478, wherein the stripes comprise a width of at least 0.1 inch.

Clause 480: The method of clause 478 or 479, wherein the stripes are spaced apart from one another by at least 2 inches.

Clause 481: The method of clause 478 to 480, wherein the stripes are positioned horizontally, vertically, or diagonally across the second surface.

Clause 482: The method of clause 481, wherein the stripes are positioned horizontally across the second surface.

Clause 483: The method of clause 481, wherein the stripes are positioned vertically across the second surface.

Clause 484: The method of clause 476 or 477, wherein the patterned feature is an asymmetric pattern.

Clause 485: The method of clause 476 to 484, wherein the patterned feature is formed by: applying a mask over at least a portion of the second metallic layer positioned over at least a portion of the second layer, wherein at least a portion of the second metallic layer is masked and the other portion of the metallic layer is un-masked; applying from 1 nm to 20 nm, such as from 1 nm to 15 nm, such as from 1 nm to 10 nm, or such as from 2 nm to 8 nm of additional second metallic layer over the un-masked portion of the second metallic layer; and removing the mask.

Clause 486: The method of any one of clauses 476 to 484, wherein the patterned feature is formed by: applying the second metallic layer over at least of the portion of the second layer; applying a mask over at least a portion of a coater comprising a material for forming the second metallic layer, wherein at least a portion of the coater is masked and the other portion of the coater is unmasked; and applying from 1 nm to 20 nm, such as from 1 nm to 15 nm, such as from 1 nm to 10 nm, or such as from 2 nm to 8 nm of the material for forming the second metallic layer through the un-masked portion of the coater.

Clause 487: The method of any one of clauses 462 to 486, wherein the second metallic layer is a continuous layer.

Clause 488: The method of any one of clauses 462 to 486, wherein the second metallic layer is a discontinuous layer.

Clause 489: The method of clause 464, wherein the patterned feature is formed in the third metallic layer over at least a portion of the third layer.

Clause 490: The method of clause 489, wherein the patterned feature of the third metallic layer comprises a thickness in the range of from 1 nm to 20 nm, such as from 1 nm to 15 nm, such as from 1 nm to 10 nm, or such as from 2 nm to 8 nm.

Clause 491: The method of clause 489 or 490, wherein the patterned feature is a symmetric pattern comprising stripes.

Clause 492: The method of clause 491, wherein the stripes comprise a width of at least 0.1 inch.

Clause 493: The method of clause 491 or 492, wherein the stripes are spaced apart from one another by at least 2 inches.

Clause 494: The method of any of clauses 491 to 493, wherein the stripes are positioned horizontally, vertically, or diagonally across the second surface.

Clause 495: The method of clause 494, wherein the stripes are positioned horizontally across the second surface.

Clause 496: The method of clause 494, wherein the stripes are positioned vertically across the second surface.

Clause 497: The method of clause 489 or 490, wherein the patterned feature is an asymmetric pattern.

Clause 498: The method of any one of clauses 489 to 497, wherein the patterned feature is formed by: applying a mask over at least a portion of the third metallic layer positioned over at least a portion of the third layer, wherein at least a portion of the third metallic layer is masked and the other portion of the third metallic layer is un-masked; applying from 1 nm to 20 nm, such as from 1 nm to 15 nm, such as from 1 nm to 10 nm, or such as from 2 nm to 8 nm of additional third metallic layer over the un-masked portion of the third metallic layer; and removing the mask.

Clause 499: The method of any one of clauses 489 to 497, wherein the patterned feature is formed by: applying the third metallic layer over at least of the portion of the third layer; applying a mask over at least a portion of a coater comprising a material for forming the third metallic layer, wherein at least a portion of the coater is masked and the other portion of the coater is unmasked; and applying from 1 nm to 20 nm, such as from 1 nm to 15 nm, such as from 1 nm to 10 nm, or such as from 2 nm to 8 nm of the material for forming the third metallic layer through the un-masked portion of the coater.

Clause 500: An insulating glass unit comprising: a first ply comprising a first side comprising a No. 1 surface and a second side comprising a No. 2 surface, wherein the No. 2 surface is opposite the No. 1 surface, a second ply comprising a first side comprising a No. 3 surface and a second side comprising a No. 4 surface, wherein the No. 4 surface is opposite the No. 3 surface, and wherein the first ply and second ply are connected together; a functional coating positioned over at least a portion of the second side comprising the No. 2 surface, the functional coating comprising: a base layer positioned over at least a portion of the No. 2 surface, wherein the base layer comprises: a first film positioned over at least a portion of the No. 2 surface, and a second film positioned over at least a portion of the first film; a metallic layer positioned over at least a portion of the base layer; a second layer over at least a portion of the metallic layer; a second metallic layer over at least a portion of the second layer; a third layer over at least a portion of the second metallic layer; a third metallic layer over at least a portion of the third layer, and a top layer positioned over at least a portion of the third metallic layer; wherein the second side comprising the No. 2 surface comprises a patterned feature.

Clause 501: The insulating glass unit of clause 500, wherein the functional coating consists of three metallic layers.

Clause 502: The insulating glass unit of clause 500 or 501, wherein the patterned feature is formed in the functional coating over at least a portion of the second side.

Clause 503: The insulating glass unit of clause 502, wherein the patterned feature is formed in the metallic layer over at least a portion of the base layer.

Clause 504: The insulating glass unit of clause 503, wherein the patterned feature of the metallic layer comprises a thickness in the range of from 1 nm to 20 nm, such as from 1 nm to 15 nm, such as from 1 nm to 10 nm, or such as from 2 nm to 8 nm.

Clause 505: The insulating glass unit of clause 503 or 504, wherein the patterned feature is a symmetric pattern comprising stripes.

Clause 506: The insulating glass unit of clause 505, wherein the stripes comprise a width of at least 0.1 inch.

Clause 507: The insulating glass unit of clause 505 or 506, wherein the stripes are spaced apart from one another by at least 2 inches.

Clause 508: The insulating glass unit of any one of clauses 505 to 507, wherein the stripes are positioned horizontally, vertically, or diagonally across the second surface.

Clause 509: The insulating glass unit of clause 508, wherein the stripes are positioned horizontally across the second surface.

Clause 510: The insulating glass unit of clause 508, wherein the stripes are positioned vertically across the second surface.

Clause 511: The insulating glass unit of clause 503 or 504, wherein the patterned feature is an asymmetric pattern.

Clause 512: The insulating glass unit of clause 502, wherein the patterned feature is formed in the second metallic layer over at least a portion of the second layer.

Clause 513: The insulating glass unit of clause 512, wherein the patterned feature of the second metallic layer comprises a thickness in the range of from 1 nm to 1 nm to 20 nm, such as from 1 nm to 15 nm, such as from 1 nm to 10 nm, or such as from 2 nm to 8 nm.

Clause 514: The insulating glass unit of clause 512 or 513, wherein the patterned feature is a symmetric feature comprising stripes.

Clause 515: The insulating glass unit of clause 514, wherein the stripes comprise a width of at least 0.1 inch.

Clause 516: The insulating glass unit of clause 514 or 515, wherein the stripes are spaced apart from one another by at least 2 inches.

Clause 517: insulating glass unit of clause 514 to 516, wherein the stripes are positioned horizontally, vertically, or diagonally across the second surface.

Clause 518: The insulating glass unit of clause 517, wherein the stripes are positioned horizontally across the second surface.

Clause 519: The insulating glass unit of clause 517, wherein the stripes are positioned vertically across the second surface.

Clause 520: The insulating glass unit of clause 512 or 513, wherein the patterned feature is an asymmetric pattern.

Clause 521: The insulating glass unit of any one of clauses 500 to 520, wherein the second metallic layer is a continuous layer.

Clause 522: The insulating glass unit of any one of clauses 500 to 520, wherein the second metallic layer is a discontinuous layer.

Clause 523: The insulating glass unit of clause 502, wherein the patterned feature is formed in the third metallic layer over at least a portion of the third layer.

Clause 524: The insulating glass unit of clause 523, wherein the patterned feature of the third metallic layer comprises a thickness in the range of from 1 nm to 20 nm, such as from 1 nm to 15 nm, such as from 1 nm to 10 nm, or such as from 2 nm to 8 nm.

Clause 525: The insulating glass unit of clause 523 or 524, wherein the patterned feature is symmetric pattern comprising stripes.

Clause 526: The insulating glass unit of clause 525, wherein the stripes comprise a width of at least 0.1 inch.

Clause 527: The insulating glass unit of clause 525 or 526, wherein the stripes are spaced apart from one another by at least 2 inches.

Clause 528: The insulating glass unit of any one of clauses 525 to 527, wherein the stripes are positioned horizontally, vertically, or diagonally across the second surface.

Clause 529: The insulating glass unit of clause 528, wherein the stripes are positioned horizontally across the second surface.

Clause 530: The insulating glass unit of clause 528, wherein the stripes are positioned vertically across the second surface.

Clause 531: The insulating glass unit of clause 523 or 524, wherein the patterned feature is an asymmetric pattern.

EXAMPLES

Example 1

Coated articles were formed by applying functional coatings on 6 inch by 12 inch pieces of clear soda lime glass substrates according to Table 1. The substrates had a thickness of 6 millimeters (mm). Prior to the application of the third film of the top layer, a stainless steel sheet having 0.25 inch wide strips removed was applied over the second film of the top layer (zinc stannate). The third film of the top layer (zinc stannate) was then applied over the un-masked portion of the second film of the top layer (zinc stannate) to form the patterned feature. Following the application of the third film of the top layer (zinc stannate), the mask was removed. The third film of the top layer of Samples 1-4 had thickness of 5 nm, 10 nm, 15 nm, and 55 nm, respectively.

TABLE 1

| Sample No. | 1 | 2 | 3 | 4 |
|---|---|---|---|---|
| Substrate | Glass | Glass | Glass | Glass |
| First Film of Base Layer | Tin Oxide | Tin Oxide | Tin Oxide | Tin Oxide |
| Second Film of Base Layer | Zinc Oxide | Zinc Oxide | Zinc Oxide | Zinc Oxide |
| Metallic Layer | Silver | Silver | Silver | Silver |
| First Primer Layer | Titanium | Titanium | Titanium | Titanium |
| First Film of Second Layer | Zinc Oxide | Zinc Oxide | Zinc Oxide | Zinc Oxide |
| Second Film of Second Layer | Zinc Stannate | Zinc Stannate | Zinc Stannate | Zinc Stannate |
| Third Film of Second Layer | Zinc Oxide | Zinc Oxide | Zinc Oxide | Zinc Oxide |
| Second Metallic Layer | Silver | Silver | Silver | Silver |
| Second Primer Layer | Titanium | Titanium | Titanium | Titanium |
| First Film of Top Layer | Zinc Oxide | Zinc Oxide | Zinc Oxide | Zinc Oxide |

TABLE 1-continued

| Sample No. | 1 | 2 | 3 | 4 |
|---|---|---|---|---|
| Second Film of Top Layer | Zinc Stannate | Zinc Stannate | Zinc Stannate | Zinc Stannate |
| Third Film of Top Layer | Zinc Stannate (5 nm) | Zinc Stannate (10 nm) | Zinc Stannate (15 nm) | Zinc Stannate (55 nm) |

Figure 12A:
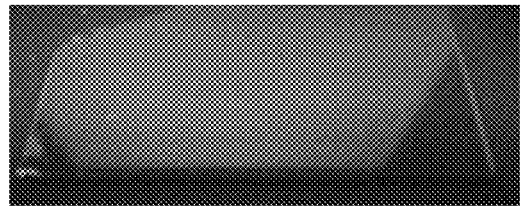
FIGS. 12A-12C are photographs of glass substrates having a patterned feature comprising stripes in the third film of the top layer of a functional coating, where the third film had a thickness of 5 nanometers (nm) (FIG. 12A), 10 nm (FIG. 12B), or 15 nm (FIG. 12C). The functional coatings of FIGS. 12A-12C had two metallic layers and were applied on the second sides of the substrates.
Figure 12B:
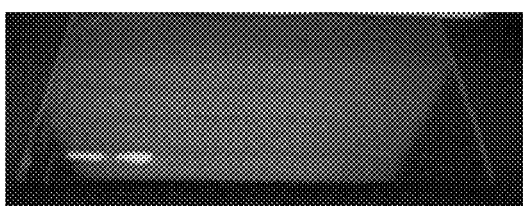
Figure 12C:
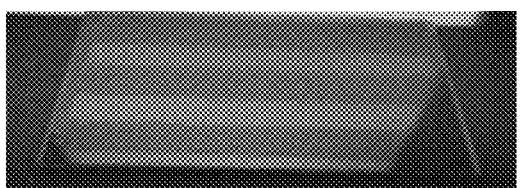

Photographs of Sample 1, Sample 2, and Sample 3 can be found in FIGS. 12A-12C, respectively, where the coated glass substrates were imaged under reflected light. To achieve reflected light, a light box was illuminated at a 90 degree angle from the patterned coated article. The patterned coated article was laying on a flat surface that was perpendicular to the light box. As shown in the FIGS. 12A-12C, the patterned feature becomes more visible as the thickness of the top film (zinc stannate) of the top layer increases.

Figure 13:
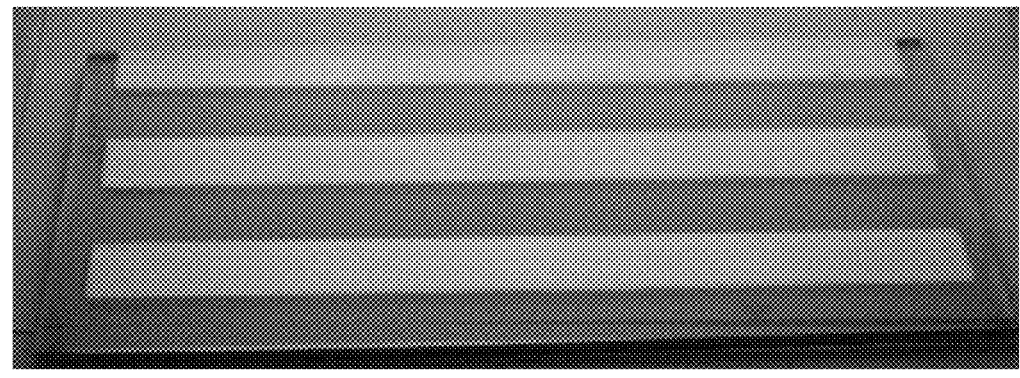
FIG. 13 is a photograph of a glass substrate having a patterned feature comprising stripes in the third film of the top layer of a functional coating, where the third film had a thickness of 55 nm. The functional coating had two metallic layers and was applied on the second side of the glass substrate.

A photograph of Sample 4 is provided in FIG. 13, where the coated glass substrate was imaged under reflected light. The spectral properties of the patterned feature of Sample 4 can be found in Table 2. "T" refers to transmittance, "Rf" refers to coating side reflection, and "Rg" refers to glass side reflection.

TABLE 2

| Sample No. | T L* | T a* | T b* | Rf L* | Rf a* | Rf b* | Rg L* | Rg a* | Rg b* |
|---|---|---|---|---|---|---|---|---|---|
| 4 | 81.63 | −3.38 | 11.09 | 63.08 | 2.03 | −13.54 | 58.69 | −1.60 | −16.36 |

Example 2

Coated articles were formed by applying functional coatings on 6 inch by 12 inch pieces of clear soda lime glass substrates according to Table 3. The glass substrates of Samples 6-9 had a thickness of 6 mm. Prior to the application of the third film of the top layer, a stainless steel sheet having 0.25 inch wide strips removed was applied over the second film of the top layer (zinc stannate). The third film of the top layer (zinc stannate) was then applied over the un-masked portion of the second film of the top layer (zinc stannate) to form the patterned feature. Following the application of the third film of the top layer (zinc stannate), the mask was removed. The third film of the top layer of Samples 6-9 had thickness of 5 nm, 10 nm, 15 nm, and 30 nm, respectively.

TABLE 3

| Sample No. | 6 | 7 | 8 | 9 |
|---|---|---|---|---|
| Substrate | Glass | Glass | Glass | Glass |
| First Film of Base Layer | Tin Oxide | Tin Oxide | Tin Oxide | Tin Oxide |
| Second Film of Base Layer | Zinc Oxide | Zinc Oxide | Zinc Oxide | Zinc Oxide |
| Metallic Layer | Silver | Silver | Silver | Silver |
| First Primer Layer | Titanium | Titanium | Titanium | Titanium |
| First Film of Second Layer | Zinc Oxide | Zinc Oxide | Zinc Oxide | Zinc Oxide |
| Second Film of Second Layer | Zinc Stannate | Zinc Stannate | Zinc Stannate | Zinc Stannate |
| Third Film of Second Layer | Zinc Oxide | Zinc Oxide | Zinc Oxide | Zinc Oxide |
| Second Metallic Layer | Silver | Silver | Silver | Silver |
| Second Primer Layer | Titanium | Titanium | Titanium | Titanium |
| First Film of Third Layer | Zinc Oxide | Zinc Oxide | Zinc Oxide | Zinc Oxide |
| Second Film of Third Layer | Zinc Stannate | Zinc Stannate | Zinc Stannate | Zinc Stannate |
| Third Film of Third Layer | Zinc Oxide | Zinc Oxide | Zinc Oxide | Zinc Oxide |
| Third Metallic Layer | Silver | Silver | Silver | Silver |
| Third Primer Layer | Titanium | Titanium | Titanium | Titanium |

TABLE 3-continued

| Sample No. | 6 | 7 | 8 | 9 |
|---|---|---|---|---|
| First Film of Top Layer | Zinc Oxide | Zinc Oxide | Zinc Oxide | Zinc Oxide |
| Second Film of Top Layer | Zinc Stannate | Zinc Stannate | Zinc Stannate | Zinc Stannate |
| Third Film of Top Layer | Zinc Stannate | Zinc Stannate | Zinc Stannate | Zinc Stannate |
| | (5 nm) | (10 nm) | (15 nm) | (30 nm) |

Figure 14A:
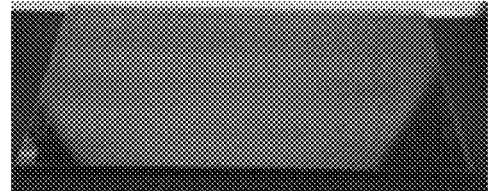
FIGS. 14A-14C are photographs of glass substrates having a patterned feature comprising stripes in the third film of the top layer of a functional coating, where the third film had a thickness of 5 nanometers (nm) (FIG. 12A), 10 nm (FIG. 12B), or 15 nm (FIG. 12C). The functional coatings of FIGS. 14A-14C had three metallic layers and were applied on the second sides of the substrates.
Figure 14B:
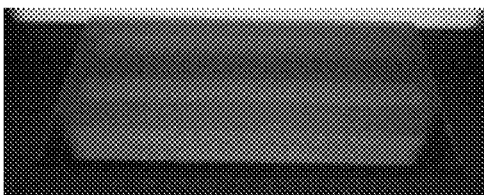
Figure 14C:
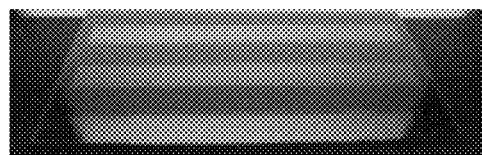

Photographs of Sample 6, Sample 7, and Sample 8 can be found in FIGS. 14A-14C, respectively, where the coated glass substrates were image under reflected light. As shown in the FIGS. 14A-14C, the patterned feature becomes more visible as the thickness of the top film (zinc stannate) of the top layer increases.

Samples 8 and 9 were heated. The spectral properties of the patterned feature of Samples 8 and 9 can be found in Table 4.

TABLE 4

| Sample No. | T L* | T a* | T b* | Rf L* | Rf a* | Rf b* | Rg L* | Rg a* | Rg b* |
|---|---|---|---|---|---|---|---|---|---|
| 8 | 85.6 | −2.5 | 11.3 | 46.5 | −5.7 | −24.5 | 46.02 | −10.3 | −17.2 |
| 9 | 79.8 | 0.18 | 14.3 | 61.3 | −8.14 | −19.25 | 56.6 | −15.5 | −13.14 |

Example 3

A coated article was formed by applying a functional coating on a 0.5 meter (in) by 1 m piece of clear soda lime glass substrate according to Table 5. The glass substrate of Sample 10 had a thickness of 6 mm. To form the second film of the second layer, a layer of zinc stannate was deposited. A stainless steel sheet having 0.25 inch wide strips removed was applied over the previously deposited zinc stannate layer. A 25 nm thick layer of zinc stannate was then applied over the un-masked portion of the previous zinc stannate layer to form the zinc stannate patterned feature. The mask was then removed. The initial zinc stannate layer and the zinc stannate patterned feature form the second film of the second layer. The third film (zinc oxide) of the second layer was then applied over the previously-masked portion of the second film and the patterned feature. A schematic of Sample 10 is provided in FIG. 16.

TABLE 5

| Sample No. | 10 |
|---|---|
| Substrate | Glass |
| First Film of Base Layer | Tin Oxide |
| Second Film of Base Layer | Zinc Oxide |

TABLE 5-continued

| Sample No. | 10 |
|---|---|
| Metallic Layer | Silver |
| First Primer Layer | Titanium |
| First Film of Second Layer | Zinc Oxide |
| Second Film of Second Layer | Zinc Stannate |
| Third Film of Second Layer | Zinc Oxide |
| Second Metallic Layer | Silver |
| Second Primer Layer | Titanium |
| First Film of Third Layer | Zinc Oxide |
| Second Film of Third Layer | Zinc Stannate |
| Third Film of Third Layer | Zinc Oxide |
| Third Metallic Layer | Silver |
| Third Primer Layer | Titanium |
| First Film of Top Layer | Zinc Oxide |
| Second Film of Top Layer | Zinc Stannate |

Sample 10 was heated. The spectral properties of the patterned feature of Sample 10 can be found in Table 6. Sample 10 exhibited contrast in reflection, as well as a neutral transmitted color (Tb).

TABLE 6

| Sample No. | T L* | T a* | T b* | Rf L* | Rf a* | Rf b* | Rg L* | Rg a* | Rg b* |
|---|---|---|---|---|---|---|---|---|---|
| 10 | 86.2 | −10.9 | 3.32 | 44.3 | 23.22 | −1.75 | 47.9 | 19.9 | −7.23 |

Example 4

A coated article was formed by applying a functional coating on a 6 inch by 12 inch piece of clear soda lime glass substrate according to Table 7. The substrate had a thickness of 6 mm. After the application of the metallic layer, a stainless steel sheet having 0.25 inch wide strips removed was applied over the second film of the base layer (zinc stannate). An additional 2 nm of metallic layer was then applied over the un-masked portion of the metallic layer to form the patterned feature. Following the application of the additional metallic layer, the mask was removed and the first primer layer was applied over the metallic layer and the additional metallic layer (the patterned feature).

TABLE 7

| Sample No. | 11 |
| --- | --- |
| Substrate | Glass |
| First Film of Base Layer | Tin Oxide |
| Second Film of Base Layer | Zinc Oxide |
| Metallic Layer | Silver |
| Additional Metallic Layer | 2 nm Silver |
| First Primer Layer | Titanium |
| First Film of Second Layer | Zinc Oxide |
| Second Film of Second Layer | Zinc Stannate |
| Third Film of Second Layer | Zinc Oxide |
| Second Metallic Layer | Silver |
| Second Primer Layer | Titanium |
| First Film of Third Layer | Zinc Oxide |
| Second Film of Third Layer | Zinc Stannate |
| Third Film of Third Layer | Zinc Oxide |
| Third Metallic Layer | Silver |
| Third Primer Layer | Titanium |
| First Film of Top Layer | Zinc Oxide |
| Second Film of Top Layer | Zinc Stannate |

Sample 11 was imaged under reflected light and the patterned features were visible under reflected light. The patterned features were also slightly visible in transmitted light.

The spectral properties of the patterned feature of Sample 11 can be found in Table 8.

TABLE 8

| Sample No. | T L* | T a* | T b* | Rf L* | Rf a* | Rf b* | Rg L* | Rg a* | Rg b* |
| --- | --- | --- | --- | --- | --- | --- | --- | --- | --- |
| 11 | 85.49 | −2.87 | 1.33 | 45.22 | −10.72 | 9.43 | 41.23 | −13.11 | 2.44 |

Example 5

A coated article was formed by applying a functional coating on a 6 inch by 12 inch piece of clear soda lime glass substrate according to Table 9. The substrate had a thickness of 6 mm. After the application of the third metallic layer, a stainless steel sheet having 0.25 inch wide strips removed was applied over the third film of the third layer (zinc oxide). An additional 2 nm of third metallic layer was then applied over the un-masked portion of the third metallic layer to form the patterned feature. Following the application of the additional third metallic layer, the mask was removed and the third primer layer was applied over the third metallic layer and the additional third metallic layer (the patterned feature)

TABLE 9

| Sample No. | 12 |
|---|---|
| Substrate | Glass |
| First Film of Base Layer | Tin Oxide |
| Second Film of Base Layer | Zinc Oxide |
| Metallic Layer | Silver |
| First Primer Layer | Titanium |
| First Film of Second Layer | Zinc Oxide |
| Second Film of Second Layer | Zinc Stannate |
| Third Film of Second Layer | Zinc Oxide |
| Second Metallic Layer | Silver |
| Second Primer Layer | Titanium |
| First Film of Third Layer | Zinc Oxide |
| Second Film of Third Layer | Zinc Stannate |
| Third Film of Third Layer | Zinc Oxide |
| Third Metallic Layer | Silver |
| Additional Third Metallic Layer | 2 nm Silver |
| Third Primer Layer | Titanium |
| First Film of Top Layer | Zinc Oxide |
| Second Film of Top Layer | Zinc Stannate |

Sample 12 was imaged under reflected light and the patterned features were visible under reflected light. The patterned features were also slightly visible in transmitted light.

The spectral properties of the patterned feature of Sample 12 can be found in Table 10.

TABLE 10

| Sample No. | T L* | T a* | T b* | Rf L* | Rf a* | Rf b* | Rg L* | Rg a* | Rg b* |
|---|---|---|---|---|---|---|---|---|---|
| 12 | 85.78 | −4.29 | 6.03 | 43.18 | −7.18 | −7.69 | 42.89 | −2.35 | −9.56 |

Example 6

Three coated articles were prepared and subjected to Tunnel Testing at the American Bird Conservancy. This Tunnel Test tests the ability of glass substrates to deter bird collisions.

The coated article of Sample 13 was formed by applying a functional coating on a 6 inch by 12 inch piece of clear soda lime glass substrate. The substrate had a thickness of 6 mm. The functional coating had the same structure as provided in Sample 9 of Table 3. The functional coating was applied in the same manner as described in Example 2.

The coated article of Sample 14 was formed by applying a functional coating on a 6 inch by 12 inch piece of clear soda lime glass substrate. The substrate had a thickness of 6 mm. The functional coating had the same structure as provided in Table 5. The functional coating was applied in the same manner as described in Example 3.

The coated article of Sample 15 was formed by applying a functional coating on a 6 inch by 12 inch piece of clear soda lime glass substrate. The substrate had a thickness of 3.2 mm. The functional coating had the same structure as provided in Table 7. The functional coating was applied in the same manner as described in Example 4.

Sample 13, Sample 14, and Sample 15 each exhibited a threat factor of less than 30, which indicated that the coated articles had the ability to deter bird collisions.

It will be readily appreciated by those skilled in the art that modification may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A coated article comprising:
a substrate comprising a first side comprising a first surface and a second side comprising a second surface, wherein the second surface is opposite the first surface;
a functional coating positioned over at least a portion of the second side, the functional coating comprising: a base layer positioned over at least a portion of the second surface, wherein the base layer comprises a first film positioned over at least a portion of the second surface, and a second film positioned over at least a portion of the first film; a metallic layer positioned over at least a portion of the base layer; and a top layer positioned over at least a portion of the metallic layer, wherein the functional coating comprises a patterned feature.

2. The coated article of claim 1, wherein the patterned feature is in the metallic layer positioned over at least a portion of the base layer, and wherein the patterned feature of the metallic layer comprises a thickness in the range of from 1 nm to 20 nm.

3. The coated article of claim 2, wherein the patterned feature is a symmetric pattern comprising stripes, wherein the stripes comprise a width of at least 0.1 inch, wherein the stripes are spaced apart from one another by at least 2 inches, and wherein the stripes are positioned horizontally, vertically, or diagonally across the second surface.

4. The coated article of claim 1, wherein the metallic layer comprises silver, gold, palladium, copper, alloys thereof, mixtures thereof, or combinations thereof.

5. The coated article of claim 1, wherein the patterned feature is in the top layer, wherein the top layer comprises a first film, a second film, and a third film.

6. The coated article of claim 5, wherein the third film of the top layer comprises the patterned feature, wherein the third film of the top layer comprises a thickness in the range of from 3 nm to 60 nm.

7. The coated article of claim 6, wherein the patterned feature is a symmetric pattern comprising stripes, wherein the stripes comprise a width of at least 0.1 inch, and wherein the stripes are spaced apart from one another by at least 2 inches, and wherein the stripes are positioned horizontally, vertically, or diagonally across the second surface.

8. The coated article of claim 1, wherein the functional coating further comprises an outermost protective coating comprising a protective layer, wherein the protective layer comprises at least one of $Si_3N_4$, SiAlN, SiAlON, SiAlO, TiAlO, titania, alumina, silica, zirconia, or combinations thereof.

9. The coated article of claim 1, wherein the patterned feature is visible to birds.

10. The coated article of claim 1, wherein the functional coating positioned over at least a portion of the second side further comprises: a second layer over at least a portion of the metallic layer; and a second metallic layer over at least a portion of the second layer, wherein the top layer is over at least a portion of the second metallic layer.

11. The coated article of claim 10, wherein the patterned feature is in the second metallic layer over at least a portion of the second layer, wherein the patterned feature of the second metallic layer comprises a thickness in the range of from 1 nm to 20 nm.

12. The coated article of claim 1, wherein the functional coating positioned over at least a portion of the second side further comprises: a second layer over at least a portion of the metallic layer; a second metallic layer over at least a portion of the second layer; a third layer over at least a portion of the second metallic layer; and a third metallic layer over at least a portion of the third layer, wherein the top layer is over at least a portion of the third metallic layer.

13. The coated article of claim 12, wherein the patterned feature is in the second layer, wherein the second layer comprises a first film, a second film, and a third film.

14. The coated article of claim 13, wherein the second film comprises the patterned feature, wherein the patterned feature of the second film comprises a thickness in the range of from 18 nm to 35 nm.

15. The coated article of claim 12, wherein the patterned feature is formed in the third metallic layer over at least a portion of the third layer, wherein the patterned feature of the third metallic layer comprises a thickness in the range of from 1 nm to 20 nm.

16. The coated article of claim 1, wherein the functional coating positioned over at least a portion of the second side further comprises: a second layer over at least a portion of the metallic layer; a second metallic layer over at least a portion of the second layer; a third layer over at least a portion of the second metallic layer; a third metallic layer over at least a portion of the third layer; a fourth layer over at least a portion of the third metallic layer; and a fourth metallic layer over at least a portion of the fourth layer, wherein the top layer is over at least a portion of the fourth metallic layer.

17. The coated article of claim 16, wherein the patterned feature is in the fourth metallic layer over at least a portion of the fourth layer, wherein the patterned feature of the fourth metallic layer film comprises a thickness in the range of from 1 nm to 20 nm.

18. A method of making a coated article, the method comprising:

providing a substrate comprising a first side comprising a first surface and a second side comprising a second surface, wherein the second surface is opposite the first surface;

forming a functional coating over at least a portion of the second side, wherein forming the functional coating comprises: forming a base layer over at least a portion of the second surface, wherein forming the base layer comprises forming a first film over at least a portion of the second surface, and forming a second film over at least a portion of the first film; forming a metallic layer over at least a portion of the base layer; and forming a top layer over at least a portion of the metallic layer, wherein a patterned feature is formed within the functional coating.

19. An insulating glass unit comprising:

a first ply comprising a first side comprising a No. 1 surface and a second side comprising a No. 2 surface, wherein the No. 2 surface is opposite the No. 1 surface, a second ply comprising a first side comprising a No. 3 surface and a second side comprising a No. 4 surface, wherein the No. 4 surface opposite the No. 3 surface, wherein the first ply and second ply are connected together;

a functional coating positioned over at least a portion of the second side comprising the No. 2 surface, the functional coating comprising: a base layer positioned over at least a portion of the No. 2 surface, wherein the base layer comprises a first film positioned over at least a portion of the No. 2 surface, and a second film positioned over at least a portion of the first film; a metallic layer positioned over at least a portion of the base layer; and a top layer positioned over at least a portion of the metallic layer;

wherein the functional coating comprises a patterned feature.

\* \* \* \* \*